(12) United States Patent
Propst

(10) Patent No.: US 9,032,679 B2
(45) Date of Patent: *May 19, 2015

(54) ROOF PANEL AND METHOD OF FORMING A ROOF

(71) Applicant: PROPST FAMILY LIMITED PARTNERSHIP, Phoenix, AZ (US)

(72) Inventor: John Eugene Propst, Phoenix, AZ (US)

(73) Assignee: PROPST FAMILY LIMITED PARTNERSHIP, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,239

(22) Filed: Jul. 30, 2013

(65) Prior Publication Data

US 2013/0305642 A1    Nov. 21, 2013

Related U.S. Application Data

(63) Continuation-in-part of application No. 13/431,053, filed on Mar. 27, 2012, now Pat. No. 8,695,299, and a continuation-in-part of application No. PCT/US2012/048065, filed on Jul. 25, 2012, said (Continued)

(51) Int. Cl.
*E04D 1/28* (2006.01)
*E04D 1/30* (2006.01)

(Continued)

(52) U.S. Cl.
CPC .. *E04D 1/28* (2013.01); *E04D 1/30* (2013.01); *E04D 1/16* (2013.01); *F24J 2/0455* (2013.01);

(Continued)

(58) Field of Classification Search
CPC ............... E04D 1/16; E04D 1/24; E04D 1/28; E04D 3/04; E04D 3/26; E04D 3/351; E04D 1/30; F24J 2/0455
USPC ................... 52/173.3, 220.1, 309.12, 309.17; 126/622; 165/168
See application file for complete search history.

(56) References Cited

U.S. PATENT DOCUMENTS 1,681,311 A    4/1928  Techmer
1,693,742 A    12/1928 Bemis
(Continued)

FOREIGN PATENT DOCUMENTS

DE    10 2005 049 428 A1 *  6/2007
WO    2012/001198       *  1/2012

OTHER PUBLICATIONS

Hawley's Condensed Chemical Dictionary, Fourteenth Edition, (C) 2001, defintion of "ceramic" p. 229.*

(Continued)

*Primary Examiner* — Robert Canfield
(74) *Attorney, Agent, or Firm* — Schmeiser, Olsen & Watts LLP

(57) ABSTRACT

A building panel structure is disclosed, in which building panels are used to form a structure. Roof panels and roof panel tiles are used to form the roof of the structure. The roof panel includes a core and a coating covering a portion of the core. In some embodiments the core consists of a frame and at least one insulating structural block. The insulating structural blocks can be encapsulated polystyrene (EPS) foam blocks. In some embodiments the coating includes ceramic material. In some embodiments the coating includes a first layer and a second layer. In some embodiments the coating materials are formed into a roof tile before they are coupled to the roof panel core. The roof panel and the roof tile can be shaped, formed, and colored to look like traditional roof tiles such as shake roof tiles or Spanish roof tiles.

5 Claims, 40 Drawing Sheets

Related U.S. Application Data application No. 13/431,053 is a continuation-in-part of application No. 13/362,947, filed on Jan. 31, 2012, now Pat. No. 8,458,983, which is a continuation of application No. 13/110,706, filed on May 18, 2011, now Pat. No. 8,127,509, which is a continuation of application No. 12/844,163, filed on Jul. 27, 2010, now Pat. No. 7,984,594.

(60) Provisional application No. 61/740,110, filed on Dec. 20, 2012, provisional application No. 61/296,616, filed on Jan. 20, 2010, provisional application No. 61/511,891, filed on Jul. 26, 2011, provisional application No. 61/560,897, filed on Nov. 17, 2011.

(51) Int. Cl.
| | |
|---|---|
| *E04D 1/16* | (2006.01) |
| *F24J 2/04* | (2006.01) |
| *B32B 17/02* | (2006.01) |
| *E04C 2/296* | (2006.01) |
| *B32B 5/26* | (2006.01) |
| *E04D 3/35* | (2006.01) |
| *C04B 28/04* | (2006.01) |
| *C04B 111/00* | (2006.01) |
| *C04B 111/28* | (2006.01) |
| *C04B 111/80* | (2006.01) |

(52) U.S. Cl.
CPC ............... *B32B 17/02* (2013.01); *E04C 2/296* (2013.01); *B32B 2262/101* (2013.01); *B32B 5/26* (2013.01); *B32B 2260/023* (2013.01); *B23B 2260/044* (2013.01); *B32B 2419/06* (2013.01); *B32B 2607/00* (2013.01); *E04D 3/352* (2013.01); *C04B 28/04* (2013.01); *C04B 2111/00586* (2013.01); *C04B 2111/00612* (2013.01); *C04B 2111/28* (2013.01); *C04B 2111/80* (2013.01); *F24J 2/045* (2013.01)

(56) References Cited

U.S. PATENT DOCUMENTS

| | | | |
|---|---|---|---|
| 2,046,071 A * | 6/1936 | Harding | 428/404 |
| 2,091,552 A | 8/1937 | Macauley | |
| 2,109,719 A | 3/1938 | Brusse | |
| 2,176,938 A | 10/1939 | Troy | |
| 2,395,186 A | 2/1946 | Jones | |
| 2,902,853 A | 9/1959 | Lofstrom | |
| 3,044,919 A | 7/1962 | Stoneburner | |
| 3,145,502 A | 8/1964 | Rubenstein | |
| 3,284,980 A | 11/1966 | Dinkel | |
| 3,492,196 A | 1/1970 | Moore | |
| 3,662,507 A | 5/1972 | Espeland | |
| 3,762,935 A | 10/1973 | Leach | |
| 3,835,608 A | 9/1974 | Johnson | |
| 3,982,368 A | 9/1976 | Perrin | |
| 4,044,520 A * | 8/1977 | Barrows | 52/309.12 |
| 4,049,874 A | 9/1977 | Aoyama et al. | |
| 4,113,913 A * | 9/1978 | Smiley | 428/312.4 |
| 4,164,933 A * | 8/1979 | Alosi | 126/621 |
| 4,186,536 A | 2/1980 | Piazza | |
| 4,191,001 A | 3/1980 | Lheureux | |
| 4,193,240 A | 3/1980 | Odoerfer | |
| 4,204,520 A * | 5/1980 | Rosenberg | 126/622 |
| 4,237,861 A * | 12/1980 | Fayard et al. | 126/622 |
| 4,288,962 A | 9/1981 | Kavanaugh | |
| 4,314,431 A | 2/1982 | Rabassa | |
| 4,342,180 A * | 8/1982 | Gibson et al. | 52/745.2 |
| 4,349,398 A | 9/1982 | Kearns et al. | |
| 4,489,530 A | 12/1984 | Chang | |
| 4,525,965 A | 7/1985 | Woelfel | |
| 4,558,552 A | 12/1985 | Reitter, II | |
| 4,578,915 A | 4/1986 | Schneller | |
| 4,646,498 A | 3/1987 | Schneller et al. | |
| 4,653,243 A | 3/1987 | Burkett | |
| 4,669,240 A | 6/1987 | Amormino | |
| 4,774,794 A * | 10/1988 | Grieb | 52/309.7 |
| 4,841,705 A | 6/1989 | Fuhrer | |
| 4,852,316 A | 8/1989 | Webb | |
| 4,875,322 A * | 10/1989 | Rozzi | 52/746.1 |
| 4,876,151 A | 10/1989 | Eichen | |
| 4,882,888 A | 11/1989 | Moore | |
| 4,946,512 A * | 8/1990 | Fukuroi et al. | 136/248 |
| 4,958,399 A | 9/1990 | Toal et al. | |
| 5,003,742 A | 4/1991 | Dettbarn | |
| 5,127,204 A | 7/1992 | Braun | |
| 5,129,628 A | 7/1992 | Vesper | |
| 5,184,808 A * | 2/1993 | Vesper | 256/31 |
| 5,231,813 A | 8/1993 | Drawdy | |
| 5,246,640 A | 9/1993 | Bryant | |
| 5,248,549 A | 9/1993 | Silva et al. | |
| 5,335,472 A | 8/1994 | Phillips | |
| 5,353,560 A | 10/1994 | Heydon | |
| 5,404,685 A | 4/1995 | Collins | |
| 5,410,852 A * | 5/1995 | Edgar et al. | 52/408 |
| 5,473,849 A | 12/1995 | Jones, Jr. et al. | |
| 5,502,940 A * | 4/1996 | Fifield | 52/309.12 |
| 5,735,090 A | 4/1998 | Papke | |
| 5,740,643 A | 4/1998 | Huntley | |
| 5,758,461 A | 6/1998 | McManus | |
| 5,758,463 A | 6/1998 | Mancini, Jr. | |
| 5,771,649 A | 6/1998 | Zweig | |
| 5,826,388 A | 10/1998 | Irving | |
| 5,842,276 A | 12/1998 | Asher et al. | |
| 5,916,392 A | 6/1999 | Ghanbari | |
| 5,921,046 A | 7/1999 | Hammond, Jr. | |
| 5,966,885 A | 10/1999 | Chatelain | |
| 5,979,131 A | 11/1999 | Remmele et al. | |
| 6,006,480 A | 12/1999 | Rook | |
| 6,044,603 A | 4/2000 | Bader | |
| 6,112,489 A | 9/2000 | Zweig | |
| 6,119,422 A | 9/2000 | Clear et al. | |
| 6,119,432 A | 9/2000 | Niemann | |
| 6,263,628 B1 | 7/2001 | Griffin | |
| 6,314,695 B1 | 11/2001 | Belleau | |
| 6,314,704 B1 | 11/2001 | Bryant | |
| 6,355,333 B1 | 3/2002 | Waggoner et al. | |
| 6,401,413 B1 | 6/2002 | Niemann | |
| 6,434,900 B1 | 8/2002 | Masters | |
| 6,438,923 B2 | 8/2002 | Miller | |
| 6,526,714 B1 | 3/2003 | Billings et al. | |
| 6,622,452 B2 | 9/2003 | Alvaro | |
| 6,698,150 B1 | 3/2004 | DiLorenzo | |
| 6,715,249 B2 | 4/2004 | Rusek, Jr. et al. | |
| 6,745,531 B1 | 6/2004 | Egan | |
| 6,807,786 B1 | 10/2004 | Peck | |
| 6,898,908 B2 | 5/2005 | Messenger et al. | |
| 6,918,218 B2 | 7/2005 | Greenway | |
| 6,931,809 B1 | 8/2005 | Brown et al. | |
| 7,036,284 B1 | 5/2006 | Larson | |
| 7,100,336 B2 | 9/2006 | Messenger et al. | |
| 7,194,845 B2 | 3/2007 | Belleau | |
| 7,204,065 B2 * | 4/2007 | Naji | 52/741.1 |
| 7,254,925 B2 | 8/2007 | Stefanutti et al. | |
| 7,337,591 B2 | 3/2008 | Molina | |
| D577,971 S | 10/2008 | Hughett | |
| 7,610,911 B2 * | 11/2009 | Neumann et al. | 126/622 |
| 7,681,368 B1 | 3/2010 | Rubio | |
| 7,709,091 B2 | 5/2010 | Villani et al. | |
| 7,882,666 B2 | 2/2011 | Karalic | |
| 7,902,092 B2 | 3/2011 | Egan et al. | |
| 7,939,747 B2 * | 5/2011 | Stimson et al. | 136/248 |
| 7,984,594 B1 | 7/2011 | Propst | |
| 8,051,611 B2 | 11/2011 | Serino et al. | |
| 8,127,509 B2 | 3/2012 | Propst | |
| 8,286,297 B1 | 10/2012 | Murray | |
| 8,458,983 B2 | 6/2013 | Propst | |
| 2002/0139075 A1* | 10/2002 | Shubow et al. | 52/309.12 |
| 2002/0157336 A1 | 10/2002 | Worrell et al. | |
| 2004/0016194 A1 | 1/2004 | Stefanutti et al. | |
| 2004/0043682 A1 | 3/2004 | Taylor et al. | |

(56) References Cited

U.S. PATENT DOCUMENTS

| | | |
|---|---|---|
| 2004/0074184 A1 | 4/2004 | Naji |
| 2005/0053723 A1 | 3/2005 | Brzoska |
| 2005/0144901 A1 | 7/2005 | Egan et al. |
| 2008/0200086 A1 | 8/2008 | Porter et al. |
| 2008/0257222 A1 | 10/2008 | Wallner |
| 2009/0011212 A1 | 1/2009 | Dubey et al. |
| 2009/0031656 A1 | 2/2009 | Hunt-Hansen et al. |
| 2009/0044476 A1 | 2/2009 | Agneloni |
| 2009/0239430 A1 | 9/2009 | Egan et al. |
| 2010/0071292 A1 | 3/2010 | Futterman |
| 2010/0307091 A1 | 12/2010 | Diaz, Jr. et al. |
| 2011/0036035 A1 | 2/2011 | Dettbarn et al. |
| 2011/0154764 A1* | 6/2011 | Wang et al. .................. 52/309.1 |
| 2011/0220093 A1* | 9/2011 | Fernandez-Fernandez .. 126/622 |
| 2011/0281066 A1* | 11/2011 | Andrews et al. ............. 428/141 |
| 2012/0207975 A1* | 8/2012 | Andrews et al. ............. 428/141 |
| 2012/0276369 A1 | 11/2012 | Jing et al. |
| 2014/0115804 A1 | 5/2014 | Propst |
| 2014/0174647 A1 | 6/2014 | Ciuperca |

OTHER PUBLICATIONS

Wind-Lock, Wind-Devil 2 Fastening System, http://www.wind-lock.com/cat-25-1-5/Fasteners.htm, Leesport, PA.

Dryvit Systems, Inc., What are Dryvit Outsulation Systems, http://www.dryvit.com/systems.asp?country_id=1, West Warwick, RI.

Propst, J., Composite Building and Panel Systems, Patent Cooperation Treaty Application Serial No. PCT/US 11/ 20563, filed Jan. 7, 2011, International Search Report and Written Opinion, dated Jun. 9, 2011.

Primus, Arctic-Modified Adhesive and Base Coat, DS414, 3 pages, from Dryvit Systems, Inc. 1991.

Webster's Third New International Dictionary definition of "stucco", 1 page, 1993.

Finestone Pebbletex Finishes, Product Bulletin 1017861, BASF The Chemical Company, 4 pages, May 2008.

Panacor Sistemas De Construcción, Panel 3D Panacor Technical Manual, Document was issued to representative of Propst Family Limited Partnership LLC, the applicant for patent application Costa Rica 2012-0377, on Jan. 14, 2013, 18 pages, Costa Rica.

Panacor Sistemas De Construcción, Panel-I Panacor Technical Manual, Document was issued to representative of Propst Family Limited Partnership LLC, the applicant for patent application Costa Rica 2012-0377, on Jan. 14, 2013, 36 pages, Costa Rica.

Panacor Sistemas De Construcción, Panel-I Panacor Information Brochure, Document was issued to representative of Propst Family Limited Partnership LLC, the applicant for patent application Costa Rica 2012-0377, on Jan. 14, 2013, 9 pages, Costa Rica.

Propst, J., Building Panel System, Patent Cooperation Treaty Application Serial No. PCT/US 12/48065, filed Jul. 25, 2012, International Search Report and Written Opinion, dated Mar. 29, 2013.

* cited by examiner

ROOF PANEL AND METHOD OF FORMING A ROOF

CROSS REFERENCE TO RELATED APPLICATIONS

This application is a continuation-in-part of U.S. patent application Ser. No. 13/431,053 to John Eugene Propst entitled "Building Panel System," filed Mar. 27, 2012, which is included entirely herein by reference. This application also claims priority to U.S. patent application Ser. No. 61/740,110 to John Eugene Propst entitled "Building Panel System", filed Dec. 20, 2012, which is included entirely herein by reference. This application is also a continuation-in-part of International patent application number PCT/US2012/048065 filed Jul. 25, 2012, which is included entirely herein by reference. U.S. patent application Ser. No. 13/431,053 is a continuation-in-part of U.S. patent application Ser. No. 13/362,947 to John Eugene Propst, filed Jan. 31, 2012 and now issued as U.S. Pat. No. 8,458,983, which is a continuation of U.S. patent application Ser. No. 13/110,706 to John Eugene Propst, filed May 18, 2011 and now issued as U.S. Pat. No. 8,127,509, which is a continuation of U.S. patent application Ser. No. 12/844,163 to John Eugene Propst, filed Jul. 27, 2010 and now issued as U.S. Pat. No. 7,984,594, which is a non-provisional of U.S. patent application Ser. No. 61/296,616, to John Eugene Propst, filed Jan. 20, 2010 and entitled "Layered Building Panel System". U.S. patent application Ser. No. 13/431,053 also claims priority to U.S. patent application Ser. No. 61/511,891 to John Eugene Propst entitled "Composite Building and Panel Systems", filed Jul. 26, 2011, and to U.S. patent application Ser. No. 61/560,897 to John Eugene Propst entitled "Composite Panel Coating Systems", filed Nov. 17, 2011, which are included entirely herein by reference.

BACKGROUND OF THE INVENTION

1. Technical Field

This invention relates generally to materials for constructing buildings and structures and more specifically to roof panels used to form a roof of a building or structure.

2. State of the Art

Buildings have historically been constructed of brick, cement block, wood frame and, more recently, steel frame and stucco. The material and techniques used in constructing buildings is evolving in an effort to reduce cost, increase energy efficiency, reduce the amount of wood usage in buildings, and to reduce material waste. Cement block and brick construction requires a large amount of manpower to create a building, which raises the cost of the building. Wood has long been a staple material in building construction, but recently there is a desire to preserve forest resources. Wood is inherently more susceptible to damage from inclement weather, moisture, mold, fire, and insect infestation. Also, when wood is used to create a building there can be a large amount of waste. This is because standard sized boards are sent to the construction site, which must be cut and assembled at the building site into a building. The labor involved in cutting lumber to size results in high labor costs and a large amount of lumber wasted from boards cut to size.

It is also desirable to increase the energy efficiency of buildings in order to reduce the energy costs during the lifetime of the building. Cement block, brick, and wood frame and stucco construction do not provide the high level of energy efficiency that can be obtained from newer materials.

Foam blocks have become a popular alternative and are environmentally sustainable as compared to traditional wood, cement block, and brick construction materials. Foam block systems are lightweight, can be molded or formed into any needed shape, result in a thermally efficient building construction, and require less skilled manpower to form into a building structure. Other benefits include, but are not limited to, a resistance to moisture, mold, fire and insect damage. The foam blocks are constructed using materials which are recyclable and renewable, provide good insulating qualities, and are often themselves made from recycled materials. Alternatively, construction blocks can also be made from other environmentally friendly materials such as straw, wood fibers, paper, and glass, for example.

One problem with some of the new building materials such as foam block is that the structural strength of a building element that is made with foam blocks may not be as high as when wood, brick or cement block are used to form the building element. This can be particularly important in areas where buildings are required to withstand high winds or earthquakes. There is a need for a building panel system which minimizes construction time, uses environmentally friendly materials, and results in a building with high structural strength and structural integrity.

The roof of a building or structure is of particular importance to the energy consumption of the complete building. When the heat transfer through the roof of a building is minimized, the energy efficiency of the whole building can be maximized. Thus there is a need for composite building panels specifically designed for use in the roof of a building.

DISCLOSURE OF THE INVENTION

This invention relates generally to materials for constructing buildings and structures and more specifically to roof panels used to form a roof of a building or structure.

Disclosed is a roof tile that includes a layer of material. The layer of material includes cement, acrylic bonder, and a fiberglass mesh embedded in the layer of material. In some embodiments the layer of material further comprises aggregate. In some embodiments the layer of material further comprises fiberglass strands. In some embodiments the layer of material further comprises ceramic. In some embodiments the layer of material is a first layer of material, and the roof tile further includes a second layer of material covering a portion of the first layer of material. In some embodiments the second layer of material includes cement and aggregate. In some embodiments the second layer further includes ceramic. In some embodiments the fiberglass mesh is a first layer fiberglass mesh, and the second layer includes a second layer fiberglass mesh embedded in the second layer. In some embodiments the second layer includes acrylic bonder. In some embodiments the second layer includes fiberglass strands. In some embodiments the first layer includes aggregate. In some embodiments the first layer includes perlite. In some embodiments the roof tile includes a sheet of roofing membrane bonded to a bottom surface of the first layer. In some embodiments the roof tile includes an elastomeric stone textured coating covering a portion of the second layer. In some embodiments the roof tile includes fluid channels extending through either the first layer or the second layer. The fluid channels conduct fluid through the fluid channel.

Disclosed is a roof panel that includes a roof panel core and a coating covering a portion of the roof panel core. The roof panel core includes an insulating structural block. The coating includes cement, aggregate, and acrylic bonder. In some embodiments the aggregate in the coating includes ceramic. In some embodiments the coating includes a reinforcing mesh structure. In some embodiments the reinforcing mesh structure is a fiberglass mesh. In some embodiments the reinforcing mesh structure is a cotton mesh. In some embodiments the reinforcing mesh structure is a metal mesh. In some embodiments the coating includes fiberglass strands. In some embodiments the roof panel includes a fluid channel extending through the roof panel. In some embodiments the fluid channel extends lengthwise through the roof panel. In some embodiments the fluid channel extends lengthwise through the roof panel between a roof panel top surface and a roof panel bottom surface. In some embodiments the fluid channel enters the roof panel at a roof panel edge and exits the roof panel at the roof panel edge. In some embodiments a layer of heat absorbing material is in thermal communication with a portion of the fluid channel. In some embodiments the layer of heat absorbing material is a cementitious mixture. In some embodiments the coating includes a first coating covering a portion of the roof panel core, where the first coating includes cement, aggregate, and acrylic bonder; and a second coating covering a portion of the first coating, where the second coating includes cement and aggregate. In some embodiments the second coating includes acrylic bonder. In some embodiments the aggregate in the second coating includes ceramic. In some embodiments the aggregate in the first coating includes perlite. In some embodiments the second coating includes a reinforcing mesh structure.

Disclosed is a method of forming a roof of a building. The method of forming a roof of a building according to the invention includes the steps of forming a roof panel, where the roof panel includes an insulating structural block, and coupling the roof panel to a roof framing member of a building. In some embodiments the step of forming a roof panel includes the steps of forming a roof panel core, where the roof panel core includes an insulating structural block, and applying a first coating to a portion of the roof panel core, where the coating comprises cement, aggregate, and acrylic bonder. In some embodiments the method of forming a roof of a building according to the invention includes the step of placing a screed frame on the roof panel. In some embodiments the method of forming a roof of a building according to the invention includes the step of applying a wet second coating mixture to a portion of the first coating, where the wet second coating mixture comprises cement, acrylic bonder, and ceramic. In some embodiments the method of forming a roof of a building according to the invention includes the step of embedding a reinforcing mesh in the wet second coating mixture before the wet second coating mixture is allowed to cure. In some embodiments the method of forming a roof of a building according to the invention includes the step of removing the screed frame from the roof panel core. In some embodiments the method of forming a roof of a building according to the invention includes the step of placing a screed frame on the roof panel. In some embodiments the method of forming a roof of a building according to the invention includes the step of applying a wet first coating mixture to a portion of the roof panel, where the wet first coating mixture comprises cement, acrylic bonder, and aggregate. In some embodiments the method of forming a roof of a building according to the invention includes the step of allowing the wet first coating mixture to cure; and applying a wet second coating mixture over a portion of the cured first coating mixture, where the wet second coating mixture comprises cement, acrylic bonder, and ceramic.

The foregoing and other features and advantages of the present invention will be apparent from the following more detailed description of the particular embodiments of the invention, and as illustrated in the accompanying drawings.

DETAILED DESCRIPTION OF EMBODIMENTS OF THE INVENTION

As discussed above, embodiments of the present invention relate to materials for constructing buildings and structures and more specifically to roof panels used to form a roof of a building or structure.

The use of environmentally friendly, insulating, lightweight block materials for use as the walls, roofs, floors and other structures in buildings is increasing in popularity. The blocks of material are being used to replace concrete blocks and insulated wood and stucco walls. These blocks are structural elements which provide insulation properties and a shaped mass which defines the shape of the structure to be built. Expanded polystyrene (EPS) foam blocks are a popular material, but other materials such as straw, plastic, and recycled elements are also being used to create these insulating structural blocks. These new building materials use less wood, decrease construction waste, often use recycled materials, and create a building which is more energy efficient than standard wood frame and plaster construction buildings. Insulating structural blocks such as EPS foam blocks are often lightweight and can be molded or shaped easily to create any desired shape. These new block materials, including EPS foam blocks, sometimes do not possess the necessary structural strength for specific building structures. In these cases it is necessary to add structural elements to the building panels made from insulating structural block materials. Disclosed herein are building panels and methods of creating building panels using insulating structural blocks, frames, and coatings over the blocks and frames to create structurally strong structures and building panels, while still retaining the lightweight, environmentally friendly, and energy efficient characteristics of the insulating structural blocks.

Disclosed herein are building panels specifically designed for use in constructing the roof of buildings or other structures. Building roofs are particularly important to the safety, fire protection, and energy efficiency of a building.

Figure 1:
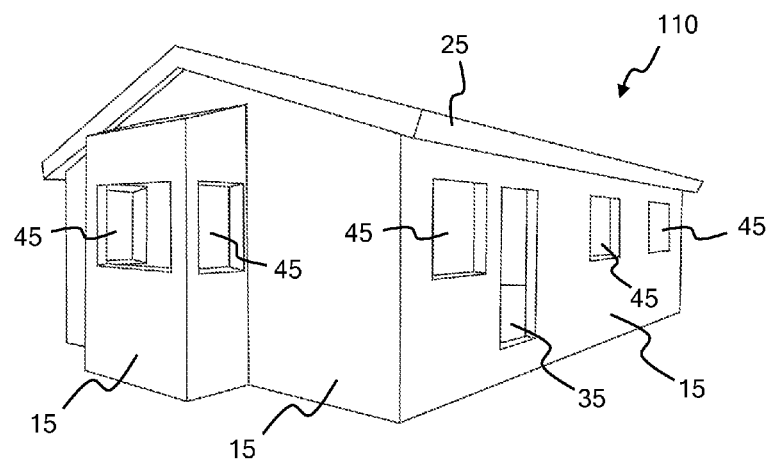
FIG. 1 is a perspective view of an embodiment of structure 110 according to the invention.
Figure 2:
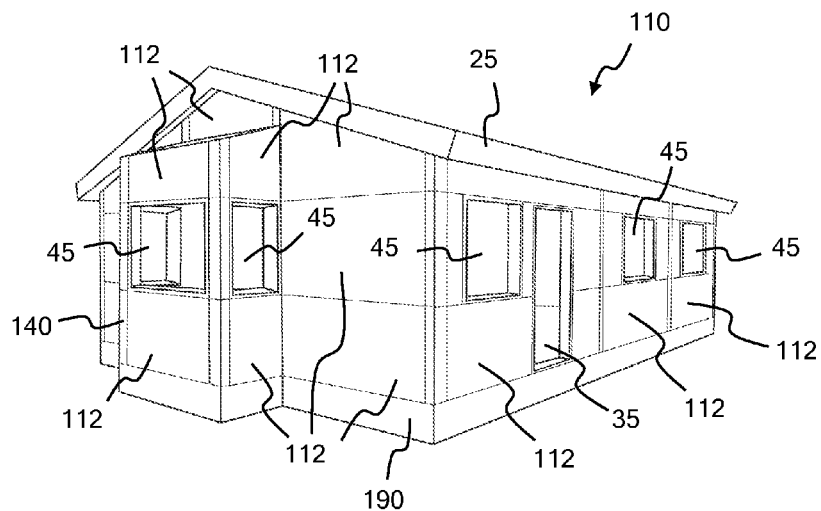
FIG. 2 shows structure 110 of FIG. 1 with the outer finish layers removed, showing that structure 110 is formed of building panels 112 according to the invention.

FIG. 1 shows a perspective view of a structure 110 according to the invention. Structure 110 in this embodiment is house 110. Structure 110 is formed of a plurality of building panels 112 (not all building panels 112 are labeled), as can be seen in FIG. 2. FIG. 2 shows structure 110 of FIG. 1, with its outer finish coatings removed so that building panels 112 can be seen. Building panels 112 form the walls of structure 110 in this embodiment. Building panels 112 have cutouts in them to form windows 45 and door 35. Roof 25 can also be formed of embodiments of building panels 112, as discussed later in this document. Building panels 112 are coupled to foundation 190 to form a stable structure 110.

Figure 3:
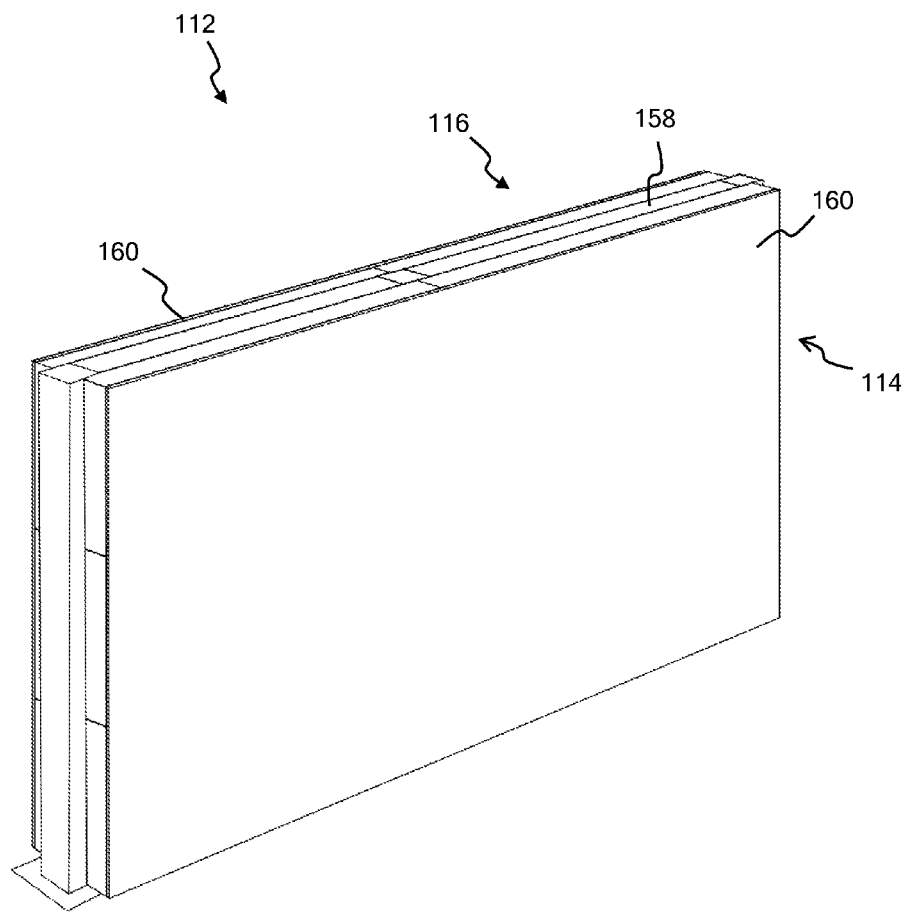
FIG. 3 is a perspective view of one embodiment of composite building panel 112 according to the invention.

FIG. 3 shows a perspective view of one embodiment of building panel 112 according to the invention. A building panel means a panel or element which is used in constructing a form, structure, building, or edifice. A building panel according to the invention can take many different forms. FIG. 3 shows one embodiment of a building panel according to the invention as building panel 112. Building panel 112 is shown including core 158 and coating 160 covering a portion of core 158. Building panel 112 is used to form walls, floors, ceilings, beams, or other elements used in creating a structure, edifice, or building.

Building panel 112 (also referred to as composite building panel 112 or just panel 112) is shown in FIG. 3 as having a rectangular shape for use as a wall of structure 110 of FIG. 1 and FIG. 2, or a block fence structure, for example. Building panel 112 can be formed in any size and shape according to the needs of the structure 110 to be built. In some embodiments building panel 112 is square, or rectangular or round, or oval, oblong or elongated. Building panel 112 can be curved, or part curved and part rectangular. Building panel 112 can take any shape. Building panel 112 takes a shape according to the shape of the structure 110 to be built. Core 158 forms the basic shape, and coating 160 covers a portion of core 158 to add strength to building panel 112, to form an impermeable layer on a portion of core 158, and/or to provide an aesthetically pleasing surface for exterior finishing. Building panel 112 has first surface 114 which includes coating 160 in this embodiment, and second surface 116 which in this embodiment also includes coating 160. Coating 160, as well as other coating embodiments that can be used as a part of building panel 112, will be discussed in detail shortly.

Figure 4:
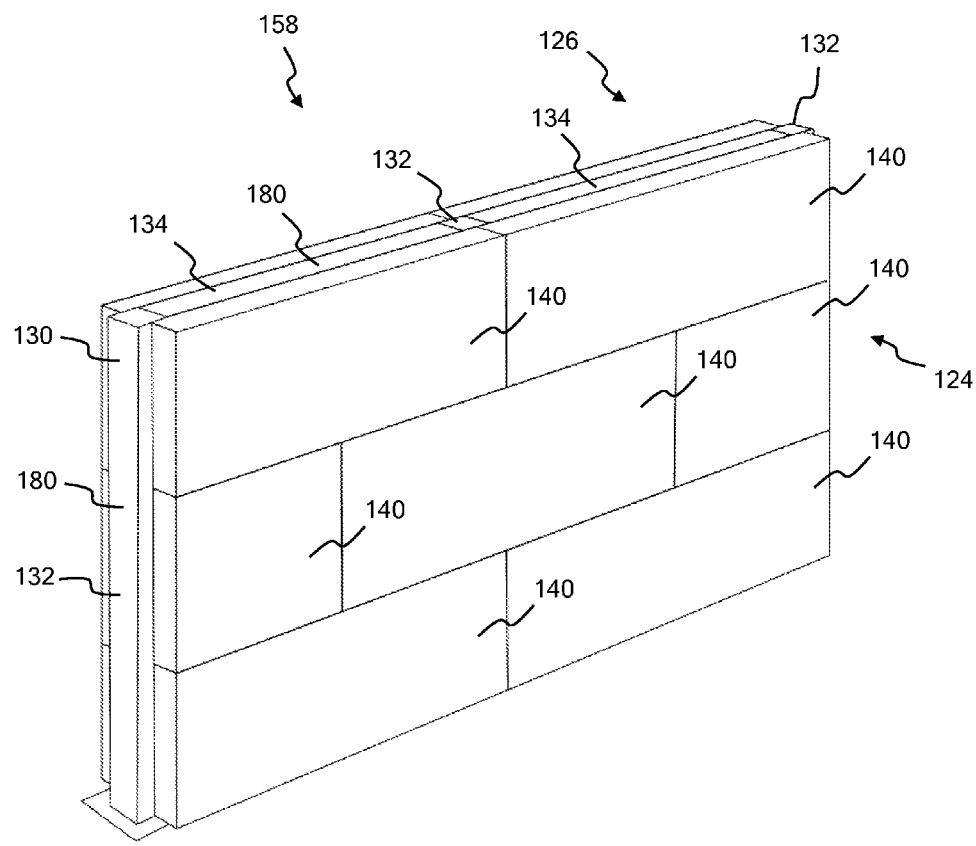
FIG. 4 is a perspective view of core 158 of building panel 112 of FIG. 3.

FIG. 4 is a perspective view of core 158 of building panel 112 of FIG. 3. Building panel 112 in this embodiment is formed of core 158 and coating 160, where coating 160 covers a portion of core 158. Core 158 and coating 160 can take many different forms. Core 158 in this embodiment has front surface 124, rear surface 126, and multiple sides 180 (two of four sides 180 shown) as shown in FIG. 4. Coating 160 according to the invention covers a portion of core 158. In this embodiment coating 160 covers both front surface 124 and rear surface 126 of core 158. Coating 160 can cover any portion of core 158. Core 158 is formed in this embodiment of frame 130 and at least one insulating structural block 140, as shown in FIG. 4 through FIG. 7. In this embodiment core 158 includes more than one insulating structural block 140. In some embodiments core 158 includes one insulating structural block 140. In some embodiments core 158 includes one or more than one insulating structural block 140. In some embodiments core 158 includes only one or more than one insulating structural block 140, with no frame 130. In some embodiments core 158 includes other elements in addition to or instead of frame 130 or insulating structural blocks 140, such as electrical wires, water pipes, other utilities or elements needing to be sent through or within structure 110.

Figure 5:
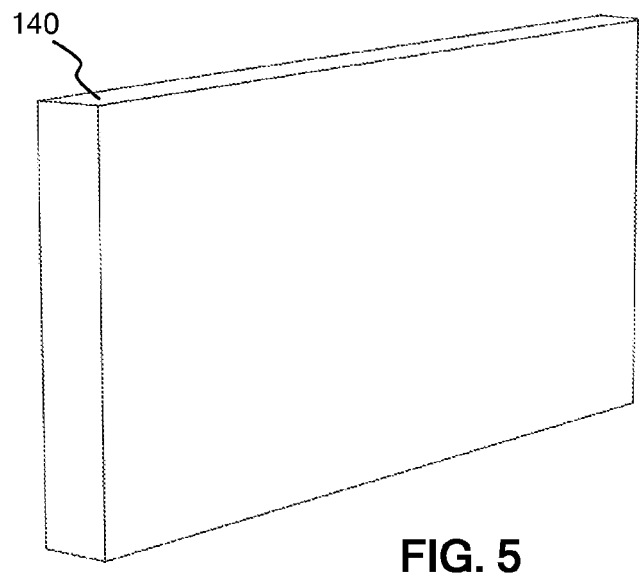
FIG. 5 is a perspective view of one embodiment of insulating structural block 140 that can be a part of core 158 according to the invention, which is part of building panel 112 according to the invention of FIG. 3.
Figure 6:
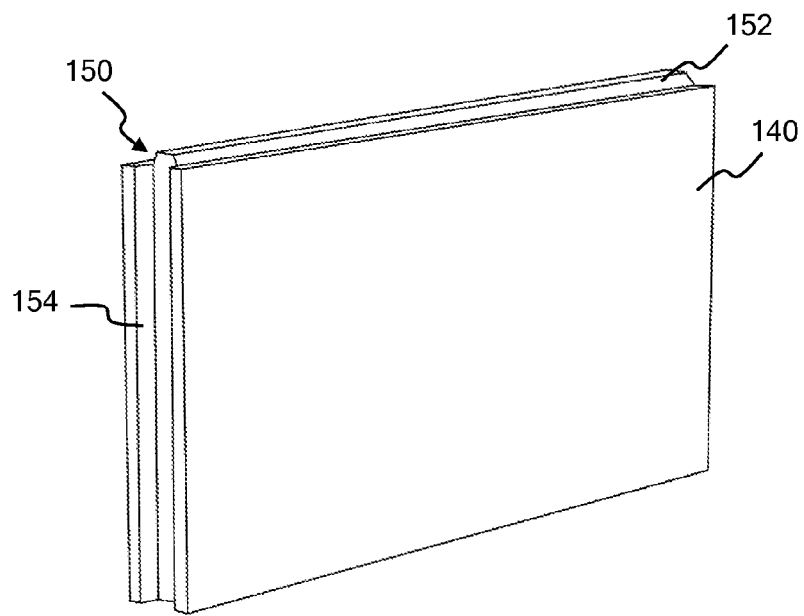
FIG. 6 is a perspective view of another embodiment of insulating structural block 140 having interlocking features 150. This embodiment of insulating structural block 140 is a part of core 158 of FIG. 4, which is part of building panel 112 according to the invention of FIG. 3.
Figure 7:
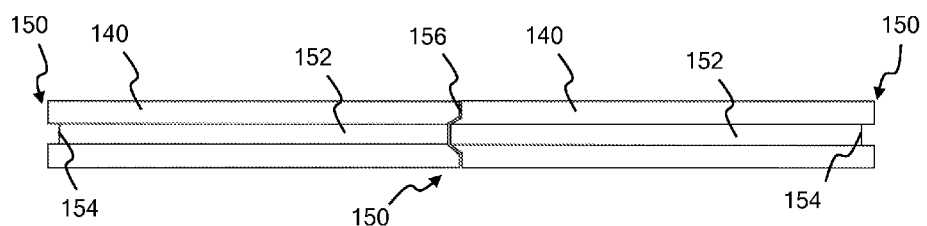
FIG. 7 is a top view of two interlocked insulating structural blocks 140 of building panel 112 of FIG. 3, with insulating structural blocks 140 having interlocking features 150.

FIG. 5 is a perspective view of an insulating structural block 140 that can be used in composite building panel 112 according to the invention. FIG. 6 is a perspective view of another insulating structural block 140 that can be used in composite building panel 112 according to the invention. In FIG. 6 insulating structural block 140 includes interlock elements 150. Interlock elements 150 are used to interlock multiple insulating structural blocks 140 to each other and to interlock insulating structural blocks 140 to frame 130. FIG. 7 is a top view of two interlocked insulating structural blocks 140 of building panel 112 of FIG. 3, with interlocking features 150 which interlock insulating structural blocks 140 and frame 130 as detailed in FIG. 8 through FIG. 10.

In some embodiments of building panel 112, core 158 is made solely of insulating structural blocks 140. In some embodiments core 158 is made of insulating structural blocks 140 and frame 130, as shown in FIG. 4 and FIG. 8 through FIG. 10. In some embodiments core 158 is made of other elements besides insulating structural blocks 140 and frame 130. Core 158 can be formed of any material or materials that provide the necessary building-shaped elements and that accepts coating 160 to create building panel 112 according to the invention. Core 158 can be formed of wood, metal, recycled materials, straw, concrete blocks, plastic, or any other material or combination of materials. Insulating structural blocks 140 are also referred to in this document as simply "blocks" 140.

Frame 130 in this embodiment creates the skeletal structure for the walls, floors, ceiling, beams, or other building elements that are needed to form a structure using building panel 112. Frame 130 in the embodiment shown in FIG. 4 includes vertical members 132 and horizontal members 134. In this embodiment frame 130 is formed of galvanized steel. Frame 130 according to the invention can be made of other structural material such as wood, aluminum, other metals, plastic, recycled material, etc. In this embodiment frame 130 is formed from 4"×4"×3/16" galvanized steel box tubing. Horizontal members 134 and vertical members 132 are coupled in a manner which holds the members together solidly. In some embodiments mechanical attachments such as bolts are used. In some embodiments the members of frame 130 are welded together. In some embodiments the individual members of frame 130 connect together at angles other than horizontal and vertical. Diagonal frame members are used in some embodiments of frame 130. In some embodiments frame 130 includes metal straps running diagonally. It is to be understood that frame 130 according to the invention can take many different shapes and sizes according to the specifics of the structure to be built. Frame 130 can be formed of many different materials according to the structural strength needed by the structure to be built.

Frame 130 in this embodiment is embedded in insulating structural blocks 140. Frame 130 being embedded in blocks 140 means that the majority of frame 130 is encased in blocks 140, with a minimum of surface area of frame 130 not covered by blocks 140. Embedded is meant to mean "encase" or "cover a majority of the surface of". Frame 130 is embedded in insulating structural blocks 140 by cutting blocks 140 into shapes that will encircle and couple to frame 130. Having frame 130 embedded in insulating structural blocks 140 provides several advantages for building panel 112. Frame 130 being embedded in blocks 140 provides structural strength to core 158 and yet leaves most of the outer surface of core 158 as a surface of blocks 140, so that the outer surface of core 158 can be easily shaped and covered with coating 160. Thus coating 160 covers surfaces of insulating structural blocks 140 instead of frame 130. This allows core 158 and building panel 112 to be shaped for aesthetically pleasing shapes, and provides the outer surface as a surface of insulating structural blocks 140, which accepts and retains coating 160 for strength and exterior finishing. In this embodiment, where frame 130 is embedded in blocks 140, there are portions of frame 130 which are not covered by block 140 so that frame 130 can be connected to other frames and structures, but the majority of frame 130 is embedded in blocks 140. In other embodiments of building panel 112 frame 130 is not embedded in blocks 140, meaning that significant portions of frame 130 are on the exterior surface of core 158.

Insulating structural blocks 140 have several purposes, including defining the shape of the building panel 112 being created, providing insulating properties, and providing a surface for applying coating 160 or other coatings or layers. Coating 160 or other coatings are applied to the outer surface of core 158. The outer surface of core 158 is formed mostly of surfaces or insulating structural blocks 140, since frame 130 is embedded in insulating structural blocks 140. Insulating structural blocks 140 in core 158 of FIG. 4 are used to enclose frame 130 elements and to form the desired shape of the structure to be built with building panel 112. Some embodiments of insulating structural blocks 140 according to the invention are shown in FIG. 5, FIG. 6 and FIG. 7. Blocks 140 are often formed to interlock with each other and with frame 130 as shown in FIG. 4, and FIG. 6 through FIG. 10. In this embodiment insulating structural blocks 140 according to the invention are made of expanded polystyrene (EPS) foam, creating an EPS foam insulating structural block 140. EPS foam blocks provide high energy efficiency and are lightweight. EPS foam can be created from recycled materials and can itself be recycled. Another desirable feature of EPS foam block 140 is that it can be easily molded or cut into any desired shape. FIG. 6 and FIG. 7 shows EPS foam insulating structural blocks 140 that have been cut to include interlock elements 150, where interlock elements 150 in this embodiment include tongue 152 and groove 154. Blocks 140 can be made into any shape, size, and structure according to the structure being built using building panel 112. In this embodiment insulating structural blocks 140 are 4'×8'×6" EPS foam insulating structural blocks, which have interlocking elements 150 cut into them so that they interlock with themselves and with frame 130 to create core 158 as shown in FIG. 4. In this embodiment one pound density EPS foam is used for blocks 140 but any suitable material and density can be used which provides suitable structural characteristics. Blocks 140 are connected to each other and to concrete in this embodiment using a polymer-based acrylic adhesive 156 such as Primus® sold by Dryvit Systems Inc. (Dryvit). Blocks 140 are coupled to metal or wood in this embodiment using a water-based acrylic copolymer adhesive such as Adhesive for EPS (ADEPS) from Dryvit. In some embodiments insulating structural blocks 140 and frame 130 are coupled to other members and to each other using different adhesives, glues, mechanical attachments, or other suitable coupling means.

In this embodiment insulating structural block 140 is made of EPS foam. Insulating structural block 140 according to the invention can be made of other materials, including but not limited to straw, wood, plastic, paper, concrete, or recycled materials.

In the embodiment of core 158 of FIG. 4, insulating structural block 140 is cut to shape from the rectangular EPS foam blocks 140 as shown in FIG. 5 to create the shaped insulating structural blocks 140 as shown in FIG. 6. Cutouts and interlocking elements are cut from blocks 140 to create a block 140 shape that will enclose frame 130, interlock with other blocks 140 and frame 130, receive coating 160, and provide a surface of the desired shape for the structure to be built. Blocks 140 according to the invention can be molded to shape or formed to the correct size and shape using methods such as slicing, melting, or other block-shaping methods. Block 140 can be formed to any size and shape needed to create the structure being formed, such as walls, floors, roofs, ceilings, beams, fences, bridges, edifices, offices, etc. Blocks 140 and frame 130 can be formed into any size and shape to create core 158 and building panel 112 in any size and shape to form the desired structure.

Openings and passageways for utilities, air flow, or other types of access openings through building panel 112 can be easily cut into core 158 as desired. Openings for windows 45 and doors 35 are also formed in core 158.

In some embodiments core 158 includes structures, elements, layers, or materials that create a building panel 112 according to the invention with the ability to provide specific types of protection. In some embodiments core 158 includes structures, elements, layers or material that provide protection from penetration such as from flying objects, projectiles such as bullets, or other items that could cause harm. In some embodiments core 158 encapsulates structures, layers, materials, or elements that block or slow down projectiles or other flying objects. For example, core 158 according to the invention can include layers or materials embedded in core 158, embedded in blocks 140, or sandwiched between blocks 140 that block or slow down projectiles. These projectile-resistant elements can provide protection to inhabitants in dangerous areas from projectiles or from flying objects caused by extreme weather or accidents, for example. The protective layers or materials can be man-made or natural, and can take the form of layers of mesh, layers of metal, polymer, plastic, acrylic, carbon fibers, carbon nanotubes, or other materials, or other forms.

In some embodiments core 158 includes structures, elements, layers or materials that provide sound attenuation or blockage. For example, core 158 according to the invention can include layers or materials embedded in or encapsulated by core 158, embedded in blocks 140, or sandwiched between blocks 140, that block or attenuate sound. These sound-deadening elements can provide protection to inhabitants from explosions, machinery, vehicles, or other loud noise-generators. These sound-deadening layers or materials can be man-made or natural, and can take the form of layers of mesh, layers of metal, carbon fibers, carbon nanotubes, polymer, plastic, acrylic, or other materials, or other forms. In some embodiments the sound-deadening materials form anechoic devices or layers.

In some embodiments core 158 includes structures, elements, layers or material that provide radiation attenuation or blockage. For example, core 158 according to the invention can include layers or materials embedded in or encapsulated by core 158, embedded in blocks 140, or sandwiched between blocks 140 that block or attenuate radiation. The radiation blocked or attenuated can take many forms, including electromagnetic radiation, electromagnetic pulses, radio frequency radiation, optical radiation, x-rays, nuclear radiation, radioactive radiation, or other types of radiation. These radiation-deadening elements can provide protection to inhabitants from explosions, accidents at power generating stations, acts of war, electromagnetic pulses, or acts of God. These radiation-shielding layers or materials can be man-made or natural, and can take the form of layers of mesh, layers of metal, carbon fibers, carbon nanotubes, carbon nanostructures, one or more layers of lead, polymer, plastic, acrylic, gel, or other materials, or other forms. In some embodiments the radiation-deadening materials form an element that reflects certain types of radiation. In some embodiments the radiation-deadening materials form an element that absorbs certain types of radiation. In some embodiments the radiation-deadening materials form an element that provides electromagnetic shielding. In some embodiments core 158 includes elements, structures, or materials that provide radio frequency shielding. In some embodiments core 158 includes elements, structures, or materials that provide electromagnetic interference shielding.

In some embodiments core 158 includes structures, elements, layers or material that provide chemical attenuation or blockage. For example, core 158 according to the invention can include layers or materials embedded in or encapsulated by core 158, embedded in blocks 140, or sandwiched between blocks 140 that block or attenuate one or more specific chemicals. The chemicals blocked or attenuated can take many forms, natural or man-made. The chemical attenuating or blocking elements can provide protection to inhabitants from explosions, accidents at power generating stations, acts of war, or acts of God. These layers can be man-made or natural, and can take the form of layers of mesh, layers of metal, carbon fibers, polymer, plastic, acrylic, gel, or other materials, or other forms. In some embodiments the chemical-blocking materials form an element that absorbs certain types of chemicals.

Figure 9:
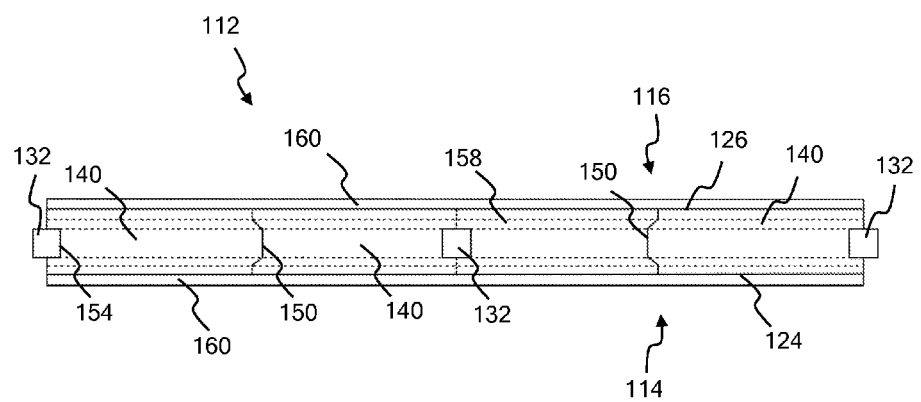
FIG. 9 shows horizontal cross-section 7-7 of building panel 112 of FIG. 8.
Figure 8:
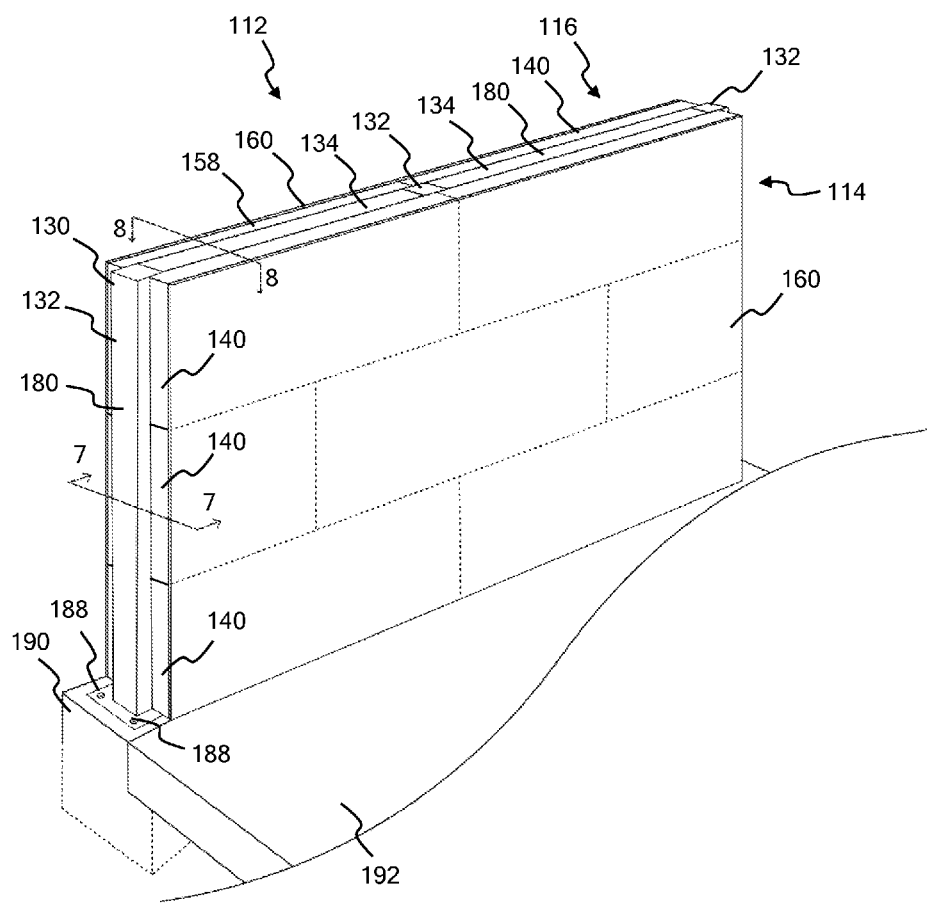
FIG. 8 shows a perspective view of core 158 with coating 160 according to the invention applied, creating building panel 112 of building panel structure 110 according to the invention.
Figure 10:
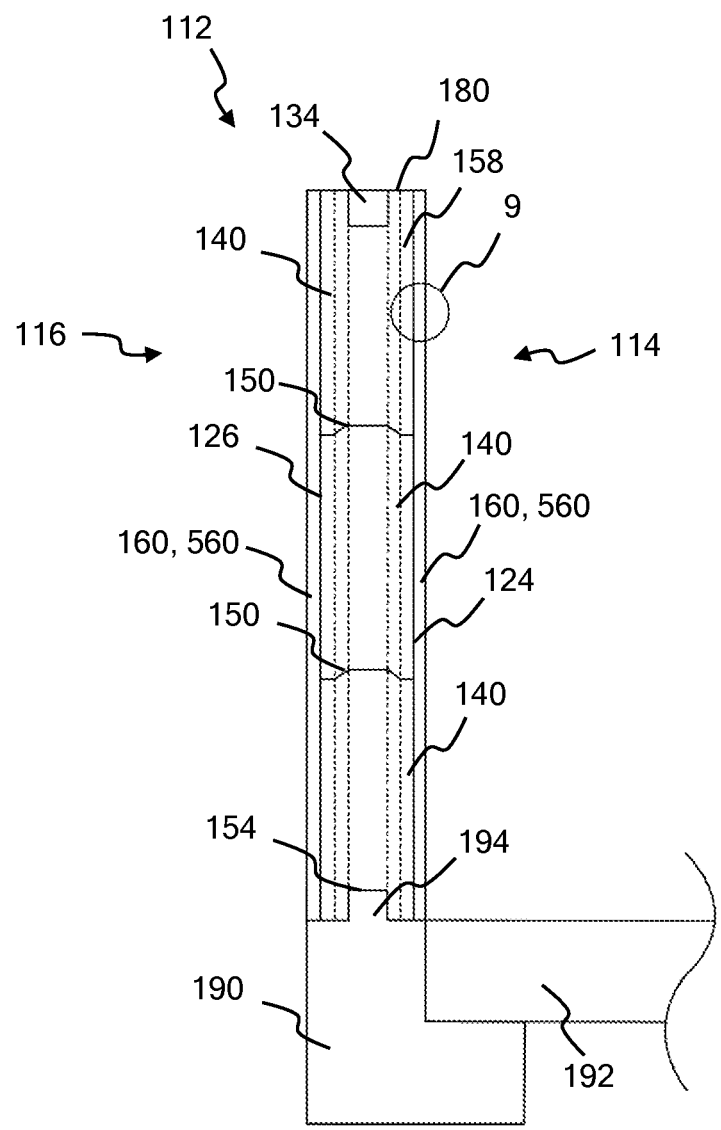
FIG. 10 shows vertical cross-section 8-8 of building panel 112 of FIG. 8.

Coating 160 covers a portion of core 158 to create building panel 112 of composite building panel structure 110 according to the invention as shown in FIG. 1 through FIG. 3 and FIG. 8 through FIG. 10. Coating 160 creates an outer surface on building panel 112 that is ready to accept exterior or interior finishing as desired and also contributes to the strength of building panel 112. FIG. 8 shows a perspective view of core 158 with coating 160 applied, creating a portion of building panel structure 110 of FIG. 1 that includes building panel 112 according to the invention. FIG. 9 shows horizontal cross section 7-7 of building panel 112 of FIG. 8. FIG. 10 shows vertical cross section 8-8 of building panel 112 of FIG. 8. Coating 160 can take many different forms. In some embodiments other coatings according to the invention are used instead of coating 160. FIG. 11 through FIG. 16 show close-up cross-sections of embodiments of coating 160 according to the invention, taken at section 9 of FIG. 10. FIG. 17 through FIG. 21 show a cross-sections of coating 560 according to the invention that can be used on building panel 112 according to the invention in place of coating 160, or in addition to coating 160.

Core 158 according to the invention has a portion covered by a coating. This document provides examples of the different coatings according to the invention that can be used to coat core 158. Embodiments of coating 160 and coating 560 according to the invention are described in this document. It is to be understood that these coatings may be used interchangeably. It is to be understood that these coatings as described are examples only and many other embodiments of coating 160 and coating 560 can be formed according to the invention.

Coating 160 of FIG. 3 and FIG. 8 through FIG. 16 covers a portion of core 158. Coating 160 in the embodiments shown covers a portion of insulating structural blocks 140 of core 158. Coating 160 can cover a portion of insulating structural blocks 140 of core 158 for many different reasons. Coating 160 can cover a portion of core 158 to add strength to core 158. Coating 160 can cover a portion of core 158 to provide an aesthetically pleasing surface finish. Coating 160 can cover a portion of core 158 to provide a surface for accepting finish treatments such as paint, stucco, or other exterior finish treatments. Coating 160 can cover a portion of core 158 to create a layer of material which protects core 158 from weather, moisture, and other deteriorating elements. Coating 160 can cover a portion of core 158 to provide projectile or impact protection to building panel 112. Coating 160 can cover a portion of core 158 to provide protection from penetration of building panel 112. Penetration protection can include resistance to penetration by flying or moving objects created by wind, weather, war, natural, or man-caused events. For example, strong winds can cause items as simple as straw or wood pieces to penetrate building walls. Coating 160 can provide protection from this type of penetration. In addition, it is often desirable to protect a building from penetration by projectiles such as bullets. Coating 160 can include projectile protection layers that resist penetration and/or impact.

Coating 160 can cover a portion of core 158 to provide protection and/or shielding from various forms of radiation, including electromagnetic radiation, radioactive radiation, or other types of signals or radiation that travel through the atmosphere and that can be damaging to inhabitants of a building or structure. Coating 160 can include radiation blocking layers that minimize or eliminate the transfer of radiation through building panel 112. Coating 160 can also provide sound attenuating characteristics to building panel 112. In some embodiments coating 160 includes elements, structures, or materials that provide radio frequency shielding. In some embodiments coating 160 includes carbon fibers, carbon nanotubes, or carbon nanostructures. In some embodiments coating 160 includes elements, structures, or materials that provide electromagnetic interference shielding. In some embodiments coating 160 includes elements, structures, or materials that provide electromagnetic radiation shielding or attenuation. In some embodiments coating 160 includes elements, structures, or materials that provide electromagnetic pulse shielding.

In some embodiments coating 160 covers exterior surfaces of structure 110. In some embodiments coating 160 covers interior surfaces of structure 110. In some embodiments coating 160 covers front or back surfaces of core 158. In some embodiments coating 160 covers edge surfaces of core 158. Coating 160 can cover any surface of core 158 or a portion of any surface of core 158. In the embodiment shown in FIG. 1 through FIG. 16, coating 160 covers front surface 124 of core 158 to create first surface 114 of building panel 112. In the embodiment shown in FIG. 1 through FIG. 16, coating 160 covers rear surface 126 of core 158 to create second surface 116 of building panel 112. In this way building panel 112 includes core 158 and coating 160 covering at least a portion of core 158. In this way building panel 112 includes core 158 and coating 160 covering at least a portion of front surface 124 or rear surface 126 of core 158.

FIG. 11 through FIG. 16 show cross-sections of embodiments of coating 160 according to the invention. In these embodiments coating 160 forms a cementitious membrane which provides structural strength to building panel 112 as well as providing a layer impervious to water and weather, and a layer that is ready to accept final exterior or interior finishes such as paint, stucco, or other finishes.

Figure 11:
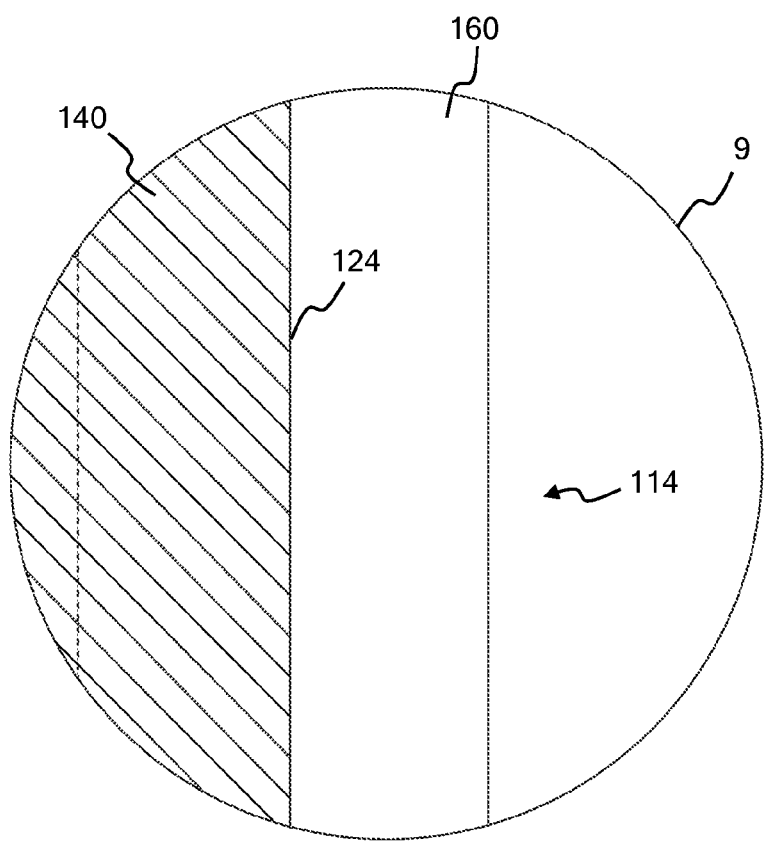
FIG. 11 shows a close-up cross-section of one embodiment of coating 160 according to the invention taken at section 9 of FIG. 10.

In the embodiment of coating 160 shown in FIG. 11, coating 160 is a single layer of a cementitious mixture. Cement as is used in this document typically refers to Portland cement or other cementitious binder material such as what is used to form concrete. In some embodiments coating 160 includes cement and acrylic bonder. Acrylic bonder as used in this document refers to a synthetic thermoplastic resin, binder, or bonder that is often formed of an acrylic polymer. Acrylic bonder helps the cementitious mixture adhere well to the EPS foam insulating structural block, as well as binding together the materials in coating 160.

In some embodiments coating 160 includes aggregate. Aggregate adds strength to coating 160 and helps coating 160 provide concrete-type characteristics including strength and resistance to penetration. The aggregate can be many different materials. Varying the aggregate material allows the tuning of the characteristics of coating 160. An aggregate of vermiculite, perlite, or other thermal filter material allows coating 160 to have high thermal resistance. In some embodiments other materials which give coating 160 high thermal resistance are used in coating 160. An aggregate of ceramic makes coating 160 reflect heat and sunlight, helping building panel 112 to resist heat absorption. In some embodiments other materials which give coating 160 high thermal reflectance are used in coating 160. Other types of aggregate can be used to add strength and other characteristics to coating 160. In some embodiments other materials which give coating 160 high thermal emittance are used in coating 160. High thermal emittance means coating 160 will tend to emit any heat that it absorbs, which contributes to keeping coating 160 and building panel 112 cool. In some embodiments coating 160 is formed of a plaster mixture. In some embodiments coating 160 is formed of a gypsum plaster mixture.

In some embodiments coating 160 includes cement and ceramic. In some embodiments coating 160 includes cement and aggregate. In some embodiments the aggregate is or includes the ceramic material. In some embodiments coating 160 includes Portland cement and ceramic. In some embodiments coating 160 is a non-cementitious mixture that includes ceramic. In some embodiments coating 160 includes Portland cement, acrylic bonder, and a ceramic aggregate. In some embodiments coating 160 includes cement, acrylic bonder, fiberglass strands, and a ceramic aggregate. In some embodiments coating 160 includes cement, acrylic bonder, fiberglass strands, a fiberglass mesh, and a ceramic aggregate. Ceramic included in coating 160 provides a layer that reflects heat and sunlight from coating 160, which allows coating 160 and building panel 112 to remain cool.

In some embodiments coating 160 includes strands of reinforcing material. Strands of reinforcing material increase the strength and resistance to breaking and cracking of coating 160. In some embodiments the strands of reinforcing material are fiberglass strands. In some embodiments the strands of reinforcing material are cotton strands. In some embodiments the strands of reinforcing material are metal or plastic strands. In some embodiments the strands of reinforcing material are wood or other fibrous material strands. The strands of reinforcing material can be any material that either makes coating 160 have a stronger flex or shear strength, and/or keep coating 160 from cracking.

In some embodiments coating 160 includes a mesh of a material. The mesh can be for many different purposes. In some embodiments coating 160 includes a reinforcing mesh structure. The reinforcing mesh structure adds strength and resistance to cracking to coating 160. In some embodiments coating 160 includes a fiberglass mesh. In some embodiments coating 160 includes a cotton mesh. Fiberglass and cotton, as well as other plastic or Kevlar meshes, for example, provide structural reinforcement to coating 160. In some embodiments coating 160 includes a metal mesh. A metal mesh can provide radiation shielding characteristics to coating 160. A metal mesh can provide electromagnetic attenuation properties to coating 160. A metal mesh can also be connected to electronic processors, electrical conductors, and powered electronics to provide active electronic processing properties to coating 160. In other words, coating 160 can be made to carry electricity and be a part of an electronic processing structure. This can be useful for many different reasons, such as electronically sensing the characteristics of a building panel 112, for heating or cooling building panel 112, for improving the electrical attenuation or amplification properties of building panel 112, for distribution of energy throughout building panel 112, or any other electronic processing capabilities. Coating 160 can include many types of mesh materials for different purposes.

In some embodiments coating 160 includes thermal filters for increasing the thermal efficiency of coating 160, which helps building panel 112 to resist heat transfer. In some embodiments coating 160 includes penetration-resistant materials, layers, or structures such as one or more than one projectile or ammunition-resistant material or structure. In some embodiments coating 160 includes radiation blocking or inhibiting layers, materials, components, or structures. In some embodiments coating 160 includes a layer, component or structure formed of lead. In some embodiments coating 160 includes sound attenuating or inhibiting layers, materials, components, or structures. In some embodiments coating 160 includes carbon fibers, carbon nanotubes, or carbon nanostructures. In some embodiments coating 160 includes elements, structures, or materials that provide radio frequency shielding. In some embodiments coating 160 includes elements, structures, or materials that provide electromagnetic interference shielding. In some embodiments coating 160 includes an electromagnetic shield material.

In some embodiments coating 160 includes structures, elements, layers or materials that provide protection from penetration such as from flying objects or projectiles. In some embodiments coating 160 includes elements, structures, or materials that prevent projectiles from piercing coating 160. These elements, structures, or materials are called projectile-resistant materials and they prevent bullets or other projectiles from penetrating coating 160. In some embodiments projectile-resistant materials are a mesh such as a fiberglass or Kevlar mesh. In some embodiments projectile-resistant materials are carbon nanostructures. In some embodiments projectile-resistant materials are a lead or steel or other metal material. In some embodiments projectile-resistant materials are the aggregate, such as when lead or steel nodules are used as the aggregate in the mixture, for example but not by way of limitation. In some embodiments projectile-resistant materials are other structures or materials that prevent penetration from a projectile. These impact-protective elements can provide protection to inhabitants in dangerous areas from projectiles or from flying objects caused by extreme weather or accidents, for example. The protective projectile-resistant materials can be man-made or natural, and can take the form of layers of mesh, layers of metal, polymer, plastic, acrylic, carbon fibers, carbon nanotubes, or other materials, or other forms.

In some embodiments coating 160 includes structures, elements, layers or materials that provide sound attenuation or blockage. Sound attenuation materials work as sound-deadening elements that can provide protection to inhabitants from explosions, machinery, vehicles, or other loud noise-generators. These sound-deadening or sound attenuation materials can be man-made or natural, and can take the form of layers of mesh, layers of metal, carbon fibers, carbon nanotubes, polymer, plastic, acrylic, or other materials, or other forms. In some embodiments the sound-deadening materials form anechoic devices or layers.

In some embodiments coating 160 includes structures, elements, layers or materials that provide radiation attenuation or blockage. The radiation blocked or attenuated can take many forms, including electromagnetic radiation, electromagnetic pulses, radio frequency radiation, optical radiation, x-rays, nuclear radiation, radioactive radiation, or other types of radiation. These radiation attenuation materials can provide protection to inhabitants from explosions, accidents at power generating stations, acts of war, electromagnetic pulses, or acts of God. These radiation-shielding layers or materials can be man-made or natural, and can take the form of layers of mesh, layers of metal, carbon fibers, carbon nanotubes, carbon nanostructures, one or more layers of lead, polymer, plastic, acrylic, gel, or other materials, or other forms. In some embodiments the radiation attenuation materials form an element that reflects certain types of radiation. In some embodiments the radiation attenuation materials form an element that absorbs certain types of radiation. In some embodiments the radiation attenuation materials form an element that provides electromagnetic shielding. In some embodiments coating 160 includes elements, structures, or materials that provide radio frequency shielding. In some embodiments coating 160 includes elements, structures, or materials that provide electromagnetic interference shielding.

In some embodiments coating 160 includes structures, elements, layers or materials that provide chemical attenuation or blockage. The chemicals blocked or attenuated can take many forms, natural or man-made. These chemical attenuating or blocking materials can provide protection to inhabitants from explosions, accidents at power generating stations, acts of war, or acts of God. These layers can be man-made or natural, and can take the form of layers of mesh, layers of metal, carbon fibers, polymer, plastic, acrylic, gel, or other materials, or other forms. In some embodiments the chemical-blocking materials form an element that absorbs certain types of chemicals.

Figure 12:
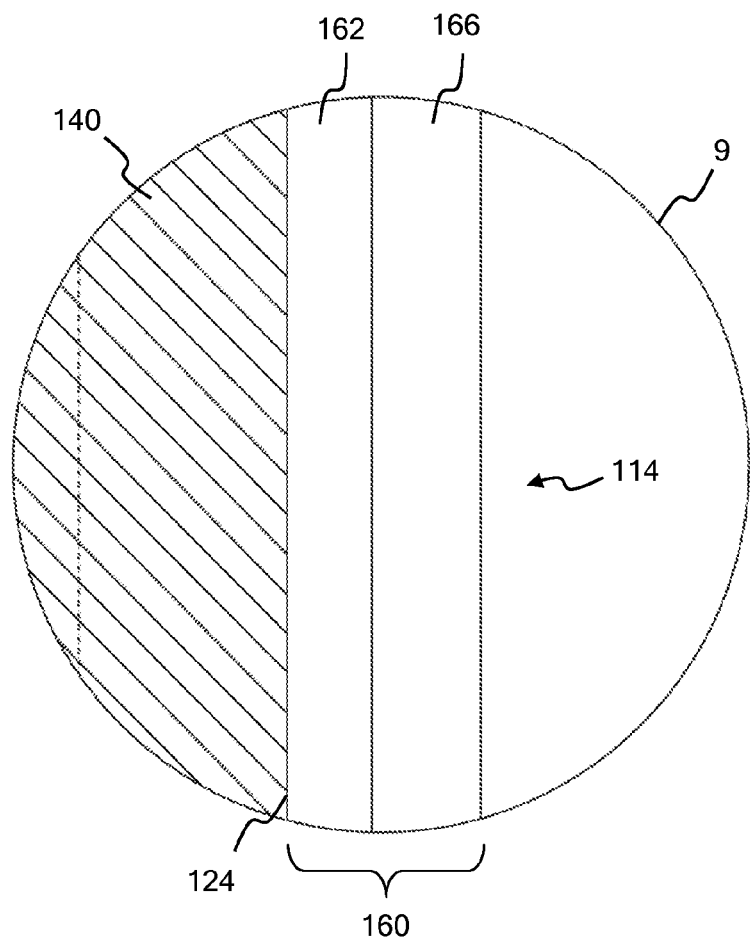
FIG. 12 shows a close-up cross-section of another embodiment of coating 160 according to the invention taken at section 9 of FIG. 10.

In the embodiment shown in FIG. 12, coating 160 is formed of inner scratch layer 162 (also called scratch layer 162) and outer main brown layer 166 (also called main brown layer 166). Dividing coating 160 into two or more layers allows different layers to be optimized for different purposes. One layer can reflect hear, for instance, while another slows down heat transfer, or blocks radiation, for example but not by way of limitation. Inner scratch layer 162 contributes to the structural strength of coating 160, forming an interface between building panel core 158 and outer main brown layer 166. A scratch layer is also a layer that adheres well to core 158 and provides a base for further layers, such as outer main brown layer 166, to adhere to. Scratch layer 162 can be formed of many different components or mixtures or layers. In some embodiments scratch layer 162 is formed of a plaster mixture. In some embodiments scratch layer 162 is formed of a gypsum plaster mixture. In some embodiments scratch layer 162 is formed of a non-cementitious mixture. In some embodiments scratch layer 162 is formed of a cementitious mixture. In some embodiments scratch layer 162 includes Portland cement and ceramic. In some embodiments scratch layer 162 includes Portland cement, acrylic bonder, and a ceramic aggregate. In some embodiments scratch layer 162 includes Portland cement, acrylic bonder, fiberglass strands, and a ceramic aggregate. In some embodiments scratch layer 162 includes Portland cement, acrylic bonder, fiberglass strands, a fiberglass mesh, and a ceramic aggregate. Ceramic included in inner scratch layer 162 provides a thermal barrier, preventing heat transfer into and out of building panel core 158.

Scratch layer 162 can include any of the elements structures, or materials discussed earlier with respect to the elements and materials that can be included in coating 160. In some embodiments scratch layer 162 includes a fiberglass mesh. In some embodiments scratch layer 162 includes thermal filters for fire resistance. In some embodiments scratch layer 162 includes penetration-resistant materials, layers, or structures such as one or more than one projectile or ammunition-resistant material or structure. In some embodiments scratch layer 162 includes radiation blocking or inhibiting layers, materials, components, or structures. In some embodiments inner scratch layer 162 includes a layer, component or structure formed of lead. In some embodiments scratch layer 162 includes sound attenuating or inhibiting layers, materials, components, or structures. In some embodiments scratch layer 162 includes carbon fibers, carbon nanotubes, or carbon nanostructures. In some embodiments scratch layer 162 includes elements, structures, or materials that provide radio frequency shielding. In some embodiments scratch layer 162 includes elements, structures, or materials that provide electromagnetic interference shielding. In the embodiment of coating 160 shown in FIG. 12 through FIG. 16, scratch layer 162 is a cementitious mixture. Scratch layer 162 can be any type or form of cementitious mixture. In some embodiments scratch layer 162 includes one or more than one piece of fiberglass mesh. In some embodiments scratch layer 162 is formed of multiple layers (see FIG. 16 for an example of a multiple-layer scratch layer 162).

Main brown layer 166 can include any of the elements structures, or materials discussed earlier with respect to the elements and materials that can be included in coating 160. Outer main brown layer 166 is a cementitious mixture in this embodiment. Outer main brown layer 166 can be any type of form of cementitious mixture. In some embodiments main brown layer 166 includes one or more than one piece of fiberglass mesh. In some embodiments main brown layer 166 includes cement and ceramic. In some embodiments main brown layer 166 includes a cementitious mixture and ceramic. In some embodiments main brown layer 166 includes cement, acrylic bonder, and ceramic. In some embodiments main brown layer 166 includes cement, acrylic bonder, aggregate, and ceramic. In some embodiments main brown layer 166 includes cement, acrylic bonder, and a ceramic aggregate. In some embodiments main brown layer 166 includes cement, acrylic bonder, fiberglass strands, and ceramic. In some embodiments main brown layer 166 includes cement, acrylic bonder, fiberglass strands, ceramic, and aggregate. In some embodiments main brown layer 166 includes cement, acrylic bonder, fiberglass strands, and a ceramic aggregate. In some embodiments main brown layer 166 includes Portland cement, acrylic bonder, fiberglass strands, a fiberglass mesh, and a ceramic aggregate. A ceramic material included in main brown layer 166 provides a thermal barrier, preventing heat from being absorbed or transferred into building panel core 158.

In some embodiments main brown layer 166 is formed of multiple layers. In some embodiments main brown layer 166 includes cement, aggregate, and fiberglass mesh. In some embodiments main brown layer 166 includes cement, aggregate, and acrylic bonder. In some embodiments main brown layer 166 includes thermal filters for fire resistance. In some embodiments main brown layer 166 includes cement, aggregate, and fiberglass strands. In some embodiments main brown layer 166 includes cement, aggregate, acrylic bonder, and a fiberglass mesh. In some embodiments main brown layer 166 includes penetration-resistant materials, layers, or structures such as one or more than one projectile or ammunition-resistant material or structure. In some embodiments main brown layer 166 includes radiation blocking or inhibiting layers, materials, components, or structures. In some embodiments main brown layer 166 includes a layer, component or structure formed of lead. In some embodiments main brown layer 166 includes carbon fibers, carbon nanotubes, or carbon nanostructures. In some embodiments main brown layer 166 includes sound attenuating or inhibiting layers, materials, components, or structures.

Figure 13:
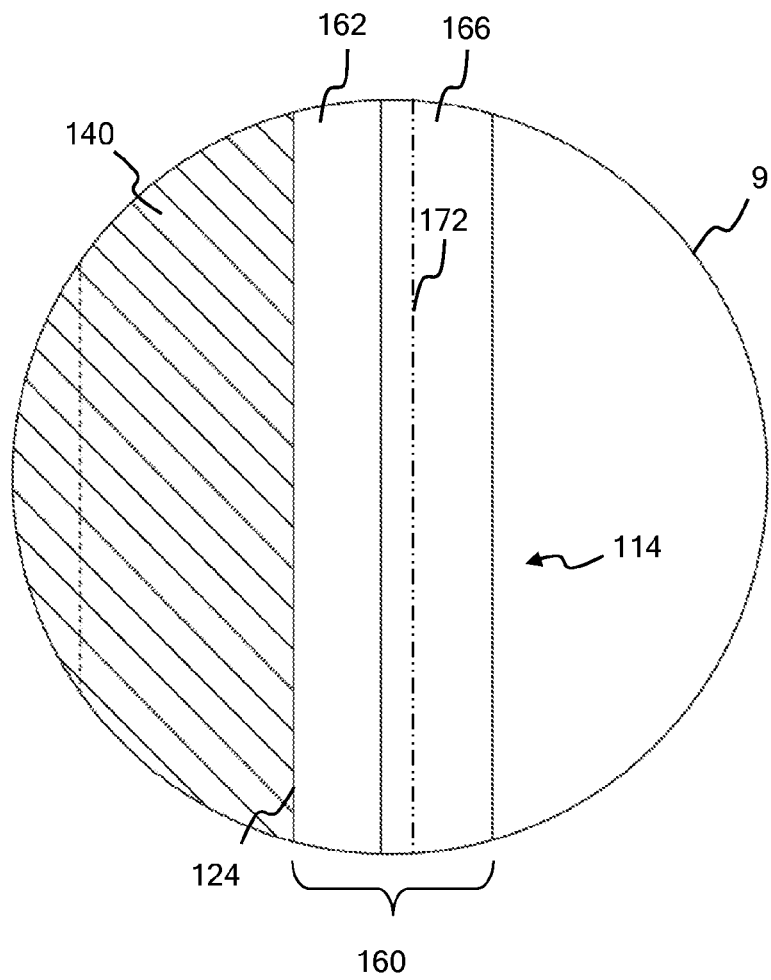
FIG. 13 shows a close-up cross-section of another embodiment of coating 160 according to the invention taken at section 9 of FIG. 10.

In some embodiments main brown layer 166 includes elements, structures, or materials that provide radio frequency shielding, coupling, or amplifying. In some embodiments main brown layer 166 includes elements, structures, or materials that provide electromagnetic interference shielding. For example, coating 160 as shown in FIG. 13 shows main brown layer 166 that includes electronic mesh structure 172. In some embodiments electronic mesh structure 172 is designed to protect from electromagnetic pulses, for example, or certain electromagnetic frequencies. Electronic mesh structure 172 can be used to prevent electromagnetic radiation from passing through coating 160. In some embodiments electronic mesh structure 172 in adjacent building panels 112 are electronically coupled to form a Faraday cage around the interior of structure 110, protecting the contents of structure 110 from electromagnetic radiation or pulses or static. In some embodiments electronic mesh structure 172 is designed to act as an antenna or amplifier for certain electromagnetic frequencies. Electronic mesh structure 172 can be designed to block certain electromagnetic frequencies, attenuate certain electromagnetic frequencies, amplify certain electronic frequencies, or perform modification or conditioning of electromagnetic energy that is incident on building panel 112. In some embodiments electronic mesh structure 172 conducts electricity throughout building panel 112 or from one building panel 112 to another. In some embodiments electronic mesh structure 172 is electrically coupled to electronic processors or semiconductor chips. Electronic mesh structure 172 is shown in main brown layer 166, but electronic mesh structure 172 can be included in any coating layer, such as single-layer coating 160 as shown in FIG. 11, or in scratch layer 162, or any of the other coatings or layers used to cover a portion of core 158.

Figure 14:
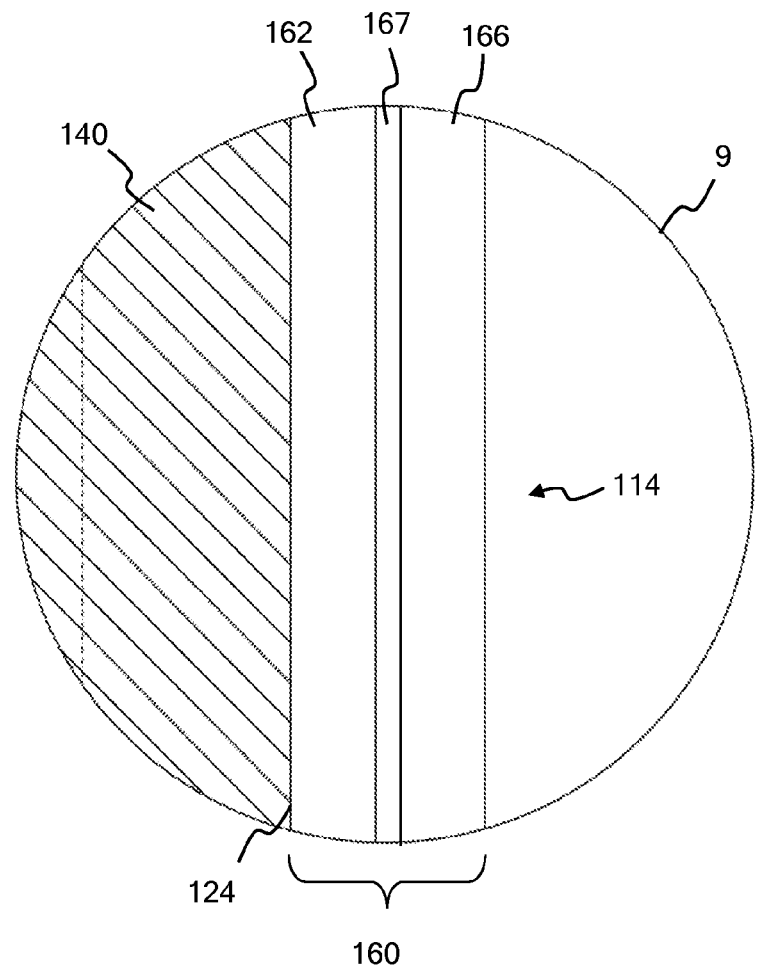
FIG. 14 shows a close-up cross-section of another embodiment of coating 160 according to the invention taken at section 9 of FIG. 10.
Figure 15:
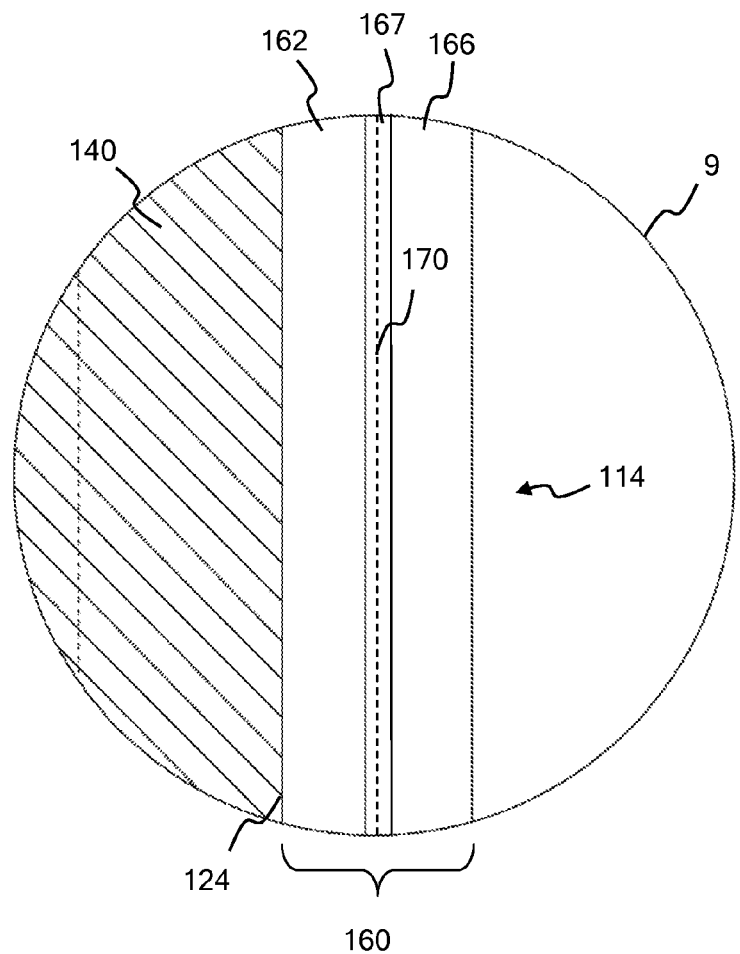
FIG. 15 shows a close-up cross-section of another embodiment of coating 160 according to the invention taken at section 9 of FIG. 10.

FIG. 14 and FIG. 15 show additional embodiments of coating 160 according to the invention. Coating 160 as shown in FIG. 14 and FIG. 15 are the same or similar to coating 160 shown in FIG. 12, except that coating 160 as shown in FIG. 14 and FIG. 15 include non-cementitious layer 167 embedded in coating 160. In these embodiments, non-cementitious layer 167 is between scratch layer 162 and main brown layer 166, but this is not meant to be limiting. Non-cementitious layer 167 can be adjacent any of the layers of coating 160 according to the invention. Non-cementitious layer 167 does not include cement. In the embodiments shown in FIG. 14 and FIG. 15, non-cementitious layer 167 is ceramic layer 167. In FIG. 15, ceramic layer 167 is composed of a ceramic material and fiberglass mesh 170. In some embodiments non-cementitious layer 167 is lead. In some embodiments non-cementitious layer 167 is plastic. Non-cementitious layer 167 can be any material or mixture that does not include cement. Non-cementitious layer 167 can be a carbon mixture or structure. Non-cementitious layer 167 can be formed of wood, plastic, metal, or other natural or man-made material, radiation shielding, EMI shielding, RFI shielding, ballistic armor layer or layers, or any combination of these or other elements that does not include cement.

Ceramic layer 167 is advantageous for use in coating 160 because ceramic layer 167 reflects and radiates heat, not allowing heat to transmit through building panel 112. Thus ceramic layer 167 provides thermal shielding and structural support to building panel 112.

Figure 16:
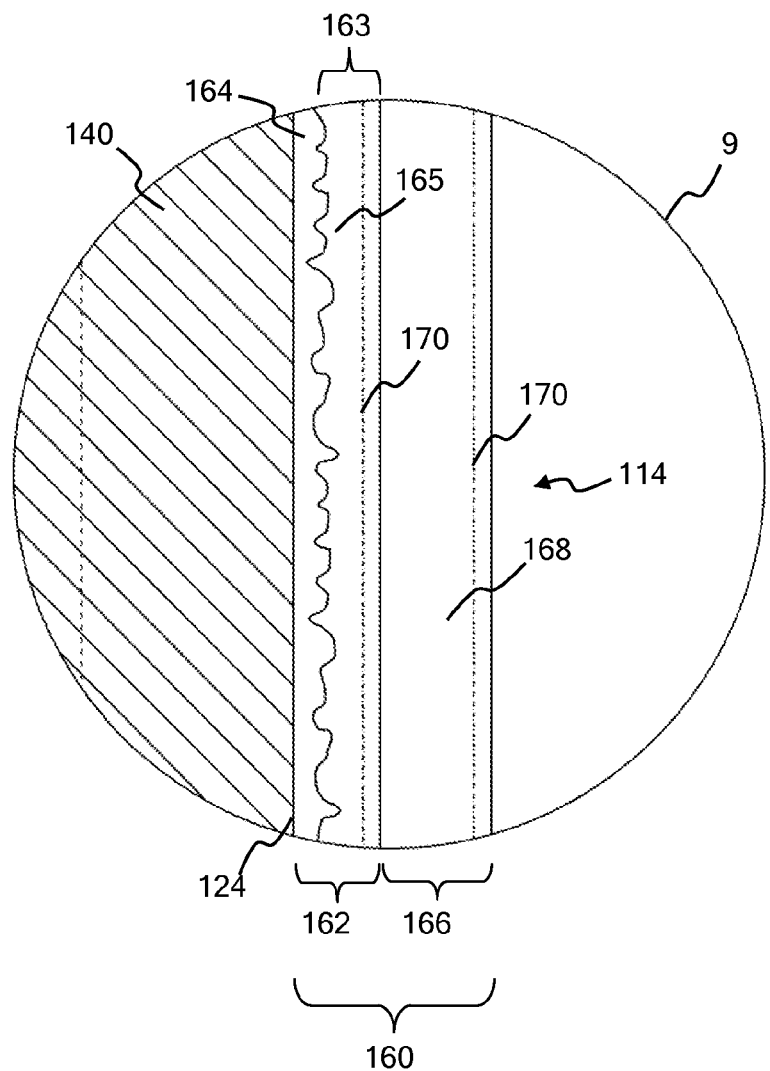
FIG. 16 shows a close-up cross-section of another embodiment of coating 160 according to the invention taken at section 9 of FIG. 10.

FIG. 16 shows a further embodiment of coating 160 according to the invention, where coating 160 includes two layers. In the embodiment shown in FIG. 16, coating 160 is formed of inner scratch layer 162 and outer main brown layer 166. Scratch layer 162 can include any of the materials, elements, or structures discussed in this document as possible constituents of a coating layer. Main brown layer 166 can include any of the materials, elements, or structures discussed in this document as possible constituents of a coating layer.

In some embodiments scratch layer 162 is formed of a plaster mixture. In some embodiments scratch layer 162 is formed of a gypsum plaster mixture. In some embodiments scratch layer 162 is formed of a cementitious mixture. In some embodiments scratch layer 162 includes a fiberglass mesh.

In some embodiments scratch layer 162 is a non-cementitious mixture. In some embodiments scratch layer 162 includes Portland cement and ceramic. In some embodiments scratch layer 162 includes Portland cement, acrylic bonder, and a ceramic aggregate. In some embodiments inner scratch layer 162 includes Portland cement, acrylic bonder, fiberglass strands, and a ceramic aggregate. In some embodiments scratch layer 162 includes Portland cement, acrylic bonder, fiberglass strands, a fiberglass mesh, and a ceramic aggregate. A ceramic material included in scratch layer 162 provides a thermal barrier, preventing heat from being absorbed by inner scratch layer 162, or transferred into building panel core 158 through inner scratch layer 162.

In the embodiment of coating 160 shown in FIG. 16, scratch layer 162 is a cementitious mixture that can be formed from many different components, as discussed above. In some embodiments scratch layer 162 is formed of cement, aggregate, and an acrylic bonder. In some embodiments scratch layer 162 includes a wire mesh embedded in the cementitious mixture. In some embodiments scratch layer 162 includes penetration-resistant materials, layers, or structures such as one or more than one projectile or ammunition-resistant material or structure. In some embodiments scratch layer 162 includes radiation blocking or inhibiting layers, materials, components, or structures. In some embodiments inner scratch layer 162 includes a layer, component or structure formed of lead. In some embodiments scratch layer 162 includes sound attenuating or inhibiting layers, materials, components, or structures. In some embodiments scratch layer 162 includes carbon fibers, carbon nanotubes, or carbon nanostructures. In some embodiments scratch layer 162 includes elements, structures, or materials that provide radio frequency shielding. In some embodiments scratch layer 162 includes elements, structures, or materials that provide electromagnetic interference shielding. In some embodiments scratch layer 162 is formed of other components. Further embodiments of inner scratch layer 162 will be discussed shortly.

Main brown layer 166 (also called outer main brown layer 166) can be formed of many different components or mixtures or layers, as discussed above. Main brown layer 166 can include any of the materials, elements, or structures discussed in this document as possible constituents of a coating layer. In some embodiments main brown layer 166 is formed of a plaster mixture. In some embodiments main brown layer 166 is formed of a gypsum plaster mixture. In some embodiments main brown layer 166 is formed of a cementitious mixture. In some embodiments main brown layer 166 is a non-cementitious mixture. In some embodiments main brown layer 166 includes Portland cement and ceramic. In some embodiments outer main brown layer 166 includes Portland cement, acrylic bonder, and a ceramic aggregate. In some embodiments main brown layer 166 includes Portland cement, acrylic bonder, fiberglass strands, and a ceramic aggregate. In some embodiments main brown layer 166 includes Portland cement, acrylic bonder, fiberglass strands, a fiberglass mesh, and a ceramic aggregate. A ceramic material included in outer main brown layer 166 provides a thermal barrier, preventing heat from being absorbed by main brown layer 166, or transferred into building panel core 158 through main brown layer 166. Ceramic included in main brown layer 166 provides a heat-reflecting layer, causing heat to be reflected off of main brown layer 166 instead of being absorbed by main brown layer 166.

In the embodiment of coating 160 shown in FIG. 16, main brown layer 166 is formed of brown mixture 168 and fiberglass mesh 170 embedded in brown mixture 168 while brown mixture 168 is still wet. Brown mixture 168 can take many different forms. In some embodiments brown mixture 168 is formed of a plaster mixture. In some embodiments brown mixture 168 is formed of a gypsum plaster mixture. In some embodiments brown mixture 168 is formed of a cementitious mixture. In the embodiment of coating 160 shown in FIG. 16, brown mixture 168 is a cementitious mixture made of cement, aggregate, acrylic bonder, and fiberglass strands. Brown mixture 168 components in this embodiment are mixed together with water to form a wet cementitious mixture, and applied over inner scratch layer 162 as a wet mixture. Often brown mixture 168 is trowelled onto scratch layer 162. Fiberglass mesh 170 is embedded in brown mixture 168 while it is still wet. In this way building panel 112 includes core 158, and coating 160 covering a portion of core 158, where coating 160 includes scratch layer 162 and main brown layer 166. Main brown layer 166 in the embodiment shown in FIG. 16 includes brown mixture 168 comprising cement, aggregate, acrylic bonder, and fiberglass strands; and fiberglass mesh 170. In some embodiments the aggregate in brown mixture 168 includes sand. In some embodiments the aggregate in brown mixture 168 includes ceramic. In some embodiments the aggregate in brown mixture 168 includes perlite. In some embodiments the aggregate in brown mixture 168 includes vermiculite. Perlite and vermiculite improve the fire-resistant qualities of building panel 112. Therefore perlite and/or vermiculite are used as aggregate in situations where a building panel structure 110 or a building panel 112 is required to possess stringent fire-resistant capabilities. Perlite and vermiculite also act as thermal filters, which increase the thermal efficiency of coating 160

In a particular embodiment brown mixture 168 is made by mixing together:
- 90 pounds of Portland cement (type 1 and 2)
- 90 pounds of 20 grit silica sand
- 90 pounds of 30 grit silica sand
- 1½ gallons of acrylic bonder, such as AC-100 from Dryvit
- 3 pounds of ¾" fiberglass strands
- 2½ gallons of potable water.

In this embodiment the brown mixture 168 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 168 as brown mixture 168 is applied to inner scratch layer 162 and while brown mixture 168 is still wet. This mixture has been found to provide superior structural integrity, water and weather protection, and a surface optimum for applying further finish coatings if desired. It is to be understood that brown mixture 168 can be made from other ingredients for specific structural uses.

The term acrylic bonder as used in this document refers to and includes all types of man-made binders, fillers and bonders such as urethane bonders, fillers and binders; polymer binders, fillers and bonders; copolymer binders, fillers and bonders; and other man-made or natural substances that perform the task of an acrylic bonder.

In some embodiments the fiberglass strands used in coatings according to the invention are replaced with other types of reinforcing fibers. In some embodiments synthetic fibers are used in place of or in addition to fiberglass strands. In some embodiments cellulosic fibers are used in place of or in addition to fiberglass strands. In some embodiments cotton fibers are used in place of or in addition to fiberglass strands. Cotton fibers provide the benefit of holding water in the coating mixture, which aids in the curing process, resulting in stronger, higher-quality coatings. In some embodiments other types of organic fibers are used in place of or in addition to fiberglass strands. In some embodiments glass fibers, wood fibers, plastic fibers, metal fibers, ceramic fibers, or other types of reinforcing fibers are used in place of or in addition to fiberglass strands. The fiberglass strands and/or other types of reinforcing strands described herein are used to provide strength and resistance to breaking and cracking to the coating. In addition, the fiberglass and/or other types of reinforcing strands aid in reducing slump and microcracking of the coating mixture in the first few days after application. The fiberglass strands in coatings according to the invention can be replaced with any type of strand or element that provides reinforcement and strength to withstand fracturing and breaking, or that controls mixture slump and microcracking.

In some embodiments the fiberglass mesh used in coatings according to the invention are replaced with other types of a reinforcing mesh structure. In some embodiments a fabric mesh is used in place of the fiberglass mesh in coatings according to the invention. In some embodiments a cellulosic fiber mesh is used in place of the fiberglass mesh in coatings according to the invention. In some embodiments a cotton or other type of organic matrix mesh is used in place of the fiberglass mesh in coatings according to the invention. Cotton fiber mesh provides the benefit of holding water in the coating mixture, which aids in the curing process, resulting in stronger, higher-quality coatings. In some embodiments a synthetic mesh is used in place of the fiberglass mesh in coatings according to the invention. In some embodiments a polymer or copolymer mesh is used in place of the fiberglass mesh in coatings according to the invention. In some embodiments a urethane mesh is used in place of the fiberglass mesh in coatings according to the invention. In some embodiments a matrix or mesh made of glass, wood, plastic, metal, ceramic, or other types of reinforcing material is used in place of or in addition to fiberglass mesh. The fiberglass mesh and/or other types of reinforcing matrix or mesh described herein are used to provide the coating with strength and resistance to breaking, cracking, and penetration. In addition, the fiberglass and/or other types of reinforcing matrix or mesh aid in reducing slump and microcracking of the coating mixture in the first few days after application. The fiberglass mesh in coatings according to the invention can be replaced with any type of mesh that provides reinforcement and strength to withstand fracturing, breaking, and/or penetration, and/or to control coating mixture slump and microcracking.

Scratch layer 162 can be formed of many different components, as discussed earlier. In some embodiments scratch layer 162 is a cementitious mixture applied over a wire mesh. In some embodiments scratch layer 162 is made up of multiple layers. In the embodiment of coating 160 shown in FIG. 16, scratch layer 162 is formed of two layers, first scratch layer A 164 and second scratch layer B 163. First scratch layer A 164 is a "dash" scratch coat which in this embodiment is machine sprayed onto core 158 as a wet mixture. In some embodiments first scratch layer A 164 is applied using other means.

First scratch layer A 164 can be formed of many different components or mixtures or layers. First scratch layer A 164 can include any of the materials, elements, or structures discussed in this document as possible constituents of a coating layer. In some embodiments first scratch layer A 164 is formed of a plaster mixture. In some embodiments first scratch layer A 164 is formed of a gypsum plaster mixture. In some embodiments first scratch layer A 164 is formed of a cementitious mixture. In some embodiments first scratch layer A 164 includes a fiberglass mesh. In some embodiments first scratch layer A 164 includes Portland cement and ceramic. In some embodiments first scratch layer A 164 includes Portland cement, acrylic bonder, and a ceramic aggregate. In some embodiments first scratch layer A 164 includes Portland cement, acrylic bonder, fiberglass strands, and a ceramic aggregate. In some embodiments first scratch layer A 164 includes Portland cement, acrylic bonder, fiberglass strands, a fiberglass mesh, and a ceramic aggregate. A ceramic material included in first scratch layer A 164 provides a thermal barrier, preventing heat transfer into and out of building panel core 158.

In some embodiments first scratch layer A 164 includes penetration-resistant materials, layers, or structures such as one or more than one projectile or ammunition-resistant material or structure. In some embodiments first scratch layer A 164 includes radiation blocking or inhibiting layers, materials, components, or structures. In some embodiments first scratch layer A 164 includes a layer, component or structure formed of lead. In some embodiments first scratch layer A 164 includes sound attenuating or inhibiting layers, materials, components, or structures. In some embodiments first scratch layer A 164 includes carbon fibers, carbon nanotubes, or carbon nanostructures. In some embodiments first scratch layer A 164 includes elements, structures, or materials that provide radio frequency shielding. In some embodiments first scratch layer A 164 includes elements, structures, or materials that provide electromagnetic interference shielding. In the embodiment of coating 160 shown in FIG. 16, first scratch layer A 164 is a cementitious mixture made of cement, aggregate, and acrylic bonder. In some embodiments the aggregate includes sand. In some embodiments the aggregate includes perlite. In some embodiments the aggregate includes ceramic. In some embodiments the aggregate includes vermiculite. In a specific embodiment first scratch layer A 164 is formed by mixing together:

- 90 pounds of Portland cement (type 1 and 2)
- 90 pounds of 20 grit silica sand
- 90 pounds of 30 grit silica sand
- 2½ gallons of acrylic bonder, such as AC-100 from Dryvit.
- 2½ gallons of potable water.

In this embodiment the first scratch layer A 164 aggregate is made of two sizes of sand, 20 grit sand and 30 grit sand. This first scratch layer A 164 mixture has been found to adhere well to EPS foam block and provide a superior surface for accepting further layers of coating 160. It is to be understood that larger or smaller amounts of first scratch layer A 164 can be made by proportionately increasing or decreasing the ingredients. In some embodiments first scratch layer A 164 has other ingredients and proportions. Usually first scratch layer A 164 is allowed to cure (dry) before adding other layers.

Second scratch layer B 163 can be formed of many different components or mixtures or layers. Second scratch layer B 163 can include any of the materials, elements, or structures discussed in this document as possible constituents of a coating layer. In some embodiments second scratch layer B 163 is formed of a plaster mixture. In some embodiments second scratch layer B 163 is formed of a gypsum plaster mixture. In some embodiments second scratch layer B 163 is formed of a cementitious mixture. In some embodiments second scratch layer B 163 includes a fiberglass mesh. In some embodiments second scratch layer B 163 includes Portland cement and ceramic. In some embodiments second scratch layer B 163 includes Portland cement, acrylic bonder, and a ceramic aggregate. In some embodiments second scratch layer B 163 includes Portland cement, acrylic bonder, fiberglass strands, and a ceramic aggregate. In some embodiments second scratch layer B 163 includes Portland cement, acrylic bonder, fiberglass strands, a fiberglass mesh, and a ceramic aggregate. A ceramic material included in second scratch layer B 163 provides a thermal barrier, preventing heat transfer into and out of building panel core 158.

In some embodiments second scratch layer B 163 includes penetration-resistant materials, layers, or structures such as one or more than one projectile or ammunition-resistant material or structure. In some embodiments second scratch layer B 163 includes radiation blocking or inhibiting layers, materials, components, or structures. In some embodiments second scratch layer B 163 includes a layer, component or structure formed of lead. In some embodiments second scratch layer B 163 includes carbon fibers, carbon nanotubes, or carbon nanostructures. In some embodiments second scratch layer B 163 includes sound attenuating or inhibiting layers, materials, components, or structures. In some embodiments second scratch layer B 163 includes elements, structures, or materials that provide radio frequency shielding. In some embodiments second scratch layer B 163 includes elements, structures, or materials that provide electromagnetic interference shielding. In the embodiment of coating 160 shown in FIG. 16, second scratch layer B 163 is formed of brown mixture 165 and fiberglass mesh 170. Fiberglass mesh 170 is embedded in brown mixture 165 while brown mixture 165 is being trowelled or otherwise applied to first scratch layer A 164 and while brown mixture 165 is still wet. Brown mixture 165 can be trowelled onto the surface of first scratch layer A 164 or applied by any other means which will allow brown mixture 165 to cover first scratch layer A and mesh 170 to be embedded into brown mixture 165.

Brown mixture 165 can be formed of many different components or mixtures or layers. In some embodiment brown mixture 165 is formed of a plaster mixture. In some embodiments brown mixture 165 is the same mixture as brown mixture 168. In some embodiments brown mixture 165 is formed of a gypsum plaster mixture. In some embodiments brown mixture 165 is formed of a cementitious mixture. In some embodiments brown mixture 165 includes Portland cement and ceramic. In some embodiments brown mixture 165 includes Portland cement, acrylic bonder, and a ceramic aggregate. In some embodiments brown mixture 165 includes Portland cement, acrylic bonder, fiberglass strands, and a ceramic aggregate. In some embodiments brown mixture 165 includes Portland cement, acrylic bonder, fiberglass strands, a fiberglass mesh, and a ceramic aggregate. A ceramic material included in brown mixture 165 provides a thermal barrier, preventing heat transfer into and out of building panel core 158.

In the embodiment of coating 160 shown in FIG. 16, brown mixture 165 is a cementitious mixture made of cement, aggregate, acrylic bonder, and fiberglass strands. Brown mixture 165 components are mixed together with water to form a cementitious mixture, and applied to first scratch layer A 164 after first scratch layer A has cured. In some embodiments the aggregate in brown mixture 165 includes sand. In some embodiments the aggregate in brown mixture 165 includes perlite. In some embodiments the aggregate in brown mixture 165 includes vermiculite. In a particular embodiment brown mixture 165 is made by mixing together:

90 pounds of Portland cement (type 1 and 2)
90 pounds of 20 grit silica sand
90 pounds of 30 grit silica sand
1½ gallons of acrylic bonder, such as AC-100 from Dryvit
3 pounds of ¾" fiberglass strands
2½ gallons of potable water.

In this embodiment the brown mixture 165 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 165 while brown mixture 165 is still wet. This mixture has been found to provide superior structural integrity, water and weather protection, and a surface optimum for applying outer main brown layer 166. It is to be understood that brown mixture 165 can be made from other ingredients for specific structural uses. Usually second scratch layer B 163 is allowed to cure before adding other layers on top.

Coating 160, scratch layer 162, and main brown layer 166 can be made with many different thicknesses, depending on the specific use of building panel 112 and the structural strength needed. In some embodiments additional layers of scratch layer 162 and/or main brown layer 166 are added for additional strength. In some embodiments other layers are added. It is to be understood that finishing coatings are often applied to coating 160. These finishing coatings are applied for differing interior and exterior surface aesthetics and include paint, stucco, and other finishing layers and coatings.

In the embodiment shown in FIG. 16, scratch layer 162 is formed to be about ⅛" thick. Main brown layer 166 is formed to be about ¼" thick. When these layers cure, coating 160 provides a smooth surface for applying finish coatings, and is structurally very strong, energy efficient, and lightweight. Composite building panel 112 with core 158 and coating 160 has greater flex strength and shear strength than other block panels due to the structured composite layers of core 158 and coating 160. This specific embodiment is used for walls, roofs, and beams of buildings and structure. Additional layers and other thicknesses can be used according to the invention for building panel 112 to achieve different panel strengths and uses.

In some embodiments control joints are cut into core 158 before coating 160 is applied. Holes and openings for windows and doors, access channels, and passageways for facilities and air handling can be cut into core 158 to create building panel 112 of a size and shape for the structure to be built. Core 158 and coating 160 can be easily formed into any size and shape structure, resulting in a lightweight, energy efficient, strong building panel 112.

FIG. 17 through FIG. 21 show embodiments of coating 560 according to the invention that can be used on building panel 112 in place of coating 160, or in addition to coating 160. In some embodiments coating 560 covers a portion of core 158 of building panel 112 according to the invention instead of coating 160. In some embodiments coating 560 covers a portion of insulating structural block 140 of building panel 112. Coating 560 is similar to coating 160 except that in coating 560, inner scratch layer 562 and outer main brown layer 566 are interdigitated, as shown in FIG. 17 through 21. Coating 560 can include any of the materials, elements, structures and/or layers discussed in this document as possible constituents of a coating. Similar numbers in FIG. 17 through FIG. 21 are used to designate similar elements as used earlier to describe coating 160. Interdigitated means that inner scratch layer 562 (also called scratch layer 562) and outer main brown layer 566 (also called main brown layer 566) each have crests and valleys which interlock with each other. Inner scratch layer 562 and outer main brown layer 566 are interdigitated for a number of reasons. Forming inner scratch layer 562 with crests 572 and valleys 574 allows inner scratch layer 562 to be used as a screed for outer main brown layer 566. This helps to keep the thickness of coating 560 uniform across building panel 112. Scratch layer 562 can be formed with crests 572 of a certain height above core 158. The crests 572 are then used as a screed for main brown layer 566, ensuring that the overall thickness of coating 560 is uniform. In addition, interdigitating inner scratch layer 562 and outer main brown layer 566 adds to the strength and structural integrity of building panel 112.

Coating 560 can include any of the materials, elements, or structures discussed in this document as possible constituents of a coating layer. Coating 560 can include any of the materials, elements, structures, or layers discussed with regard to coating 160 and/or the individual layers of coating 160. In some embodiments coating 560 includes cement and ceramic. In some embodiments coating 560 includes cement, acrylic bonder, and a ceramic aggregate. In some embodiments coating 560 includes cement, acrylic bonder, fiberglass strands, and a ceramic aggregate. In some embodiments coating 560 includes cement, acrylic bonder, fiberglass strands, a fiberglass mesh, and a ceramic aggregate. A ceramic material included in coating 560 creates a thermal barrier layer, which helps coating 560 to prevent heat transfer into and out of building panel core 158.

In some embodiments coating 560 includes penetration-resistant materials, layers, or structures such as one or more than one projectile or ammunition-resistant material or structure. In some embodiments coating 560 includes radiation blocking or inhibiting layers, materials, components, or structures. In some embodiments coating 560 includes a layer, component or structure formed of lead. In some embodiments coating 560 includes carbon fibers, carbon nanotubes, or carbon nanostructures. In some embodiments coating 560 includes sound attenuating or inhibiting layers, materials, components, or structures. In some embodiments coating 560 includes elements, structures, or materials that provide radio frequency shielding. In some embodiments coating 560 includes elements, structures, or materials that provide electromagnetic interference shielding.

In the embodiment of coating 560 shown in FIG. 17 through FIG. 21, coating 560 includes inner scratch layer 562, where inner scratch layer 562 includes two layers, first scratch layer A 564 and second scratch layer B 563. First scratch layer A 564 is a cementitious mixture that includes fiberglass mesh 570 in this embodiment, as shown in FIG. 17 through FIG. 21. Scratch layer 562 in some embodiments is a single layer. Scratch layer 562 can include any of the materials, elements, or structures discussed in this document as possible constituents of a coating layer. Scratch layer 562 can include any of the materials, elements, structures, or layers discussed with regard to scratch layer 162 and/or the individual layers of scratch layer 162.

First scratch layer A 564 can include any of the materials, elements, or structures discussed in this document as possible constituents of a coating layer. First scratch layer A 564 can include any of the materials, elements, structures, or layers discussed with regard to first scratch layer A 164. In some embodiments first scratch layer A 564 includes fiberglass mesh 570. In some embodiments first scratch layer A 564 does not include fiberglass mesh 570. First scratch layer A 564 in some embodiments includes the same components as first scratch layer A 164 discussed earlier. In some embodiments first scratch layer A 564 has a different composition than first scratch layer A 164.

In some embodiments first scratch layer A 564 includes cement and a ceramic material. In some embodiments first scratch layer A 564 includes cement, acrylic bonder, and aggregate. In some embodiments first scratch layer A 564 includes cement, acrylic bonder, fiberglass strands, and aggregate. In some embodiments first scratch layer A 564 includes cement, acrylic bonder, fiberglass strands, a fiberglass mesh, and aggregate. In some embodiments the aggregate includes ceramic. A ceramic material included in first scratch layer A 564 provides a thermal barrier, preventing heat transfer into and out of building panel core 158.

In some embodiments first scratch layer A 564 includes penetration-resistant materials, layers, or structures such as one or more than one projectile or ammunition-resistant material or structure. In some embodiments first scratch layer A 564 includes radiation blocking or inhibiting layers, materials, components, or structures. In some embodiments first scratch layer A 564 includes a layer, component or structure formed of lead. In some embodiments first scratch layer A 564 includes carbon fibers, carbon nanotubes, or carbon nanostructures. In some embodiments first scratch layer A 564 includes sound attenuating or inhibiting layers, materials, components, or structures. In some embodiments first scratch layer A 564 includes elements, structures, or materials that provide radio frequency shielding. In some embodiments first scratch layer A 564 includes elements, structures, or materials that provide electromagnetic interference shielding.

Figure 17:
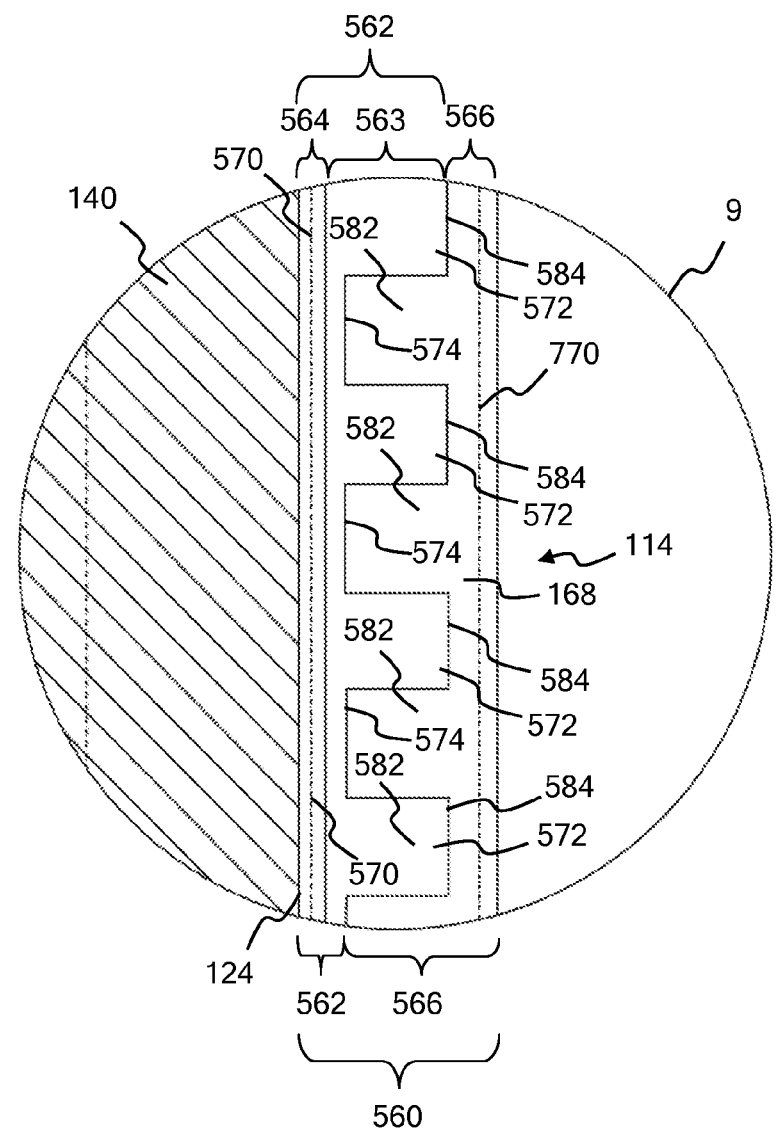
FIG. 17 shows a close-up cross-section of an embodiment of coating 560 according to the invention that can be used on building panel 112 of FIG. 10 instead of coating 160.
Figure 18:
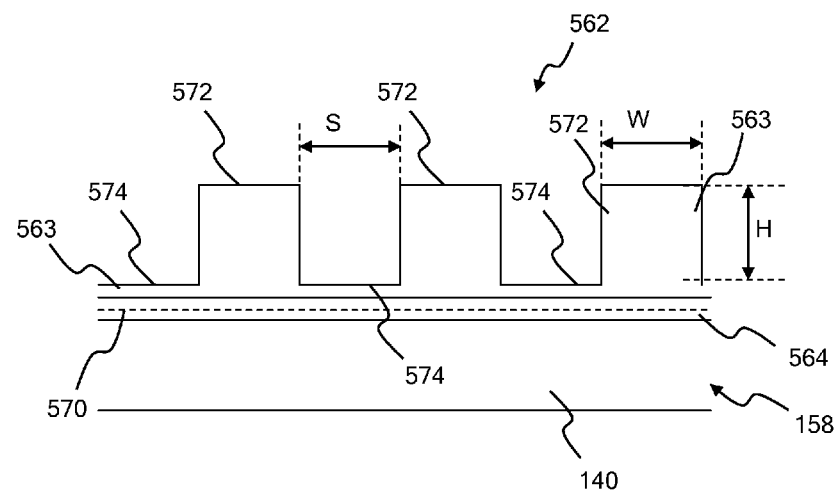
FIG. 18 shows a cross section of an embodiment of inner scratch layer 562 according to the invention, where second scratch layer B 563 has crests 572 and valleys 574.
Figure 19:
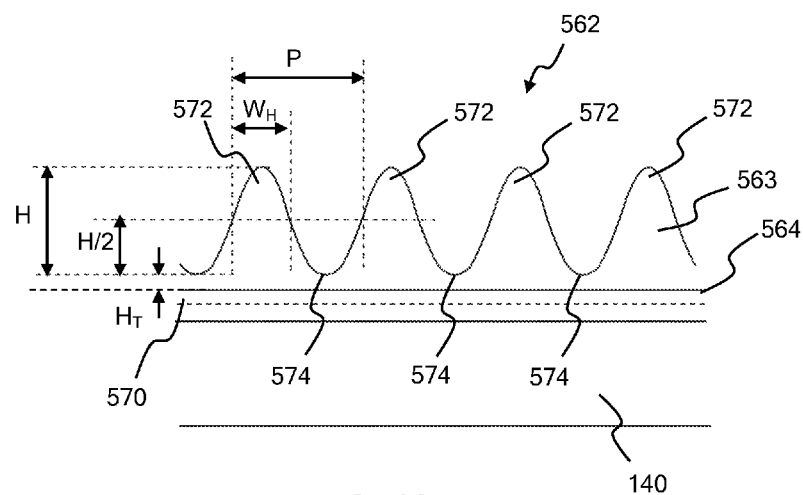
FIG. 19 shows scratch layer 562 of FIG. 18 after the wet scratch layer 562 coating mixture material has slumped and settled, which results in the rounding off of crests 572 and valleys 574 into more curvilinear shapes as shown in FIG. 19, and showing the height H, half-width $W_H$, and period P of crests 572.
Figure 20:
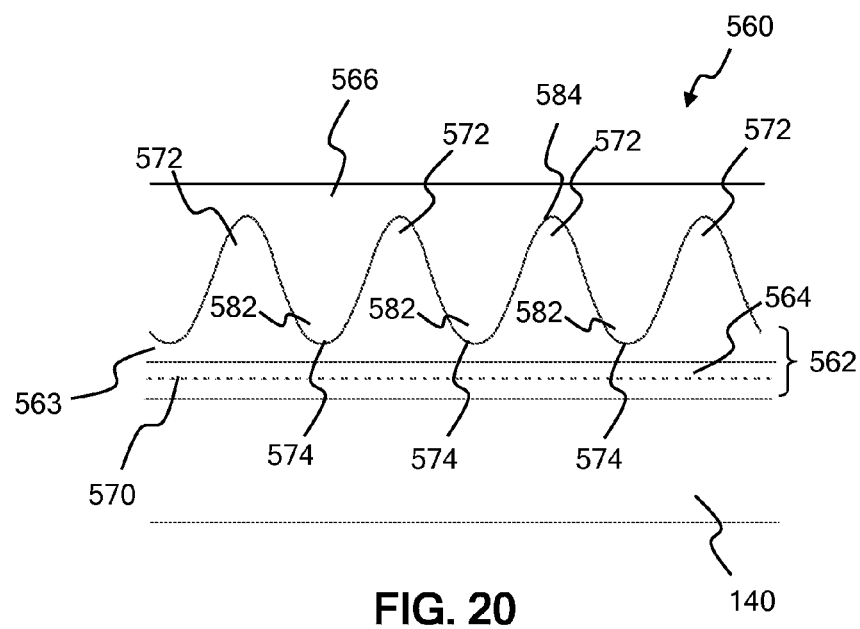
FIG. 20 shows a cross-section of an embodiment of coating 560 according to the invention, where main brown layer 566 has been applied over inner scratch layer 562 of FIG. 19.
Figure 21:
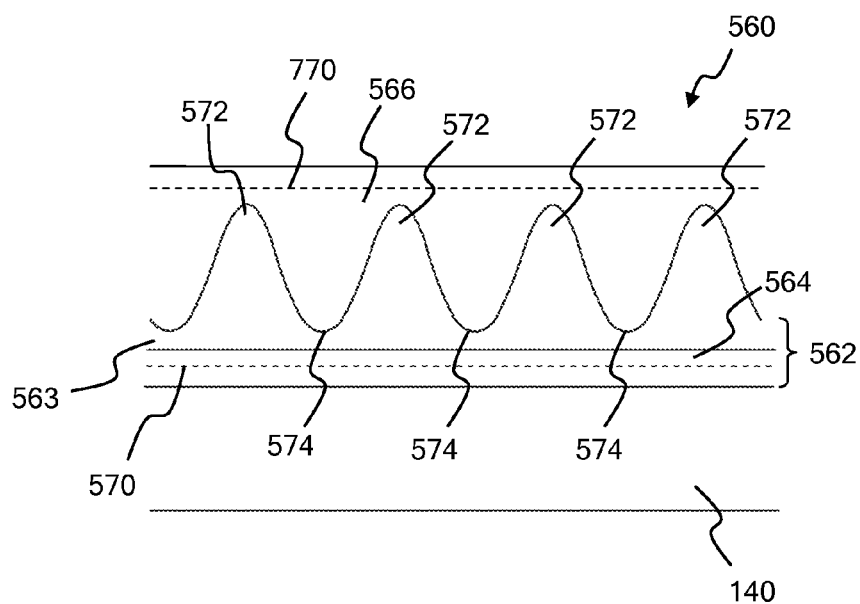
FIG. 21 shows a cross section of an embodiment of coating 560 according to the invention, where main brown layer 566 has been applied over scratch layer 562 of FIG. 19, and fiberglass mesh 770 has been embedded in main brown layer 566 while main brown layer 566 is still wet.

Second scratch layer B 563 can include any of the materials, elements, or structures discussed in this document as possible constituents of a coating layer. Second scratch layer B 563 can include any of the materials, elements, structures, or layers discussed with regard to second scratch layer B 163. Second scratch layer B 563 is a cementitious mixture that is formed such that it includes crests 572 and valleys 574 in the embodiment shown in FIG. 17 through FIG. 21. Crests 572 and valleys 574 are formed in second scratch layer B 563 by any number of methods, including trowelling second scratch layer B 563 with a shaped trowel while second scratch layer B 563 is still wet. It is to be understood, however, that crests 572 and valleys 574 can be formed in second scratch layer B 563 in many different ways. Second scratch layer B 563 is then allowed to cure (dry) before outer main brown layer 566 is applied. Second scratch layer B 563 is shaped with crests 572 and valleys 574 with special tools for compacting and shaping the second scratch layer B 563 mixture while it is still wet. These tools are described in more detail in U.S. patent application Ser. No. 61/721,175 filed Nov. 1, 2012 to John E. Propst. It is to be noted that these tools are not used to remove some of the wet mixture material as much as they are used to compress and shape the wet mixture material into crests 572 and valleys 574. Material is not removed from valleys 574, but instead the wet mixture material is compressed and shaped into crests 572 and valleys 574. Compressing the wet mixture material releases water from the material and allows it to cure faster and stronger. The resulting cured coating is stronger, with smooth curvilinear crests 572 and valleys 574. A smooth curvilinear surface resists cracking better than a surface that has been roughened or had material removed from it. Crests 572 are shaped with tools to have a smooth rectilinear shape as shown in FIG. 18, but as the material cures it slumps into crests 572 with a smooth curvilinear surface as shown in FIG. 19 through FIG. 21. Valleys 574 are shaped with tools to have a smooth rectilinear shape as shown in FIG. 18, but as the material cures it slumps into valleys 574 with a smooth curvilinear surface as shown in FIG. 19 through FIG. 21. In this embodiment crests 572 and valleys 574 cure into a smooth curvilinear shape that is an approximation of a sine wave, as shown in FIG. 19 through FIG. 21, but this particular smooth curvilinear shape is not the only shape that can be used.

FIG. 18 shows an example cross-section of scratch layer 562, where scratch layer 562 includes first scratch layer A 564 and second scratch layer B 563. In this embodiment second scratch layer B 563 includes crests 572 and valleys 574. In the embodiment shown in FIG. 18, the wet second scratch layer B 563 mixture is smoothed and shaped to have crests 572 in a rectilinear cross-section. In this embodiment crests 572 have a width W and height H, and valleys 574 form a spacing S between each crest 572. In some embodiments crests 572 are formed to have a width W of between about ⅛ inch and about ¾ inch. In some embodiments crests 572 are formed to have a width W of about ⅜ inch. Forming crests 572 with these sizes has been found to provide a coating layer with superior strength. In addition, crests 572 are then able to be a screed layer for outer main brown layer 566. In some embodiments crests 572 are formed to have a height H of between about ⅛ inch and about ¾ inch. In some embodiments crests 572 are formed to have a height H of about ⅜ inch. In some embodiments crests 572 are formed to have a spacing S of between about ⅛ inch and about ¾ inch. In some embodiments crests 572 are formed to have a spacing S of about ⅜ inch. Forming crests 572 and valleys 574 with these sizes has been found to provide a coating layer with superior strength and ability to withstand cracking, and to provide a strong base for main brown layer 566. Main brown layer 566 can be applied over second scratch layer B 563 with a uniform thickness over a wide area because crests 572 are used as a screed reference layer for main brown layer 566.

Crests 572 and valleys 574 when dry have a rounded or smooth curvilinear cross section as is shown in FIG. 18, due to slumping, settling, and smoothing of wet second scratch layer B 563 material as it dries, or cures. FIG. 19 through FIG. 21 show cross sections of embodiments of scratch layer 562 and coating 560 in which crests 572 and valleys 574 have a smooth curvilinear surface. A curvilinear surface is advantageous because it does not have points and sharp corners to crack, resulting in a stronger cured layer. FIG. 19 shows how the structure of crests 572 are measured in these embodiments, showing that crests 572 have height H and half width $W_H$. Half-width $W_H$ is the width $W_H$ of crests 572 measured between the two points where crest 572 is at half of its height, or H/2. Crests 572 also have period P, which is the repeating distance, or distance from any point to the point where the periodic structure repeats itself. Second scratch layer B 563 is shaped such that valleys 574 are height $H_T$ above first scratch layer A 564, as shown in FIG. 19. In other words valley 574 does not extend through second scratch layer B 563, but has a thickness $H_T$ of second scratch layer B 563 material between the bottom of each valley 574 and first scratch layer A 564. This is advantageous because it makes second scratch layer B 563 stronger due to second scratch layer B 563 being a continuous layer, as opposed to having lines of material that form the peaks 572, and valleys 574 extending through to first scratch layer A 564. Separate lines of material tend to break and crack at the junctions of the material. But these junctions do not exist in second scratch layer B 563 according to the invention. Second scratch layer B 563 material is applied in a thickness great enough to allow the shaping of peaks 572 and valleys 574 in second scratch layer B 563, while leaving valleys 574 a height $H_T$ above first scratch layer A 564. This method and geometry of forming first scratch layer A 564 and second scratch layer B 563 results in a structurally strong scratch layer 562 that resists cracking and breaking apart. In some embodiments height $H_T$ is greater than 1/16". In some embodiments height $H_T$ is greater than 1/8". In some embodiments height $H_T$ is greater than 3/16". In some embodiments height $H_T$ is greater than 1/4".

In some embodiments crests 572 have an average half width $W_H$ of between 1/16 inch and 3/4 inch once scratch layer 562 dries (cures). The average half-width $W_H$ is the average of the individual half-widths $W_H$ of a plurality of crests 572 formed in scratch layer 562. Any individual crest 572 may have other measurements due to defects or issues in forming or drying of inner scratch layer 562, but the measurements of each crest 572 is often fairly close and the average of their measurements provides a good measure of the size of the plurality of crests 572. In some embodiments crests 572 have an average half width $W_H$ of between 1/8 inch and 5/8 inch once scratch layer 562 dries. Forming crests 572 and valleys 574 with these sizes has been found to provide a coating layer with superior strength and ability to withstand cracking, and to provide a strong base for main brown layer 566.

In some embodiments crests 572 have an average period P of between 1/4 inch and 1 and 1/2 inch once inner scratch layer 562 dries. The average period P is the average of the individual periods P of a plurality of crests 572 formed in inner scratch layer 562. Any individual crest 572 may have other measurements due to defects or issues in forming or drying of inner scratch layer 562, but the measurements of each crest 572 is often fairly close and the average of their measurements provides a good measure of the size of the plurality of crests 572. In some embodiments crests 572 have an average period P of between 1/2 inch and 1 and 1/4 inch once scratch layer 562 dries. Forming crests 572 and valleys 574 with these sizes has been found to provide a coating layer with superior strength and ability to withstand cracking, and to provide a strong base for main brown layer 566.

In some embodiments second scratch layer B 563 includes cement and acrylic bonder. In some embodiments second scratch layer B 563 includes cement, acrylic bonder, and aggregate. In some embodiments the aggregate is ceramic. In some embodiments second scratch layer B 563 includes cement, acrylic bonder, fiberglass strands, and aggregate. In some embodiments second scratch layer B 563 includes cement, acrylic bonder, fiberglass strands, a fiberglass mesh, and aggregate. In some embodiments second scratch layer B 563 includes cement, acrylic bonder, fiberglass strands, a fiberglass mesh, ceramic, and aggregate. In some embodiments the cement included in second scratch layer B 563 is Portland cement. A ceramic material included in second scratch layer B 563 creates a second scratch layer B 563 that is a thermal barrier, such that heat is reflected off of second scratch layer B 563 and heat is prevented from transferring into and out of building panel core 158.

In some embodiments second scratch layer B 563 includes penetration-resistant materials, layers, or structures such as one or more than one projectile or ammunition-resistant material or structure. In some embodiments second scratch layer B 563 includes radiation blocking or inhibiting layers, materials, components, or structures. In some embodiments second scratch layer B 563 includes a layer, component or structure formed of lead. In some embodiments second scratch layer B 563 includes carbon fibers, carbon nanotubes, or carbon nanostructures. In some embodiments second scratch layer B 563 includes sound attenuating or inhibiting layers, materials, components, or structures. In some embodiments second scratch layer B 563 includes elements, structures, or materials that provide radio frequency shielding. In some embodiments second scratch layer B 563 includes elements, structures, or materials that provide electromagnetic interference shielding.

Main brown layer 566 can be applied over second scratch layer B 563 with a uniform thickness over a wide area because crests 572 are used as a screed reference layer for main brown layer 566, as shown in FIG. 20 and FIG. 21. A screed reference is a fixed height reference which the applicator can use to set the height of an applied coating mixture. Second scratch layer B 563 has been allowed to cure (dry), and so crests 572 are solid crests with a uniform height. The crests 572 are used as a screed to keep the thickness of main brown layer 566 uniform over a large area. In some embodiments fiberglass mesh 770 is embedded in main brown layer 566 while main brown layer 566 is still wet, as shown in FIG. 21.

Main brown layer 566 can include any of the materials, elements, or structures discussed in this document as possible constituents of a coating layer. Main brown layer 566 can include any of the materials, elements, structures, or layers discussed with regard to main brown layer 166. Main brown layer 566 is a cementitious mixture in the embodiment shown in the figures.

In some embodiments main brown layer 566 includes cement and aggregate. In some embodiments main brown layer 566 includes cement and acrylic bonder. In some embodiments main brown layer 566 includes cement and ceramic. In some embodiments main brown layer 566 includes cement, acrylic bonder, and a ceramic aggregate. In some embodiments outer main brown layer 566 includes cement, acrylic bonder, fiberglass strands, and aggregate. In some embodiments main brown layer 566 includes cement, acrylic bonder, fiberglass strands, a fiberglass mesh, and aggregate. In some embodiments the aggregate includes ceramic. A ceramic material included in main brown layer 566 provides a thermal barrier, reflecting heat away from main brown layer 566 and preventing heat transfer into building panel core 158.

In some embodiments main brown layer 566 includes penetration-resistant materials, layers, or structures such as one or more than one projectile or ammunition-resistant material or structure. In some embodiments main brown layer 566 includes radiation blocking or inhibiting layers, materials, components, or structures. In some embodiments main brown layer 566 includes a layer, component or structure formed of lead. In some embodiments outer main brown layer 566 includes carbon fibers, carbon nanotubes, or carbon nanostructures. In some embodiments main brown layer 566 includes sound attenuating or inhibiting layers, materials, components, or structures. In some embodiments main brown layer 566 includes elements, structures, or materials that provide radio frequency shielding. In some embodiments main brown layer 566 includes elements, structures, or materials that provide electromagnetic interference shielding Main brown layer 566 is applied to scratch layer 562 after scratch layer 562 has cured. Main brown layer 566 in this embodiment includes brown mixture 168 and fiberglass mesh 770. Brown mixture 168 of outer main brown layer 566 can be applied in many different ways, including but not by way of limitation trowelling or spraying. Brown mixture 168 in this embodiment is trowelled over scratch layer 562 such that outer main brown layer 566 fills in valleys 574 with brown mixture 168, creating main brown layer crests 582 and main brown layer valleys 584 as shown in FIG. 17 and FIG. 20. In this way scratch layer 562 and main brown layer 566 are interdigitated. Each of a plurality of crests 572 reside in a corresponding one of a plurality of valleys 584. And each of a plurality of crests 582 reside in a corresponding one of a plurality of valleys 574. It is to be understood that crests 572 and 582 can be compressed and shaped, or formed, to be any shape, including but not limited to half-spheres, rectangular, half-oval, triangular, or any other shape or cross-section. And it is to be understood that valleys 574 and 584 can be any shape, including but not limited to half-spheres, rectangular, half-oval, triangular, or any other shape or cross-section.

Interdigitation of scratch layer 562 and main brown layer 566 provides several advantages. One advantage is that interdigitation can increase the structural strength of building panel 112. Another advantage is that crests 572 in scratch layer 562 provide a thickness reference screed for main brown layer 566. It is often difficult to maintain a uniform coating thickness across a large building panel surface. Crests 572 provide a built-in screed for main brown layer 566, allowing the thickness of outer main brown layer 566 and coating 560 to be uniform across a wide surface area. Fiberglass mesh 770 is embedded in outer main brown layer 566 while outer main brown layer 566 is still wet in some embodiments.

In a particular embodiment of coating 560 according to the invention, one or more of the layers included in coating 560 includes ceramic material in the coating mixture, as mentioned above. Including ceramic material in coating 560 creates a coating 560 that acts as a thermal barrier, reflecting heat away from coating 560 instead of absorbing heat through coating 560. When main brown layer 566 includes ceramic material, heat is reflected off of coating 560. Coating 560 will remain cool for a long time even when subjected to high temperatures, intense sunlight, and even fire or other direct heat sources. This results in a coating 560 and a building panel 112 which has increased thermal resistance, better insulating qualities, and high fire resistance. In some embodiments non-cementitious layer 167 is included in coating 160 or coating 560.

FIG. 17 through FIG. 21 show particular embodiments of coating 560 where second scratch layer B 563 and main brown layer 566 are interdigitated, but it is to be understood that this is an example embodiment only and not meant to be limiting. Any two layers included in coating 160 or coating 560 according to the invention can be interdigitated as described above. In some embodiments scratch layer 162 and main brown layer 166 of coating 160 are interdigitated. Any two layers of coating 160 or coating 560 can be interdigitated according to the strength and thickness uniformity requirements of the coating layer.

FIG. 1, FIG. 2, and FIG. 8 through FIG. 10 show building panel structure 110 according to the invention, including building panel 112. Building panel 112 includes core 158 and coating 160 covering a portion of core 158. Coating 160 can take many forms, including those shown in FIG. 11 through FIG. 16. Building panel 112 of FIG. 1, FIG. 2, and FIG. 8 through FIG. 10 can include coating 560 of FIG. 17 through FIG. 21 instead of coating 160. Building panel 112 as shown in FIG. 1, FIG. 2, and FIG. 8 through FIG. 10 can include any coating according to the invention to cover a portion of core 158. A building panel structure (110?) is any structure built using one or more than one building panel as an element in the structure. Building panel structure 110 in the embodiment shown in FIG. 1, FIG. 2, and FIG. 8 through FIG. 10 includes building panel 112 and footer 190. Building panel 112 in this embodiment has building panel interlock element 154, which in this embodiment is building panel groove 154, as shown FIG. 10. Footer 190 has integral footer interlock element 194, which in this embodiment is footer tongue 194. Footer tongue 194 couples with building panel groove 154 to couple building panel 112 to footer 190. Footer interlock element 194 is integral to footer 190 because footer tongue 194 and footer 190 are one integral piece. In this embodiment footer 190 and footer tongue 194 are both made of concrete. Footer tongue 194 is poured together with footer 190 so that footer 190 and footer tongue 194 are one integral piece. Footer tongue 194 not only provides a coupling for building panel 112, footer tongue 194 also stops moisture, water, weather, and other elements from penetrating the interface between building panel 112 and footer tongue 194. In some embodiments footer 190 and footer tongue 194 are poured along the exterior edge of a structure. After building panels 112 are coupled to footer 190 to create building structure 110, even if water, moisture, or other elements penetrate the outer interface between building panel 112 and footer 190, they cannot "climb" footer tongue 194 to get to the other side of building panel 112. In this way integral footer tongue 194 provides moisture and weather protection for building panel structure 110.

Building panel interlock element 154 can take many different forms. In some embodiments building panel interlock element 154 is a building panel tongue. In some embodiments building panel interlock element 154 has a form other than a tongue or a groove. In some embodiments building panel groove 154 or footer tongue 194 have barbs, spikes, hooks or other surface effects which help to hold footer tongue 194 in building panel groove 154.

Footer interlock element 194 can take many different forms. In some embodiments footer interlock element 194 is a footer groove. In some embodiments footer interlock element 194 takes a form other than a tongue or a groove.

In the embodiment shown in FIG. 1, FIG. 2, and FIG. 8 through FIG. 10, building panel structure 110 is constructed by first pouring concrete footer 190, including integral footer tongue 194, as a single pour. In some embodiments footer 190 is poured in multiple pours. Footer 190 and footer tongue 194 are formed using any method which results in footer 190 and footer tongue 194 being one integral concrete piece. Concrete foundation 192 is often poured next. In some embodiments concrete foundation 192 and concrete footer 190 are formed at the same time in one concrete pour. Building panel 112 is coupled to footer 190 using footer tongue 194 and building panel groove 154. Building panel 112 can be constructed and coupled to footer 190 in many different ways. In this embodiment building panel 112 is constructed on-site and on footer 190. Core 158 is built on footer 190 and connected to footer 190. In this embodiment frame 130 is built and connected to footer 190 using bolts 188 as shown in FIG. 8. Shaped blocks 140 of core 158 are coupled to frame 130, to each other, and to footer tongue 194 to create core 158 coupled to footer 190 using footer tongue 194 and building panel groove 154. Coating 160, coating 560, or any coating according to the invention, is applied to a portion of core 158. In this embodiment coating 160 is applied to front surface 124 of core 158 to create first surface 114 of building panel 112, and coating 160 is applied to rear surface 126 of core 158 to create second surface 116 of building panel 112 as shown. In some embodiments coating 160 is applied to core 158 and footer 190.

Building panel 112 in this embodiment has coating 160 applied to two surfaces, front surface 124 and rear surface 126, of core 158. In some embodiments coating 160 is applied to only one surface of core 158. In some embodiments coating 160 is applied to all surfaces of core 158. Coating 160 can be applied to any surface or portion of core 158 to create building panel 112 according to the invention. In some embodiments of building panel 112 and/or building panel structure 110, coating 560 as shown in FIG. 17 through FIG. 21 is used instead of coating 160. In some embodiments of building panel 112 and/or building panel structure 110, a different coating according to the invention is used instead of coating 160.

In some embodiments of building panel structure 110, core 158 is built and covered with coating 160 to create building panel 112 before being coupled to footer 190. In some embodiments building panel 112 is made off-site and shipped to the building site to be coupled to footer 190.

In the embodiment shown in FIG. 1, FIG. 2, and FIG. 8 through FIG. 10, building panel 112 is made in-place on footer 190 as described above. Multiple building panels 112 can be added to composite building panel structure 110 to create walls, ceilings, floors, beams, bridges, or any other desired structure. In this embodiment composite building panel 112 forms part of building panel structure 110 which is a house. In other embodiments building panel 112 forms parts of other structures and buildings in accordance with building panel structure 110. In some embodiments building panel structure 110 is a building. In other embodiments building panel structure 110 is a bridge. In some embodiments building panel structure 110 is a structure. Building panel structure 110 is any building, structure, or edifice of any shape, size or use which is formed of at least one building panel according to the invention.

Building panel structure 110 as shown in FIG. 1, FIG. 2, and FIG. 8 through FIG. 10 is structurally sound as soon as coating 160 dries, and there is no need for external structural elements to hold building panel 112 in place while the rest of building panel structure 110 is created. In other types of foam block panel construction, for example, the foam block walls cannot support themselves until the entire structure is created and fitted together. The walls need to be supported by external structural elements during construction. These external structural elements used to hold the structure together during construction are not necessary when using building panel 112 according to the invention. Building panels 112 formed each day as part of building panel system 110 are structurally sound and secure as soon as coating 160 dries, and each day whatever part of the complete structure has been completed is strong and secure and not in danger of collapsing.

Building panel 112 in this embodiment is stronger than other types of foam block walls. Core 158 and coating 160 and/or coating 560 give building panel structure 110 the strength to both hold building panel 112 secure during construction and withstand strong environmental elements and forces during the lifetime of the building 110, such as wind and earth movement. Building panel 112 is environmentally friendly, creating an energy efficient structure using recyclable material with less waste.

Figure 22:
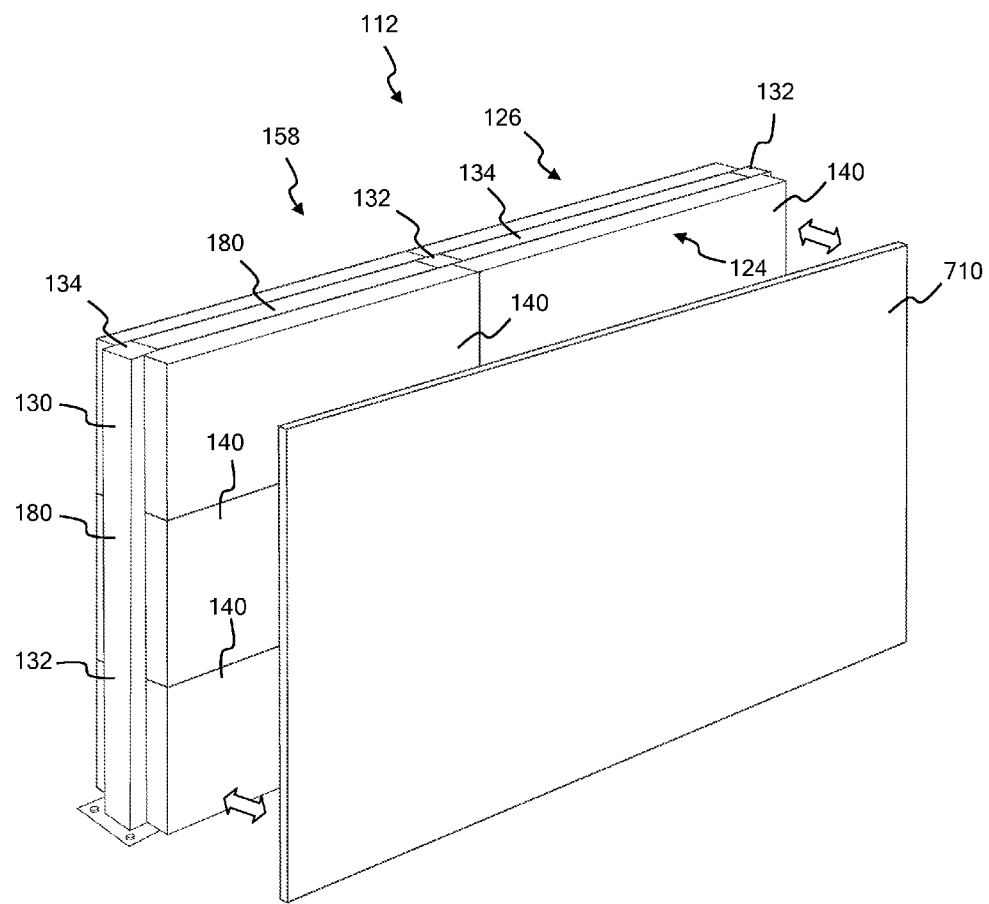
FIG. 22 shows how coatings 160 or 560 can be made separate from core 158 such that coatings 160 or 560 form construction board 710 according to the invention.

In some embodiments of building panel 112 according to the invention, coatings 160 or coatings 560 are formed into construction board 710 according to the invention before being coupled to core 158, as shown in FIG. 22. Construction board 710 is formed of the same materials and layers as any of the embodiments of coating 160 or coating 560, but these materials are shaped and cured into a dry mixture board 710 before being coupled to core 158. This allows construction board 710 to be formed off-site and prior to forming core 158, for example. Construction board 710 can be coupled to core 158 using many different attachment means and methods. In some embodiments construction board 710 is coupled to core 158 using a suction bond, not by mechanical attachments. Construction board 710 can be coupled to core 158 using an acrylic bonder or other elastomeric polymer or cementitious mixture of liquid bonding material. In some embodiments some of the layers of coating 160 or 560 are applied to core 158 as a liquid mixture and allowed to cure, and some of the layers are formed into a solid dry mixture as construction board 710 and then adhered to the layers of coating 160 or 560 previously applied to core 158. In some embodiments the wet mixture layers of coating 160 or 560 are used to adhere the dry mixture layers to core 158. Coating 160 and coating 560 as described in this document can be applied to core 158 in any combination of wet and dry layers, where the dry layer(s) form construction board 710 prior to being applied to core 158.

Figure 23:
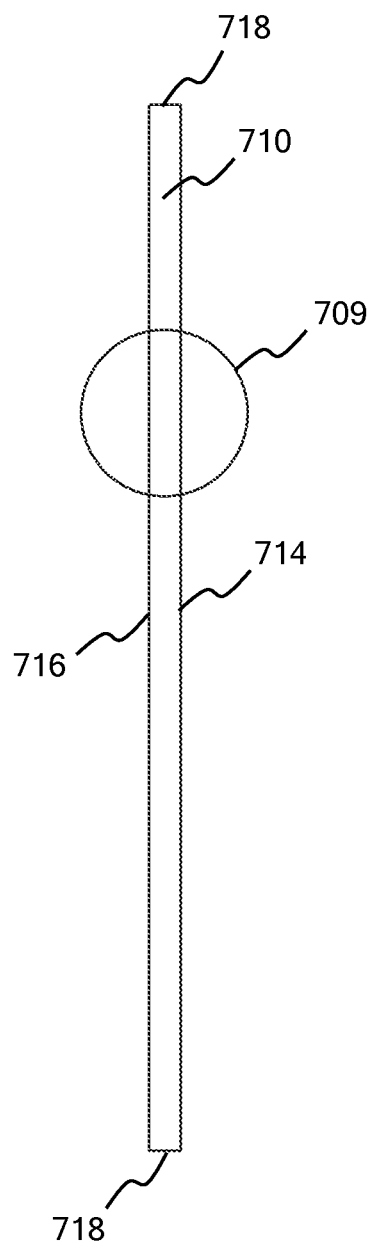
FIG. 23 shows a side view cross-section of construction board 710 of FIG. 22.

FIG. 22 shows a perspective view of an embodiment of construction board 710 separated from core 158. FIG. 23 shows a side view of construction board 710 of FIG. 22. In this embodiment construction board 710 covers a portion of core 158, and comprises the elements of coating 160 that covers surface 124 of core 158, as shown in FIG. 3 and FIG. 8 through FIG. 10, but in dry mixture form. In this embodiment construction board 710 is applied to core 158 using a suction bond adhesion material, but it is to be understood that construction board 710 can be applied to core 158 using any coupling means. In this embodiment construction board 710 is applied to core 158 using a suction bond adhesion material that is an elastomeric acrylic polymer bonder mixture.

Construction board 710 can be formed to include any or all of the layers previously described for coating 160 or coating 560. Thus cross-section 709 of construction board 710 as seen in FIG. 22 and FIG. 23 can be the same or similar to any of the cross-sectional embodiments of coatings 160 or coatings 560 show or described in this document. Once construction board 710 is applied to core 158 to form building panel 112, building panel 112 formed using dry mixture construction board 710 has the same structural and protection characteristics as building panel 112 that uses coating 160 or 560 that are applied while they are wet mixtures. Construction board 710 has the same or similar thickness as the thickness of coating 160 or coating 560 has. In some embodiments the thickness of construction board 710 is less than or equal to 1 inch. In some embodiments the thickness of construction board 710 is less than or equal to ¾ inch. In some embodiments the thickness of construction board 710 is less than or equal to ½ inch.

FIG. 24 through FIG. 63 provide details of roof panels 812 according to the invention that are used to form a roof of a building or structure. Roof panel 812 is formed similar to building panel 112, with a core and coatings covering a portion of the core. Similar numbers are used to describe similar elements of building panel 112 and roof panel 812. Roof panel 812 is coupled to roof structural members 817 to form roof 825 of building panel structure 810 in FIG. 24. Roof panels 812 can be used in many different ways to form the roof of a building or structure. In some embodiments roof structural member 817 are part of roof panel 812. Roof panel 812 in some embodiments is either covered with a roofing surface, or roof panel 812 includes a roofing surface, as will be described below.

Figure 25:
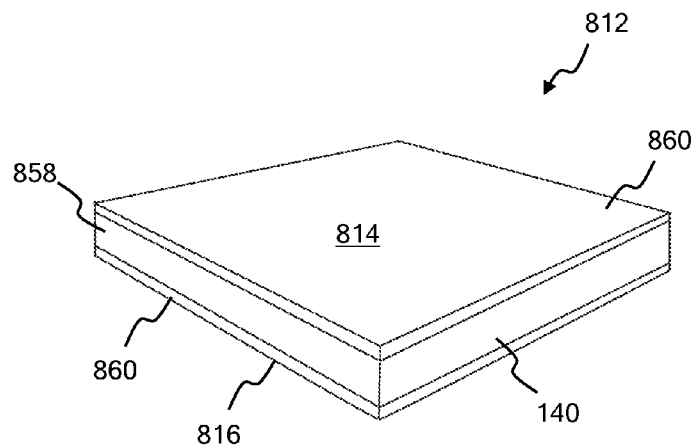
FIG. 25 shows a perspective view of an embodiment of roof panel 812 according to the invention, where roof panel 812 includes core 858 and coating 860 covering a portion of core 858. Core 858 in this embodiment includes insulating structural block 140.
Figure 26:
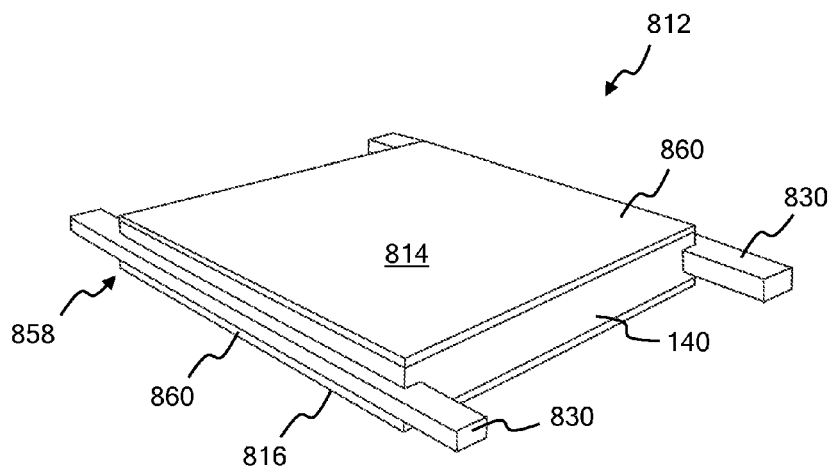
FIG. 26 shows a perspective view of another embodiment of roof panel 812 according to the invention, where roof panel 812 includes core 858 and coating 860 covering a portion of core 858. Core 858 in this embodiment includes insulating structural block 140 and frame 830.

FIG. 25 and FIG. 26 show embodiments of roof panel 812 according to the invention. Roof panel 812 according to the invention includes roof panel core 858 and coating 860. Roof panel core 858 includes one or more than one insulating structural block 140, as described earlier for building panel 112. Roof panel core 858 is the same or similar to building panel core 158 described earlier for building panel 112. Roof panel core 858 can include any of the elements, structures, material, or layers that are described earlier as possible constituents of building panel core 158. In some embodiments, core 858 includes frame 830 and one or more than one insulating structural block, as shown in FIG. 26. Frame 830 is the same or similar to frame 130 as described for building panel 112. Frame 830 can have any of the properties and include any of the elements described earlier for building panel core 158 frame 130. In some embodiments frame 830 is embedded in core 858 such that a majority of the outer surface of roof panel 812 is a surface of insulating structural block 140. In some embodiments frame 830 includes roof structural elements 817.

Coating 860 covers a portion of core 858. In the embodiments shown, coating 860 covers surfaces of insulating structural blocks 140 of core 858. Coating 860 can include any of the elements, materials, structures, or layers of coating 160 and coating 560 described earlier. Roof panel 812 creates a roof that is structurally sound, with superior strength, lifetime, energy efficiency, and visual appeal as compared to traditional roofing materials.

Figure 27:
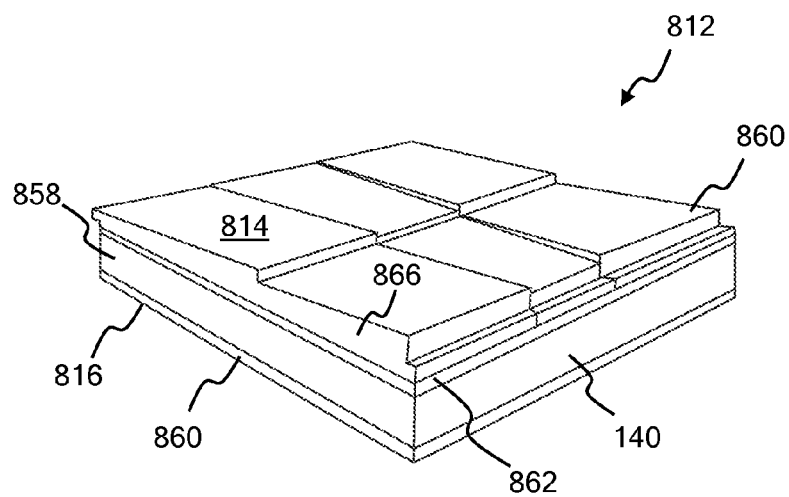
FIG. 27 shows a perspective view of another embodiment of roof panel 812 according to the invention, where roof panel 812 includes core 858 and coating 860 covering a portion of core 858. In this embodiment surface 814 of coating 860 is shaped to look like roof shake tiles.
Figure 28:
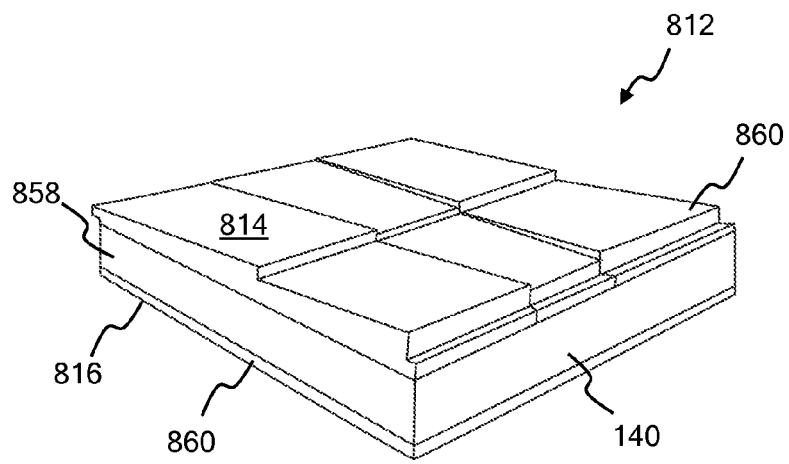
FIG. 28 shows a perspective view of a further embodiment of roof panel 812 according to the invention, where roof panel 812 includes core 858 and coating 860 covering a portion of core 858. In this embodiment surface 814 of coating 860 is shaped to look like roof shake tiles.

Roof panel 812 is often formed to include the roof tile shapes and structures that provide the roof protection and visual aesthetics usually provided by roof shingles or roof tiles. Roof panel 812 and/or coating 860 can be shaped, colored, and formed to provide strength and protection to a roof, and to provide the aesthetics of roof tiles or other roof surfaces. FIG. 27 and FIG. 28 show embodiments of roof panel 812 where coating 860 is shaped to create a structure that looks like roof shake tiles. Surface 814 of coating 860 is shaped to have the shape and look of shake tiles. Surface 814 can be colored to have the color of roof shake tiles. Coating 860 and roof panel 812, provide greater structural strength and lifetime of conventional shake tiles, however. Roof panel 812 can provide a roof 825 with a lifetime much longer than shake roof tiles, Spanish tiles, asphalt tiles, or other conventional roofing materials. In FIG. 27, coating 860 is a two-layer coating, with surface 814 of second layer 866 shaped and colored to look like shake roof tiles. In FIG. 28, coating 860 is a single-layer coating, with surface 814 of coating 860 shaped and colored to look like shake roof tiles.

Figure 29:
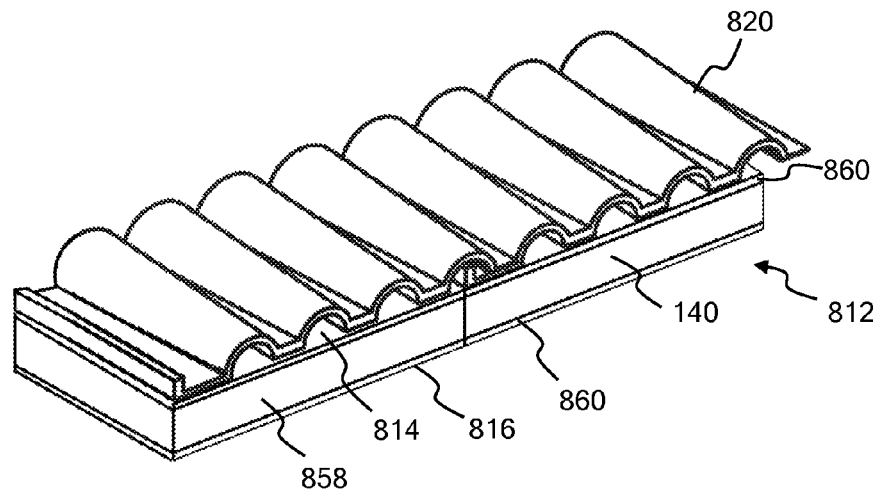
FIG. 29 shows a perspective view of an embodiment of roof panel 812 according to the invention, with an embodiment of roof tile 820 according to the invention applied to surface 814 of roof panel 812.
Figure 30:
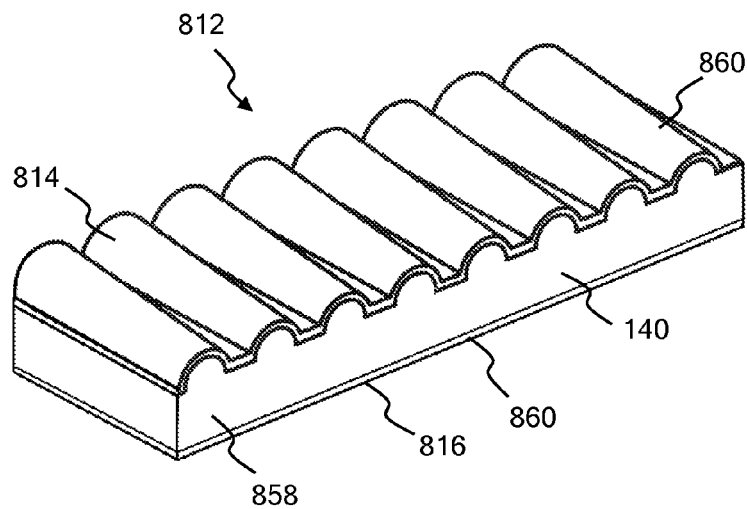
FIG. 30 shows a perspective view of an embodiment of roof panel 812 according to the invention, where cored 858 and coating 860 are shaped to look like roof Spanish tiles.

FIG. 29 and FIG. 30 show embodiments of roof panel 812 where roof panel 812 is shaped and formed to look like Spanish roof tiles. FIG. 29 shows an embodiment where roof tile 820 (to be discussed in greater detail shortly) has been shaped to look like Spanish roof tiles and is coupled to surface 814 of roof panel 812. FIG. 30 shows an embodiment where insulating structural blocks 140 of core 858 and coating 860 are shaped so that surface 814 of roof panel 812 look like Spanish roof tiles. In the embodiments shown in FIG. 27 through FIG. 30, roof panels 812 provide the look of a traditional roof surface, but provide superior protection from wind, weather, elements, etc., and longer lifetime than traditional roof surfaces.

Figure 31:
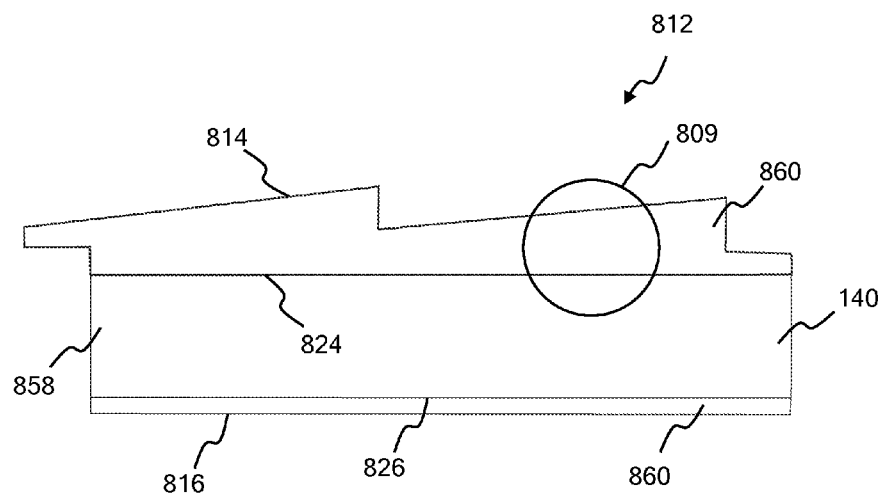
FIG. 31 shows a side view cross-section of roof panel 812 of FIG. 28.
Figure 32:
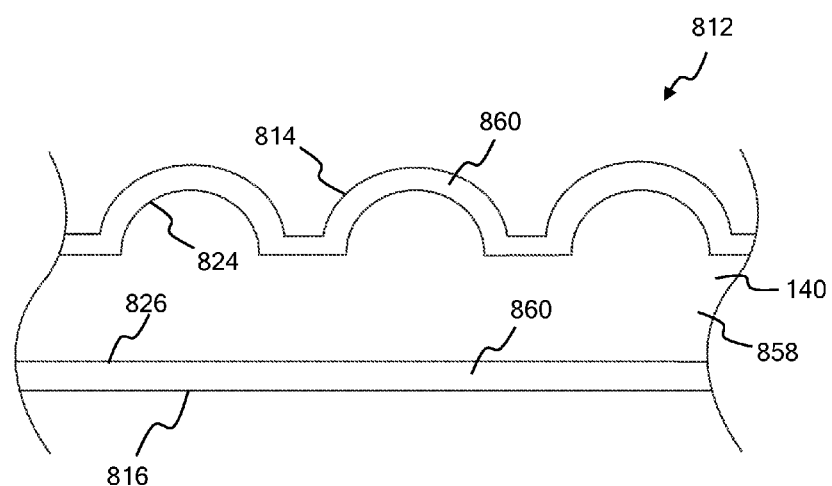
FIG. 32 shows a side view cross-section of roof panel 812 of FIG. 30

FIG. 31 and FIG. 32 shows side view cross-sections of example embodiments of roof panels 812, showing the construction similar to building panels 112 described earlier. FIG. 31 shows a side view cross section of roof panel 812 of FIG. 28, and FIG. 32 shows a side view cross-section of roof panel 812 of FIG. 30. In each embodiment roof panel 812 includes core 858 and coating 860 covering a portion of core 858. In these embodiments core 858 includes insulating structural blocks 140, and coating 860 covers a portion of insulating structural blocks 140 of core 858. In these embodiments coating 860 covers bottom surface 826 of core 858 and top surface 824 of core 858. In the embodiment shown in FIG. 31, coating 860 covering top surface 824 of core 858 is shaped to have the shape and look of shake roof tiles. In the embodiment shown in FIG. 32, top surface 824 of insulating structural blocks 140 of core 858 and coating 860 covering top surface 824 of core 858 are both shaped to have the form and look of Spanish roof tiles. It is to be understood that roof panel 812, core 858, insulating structural blocks 140, and coating 860 can be formed in any shape, form, color, and surface texture to provide the desired roof surface look and feel.

FIG. 33 through FIG. 38 show example close-up cross-section embodiments of coating 860 according to the invention. Coating 860 can take many different forms, including but not limited to those coating embodiments shown and discussed earlier relating to coating 160 and coating 560. Coating 860 can be more than one layer, and any two layers can be interdigitated as described earlier for coating 560.

Figure 33:
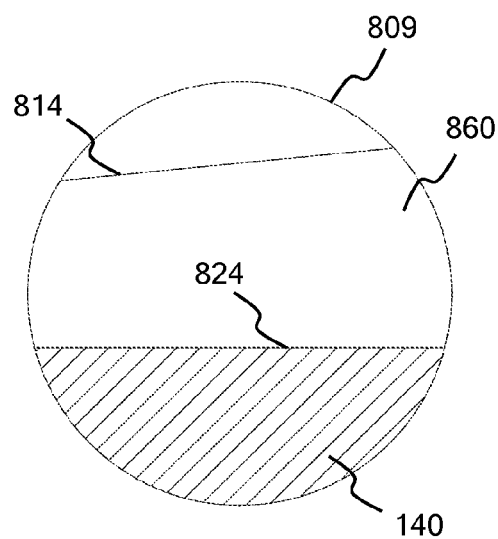
FIG. 33 through FIG. 38 show close-up cross-sections of embodiments of coating 860 according to the invention taken at section 809 of FIG. 31.

FIG. 33 shows a close-up cross-section embodiment of coating 860 on top surface 824 of core 858, taken at section 809 of FIG. 31. The cross-section embodiments shown in FIG. 33 through FIG. 38 are from section 809 of FIG. 31, but it is to be understood that these cross sections are possible for any coating of roof panel 812, include coating 860 on top surface 824 of core 858 of FIG. 32, or coating 860 on bottom surface 826 in any of the illustrated embodiments of roof panel 812.

Coating 860 is a single layer in the embodiment shown in FIG. 33. Coating 860 can include any of the elements, materials, structures, or layers described in this document as a possible constituent of a coating layer. Coating 860 in this embodiment can include any of the elements, materials, structures, or layers described earlier for coating 160 of building panel 112 as shown and described relating to FIG. 11, for example but not by way of limitation. In the embodiment shown in FIG. 33 coating 860 covers a portion of roof panel core 858. In this embodiment coating 860 covers a portion of insulating structural block 140 of roof panel core 858. Coating 860 in this embodiment is a cementitious coating. In some embodiments coating 860 is non-cementitious. In the embodiment shown in FIG. 33, coating 860 includes cement, aggregate, and acrylic bonder. Cement and aggregate provide structural strength and resistance to cracking. Acrylic bonder provides structural strength and adhesion to insulating structural block 140. In some embodiments coating 860 includes a reinforcing mesh structure, which can be a fiberglass mesh, cotton mesh, metal mesh, or any other mesh structure as described earlier for mesh 170 in coating 160. In some embodiments coating 160 includes reinforcing strands, which can be fiberglass, cotton, or any other reinforcing strand element. In some embodiments the aggregate includes ceramic. In some embodiments coating 860 includes ceramic.

Figure 34:
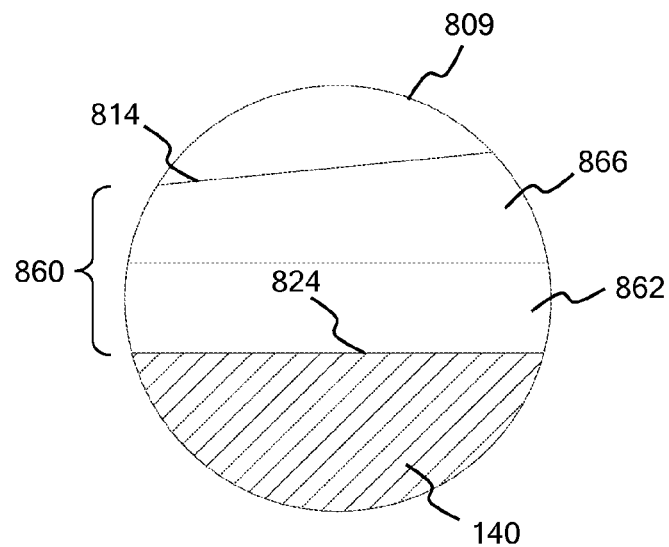

Coating 860 in the embodiment shown in FIG. 34 is a double-layer coating. Coating 860 in this embodiment includes first layer 862 and second layer 866. Coating 860 and first layer 862 and second layer 866 can each, separately or collectively, include any of the elements, materials, structures, or layers described in this document as a possible constituent of a coating layer. Coating 860 and first layer 862 and second layer 866 can each include any of the elements, structures, material, or layers described for coating 160 of FIG. 12, for example. In the embodiment shown in FIG. 34, first layer 862 and second layer 866 are both cementitious coatings. First layer 862 includes cement, aggregate, and acrylic bonder, and second layer 866 includes cement and aggregate. This combination provides good structural strength and adhesion to insulating structural block 140. In some embodiments second layer 866 also includes acrylic bonder. In some embodiments second coating 860 also include ceramic. Ceramic has a high thermal reflectance and thus reflects sunlight and heat well, keeping coating 860 cool. In some embodiments second layer 866 includes a reinforcing mesh structure.

Figure 35:
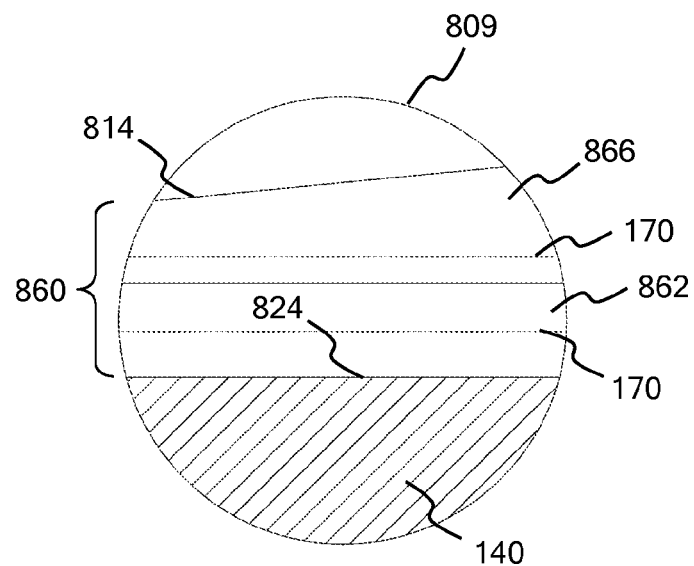
Figure 36:
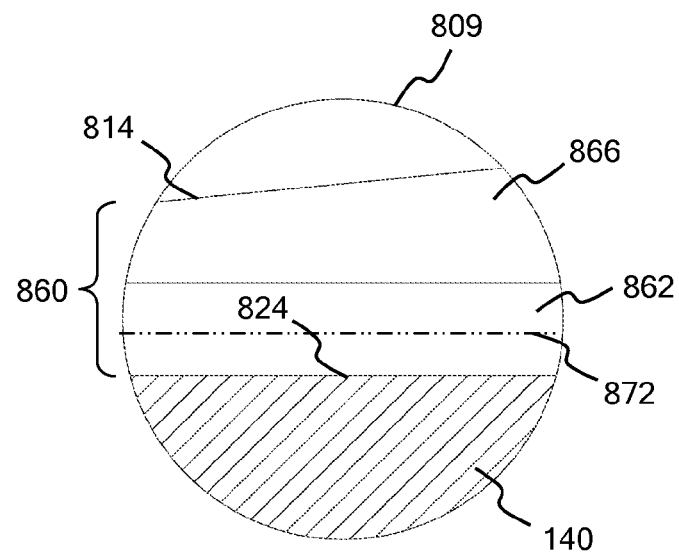
Figure 37:
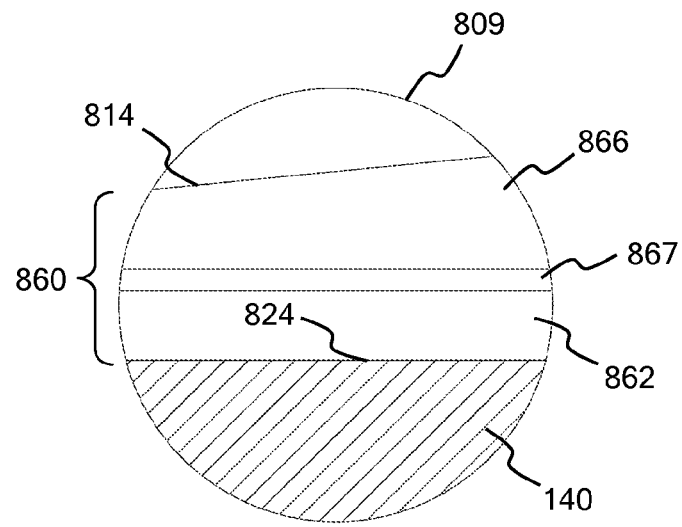

In some embodiments of coating 860, both first layer 862 and second layer 866 include a reinforcing mesh structure. In some embodiments of coating 860, both first layer 862 and second layer 866 include fiberglass mesh 170, as shown in FIG. 35. In some embodiments first layer 862 includes electronic mesh structure 872, as shown in FIG. 36. Electronic mesh structure 872 can be the same or similar, and have the same or similar characteristics, as electronic mesh structure 172 described earlier. In some embodiments electronic mesh structure 872 is in second layer 866. In some embodiments electronic mesh structure 872 is in both first layer 862 and second layer 866. In some embodiments coating 860 include non-cementitious layer 867, as shown in FIG. 37. Non-cementitious layer 867 can be the same or similar to non-cementitious layer 167 as shown and described in FIG. 14. Non-cementitious layer 867 can be in coating 860, first layer 862, or second layer 866, or both first layer 862 and second layer 866. It is to be understood that finish coatings are often applied over top surface 814 of roof panel 812. It is to be understood that additional layers or coatings can be applied to any of the surfaces of roof panel 812 as shown and described. These finish or additional coatings can be paint, stucco, sealer, an elastomeric stone textured surface, a cementitious finish layer, or any other layer applied to finish building panel 812.

Figure 38:
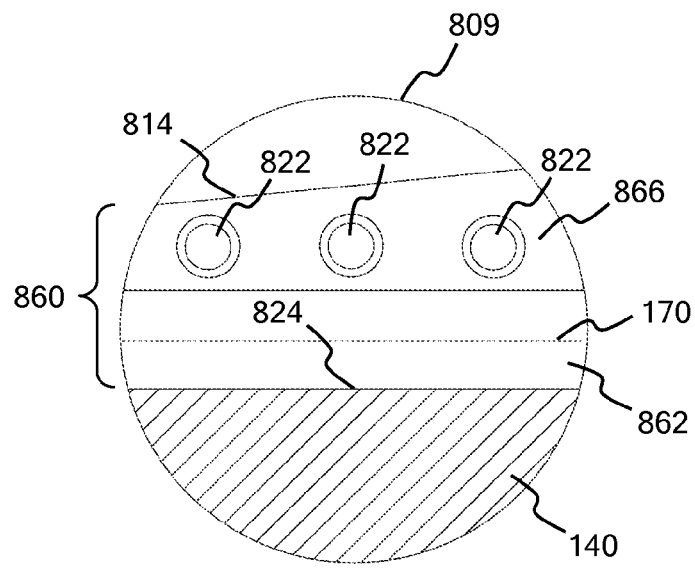

In some embodiments coating 860 includes fluid channels 822, as shown in one embodiment in FIG. 38, and in additional embodiments in FIG. 49 through FIG. 56. Fluid channel 822 can extend through any portion of coating 860. Fluid channel 822 conducts fluids through fluid channel 822 and coating 860. Fluid channel 822 conducts fluids through fluid channel 822 and coating 860 for many different reasons, including, but not limited to water distribution, transferring heat between fluid channel 822 and coating 860, or for conducting fluids through coating 860 and roof panel 812 for other reasons. In the embodiment shown in FIG. 38, fluid channels 822 are included in second layer 866, but it is to be understood that fluid channel 822 can be included in coating 860 of FIG. 33, or first layer 862, or non-cementitious layer 867. Fluid channels 822 in some embodiments extend through insulating structural block 140. Fluid channels 822 will be discussed in more detail shortly.

In some embodiments roof panel 812 is applied as a retrofit to an existing building. Roof panel 812 can be applied over existing roof finish treatments such as asphalt tile, Spanish tile, or any other roof surface. Roof panel 812 can be shaped to securely fit over any roof surface and to increase the energy efficiency and strength of an existing roof. In some embodiments roof panel 812 replaces the original roofing material. In some embodiments roof panel 812 is applied over or in conjunction with the original roof materials.

Coating 860 of the embodiments shown in FIG. 33 through FIG. 38 are applied as a wet coating mixture to core 858, and then allowed to cure. Coating 860 and/or each layer of coating 860 can be sprayed on, trowelled on, or otherwise applied as a wet mixture. In some embodiments of roof panel 812, coating 860 is applied as a dry mixture. Coating 860 mixtures can be formed onto roof tiles 820, for example, before being applied to roof panel core 858, to layers of coating 860 earlier applied, or to finished roof panels 812. Roof tile 820 includes layers of coating mixtures that have been cured into a dry state before being applied to roof panel 812. Some of these embodiments are illustrated in FIG. 29, FIG. 39 through FIG. 48, and FIG. 51 through FIG. 53.

Figure 39:
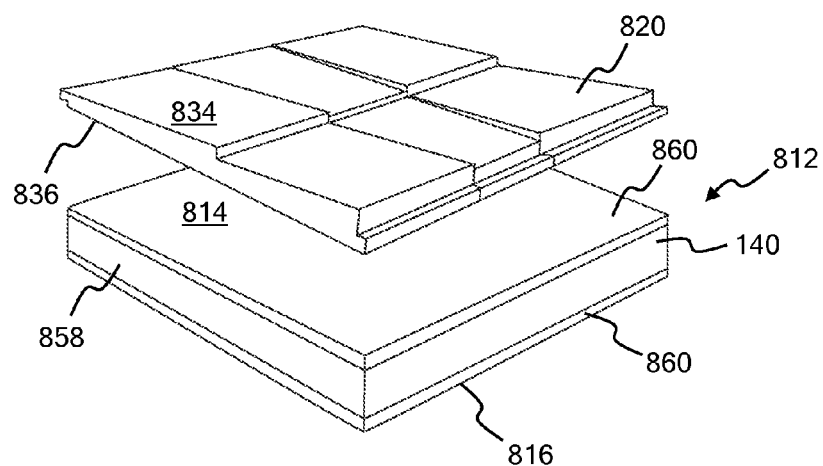
FIG. 39 shows an exploded perspective view of an embodiment of roof panel 812 according to the invention and an embodiment of roof tile 820 according to the invention, where roof tile 820 is coupled to surface 814 of roof panel 812.
Figure 40:
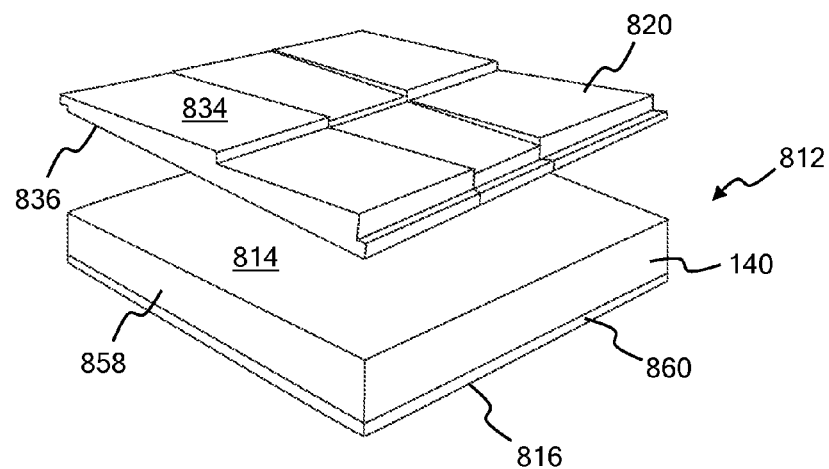
FIG. 40 shows an exploded perspective view of another embodiment of roof panel 812 according to the invention and an embodiment of roof tile 820 according to the invention, where roof tile 820 is coupled to surface 814 of roof panel 812

FIG. 39 through FIG. 48 show embodiments of roof tile 820 where roof tile 820 is formed of one or more than one layer of material that is formed and shaped to look like traditional roof tiles. In the embodiment shown in FIG. 39 through FIG. 48, roof tile 820 is formed, shaped, and colored to look like shake roof tiles, but this is not meant to be limiting. Roof tile 820 can be formed, shaped and colored to look like Spanish roof tiles, as shown in FIG. 29. Or roof tile 820 can be formed, shaped, and/or colored to look like other roof elements such as asphalt tile or other roof coatings or structures. Roof tile 820 can take any form, shape, or color as desired for the specific building or structure to be created. Roof tile 820 can include the materials, elements, structures, or layers of coating 160, coating 560, coating 860, or other coatings according to the invention. Roof tile 820 is applied as a solid dry mixture to roof panel 812. Roof tile 820 can replace coatings 860 or be in addition to coating 860. FIG. 39 shows an embodiment of roof panel 812 where roof tile 820 is coupled to coating 860 and is in addition to coating 860. FIG. 40 shows an embodiment of roof panel 812 where roof tile 820 is applied to surface 814 of roof panel 812, with roof tile 820 replacing coating 860. Top surface 834 of roof tile 820 is shaped to look like shake roof tiles in this embodiment.

Figure 41:
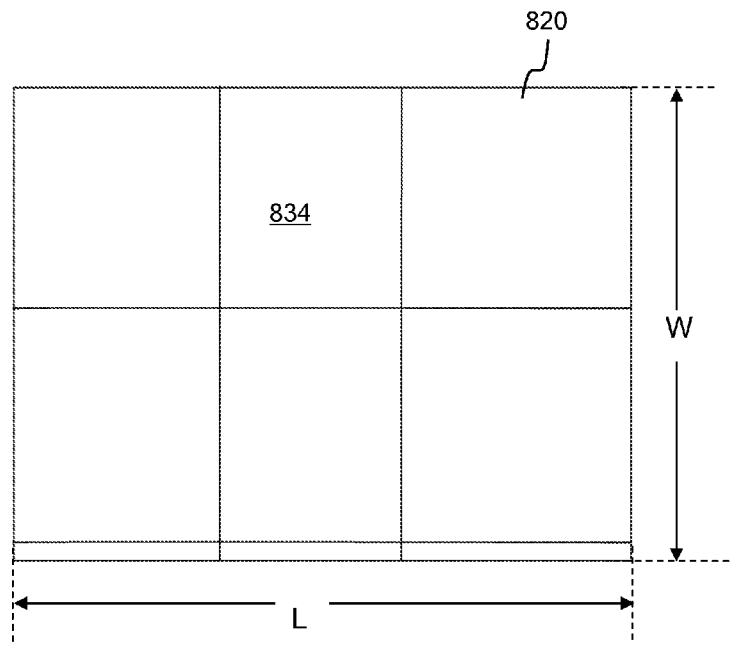
FIG. 41 shows a top view of roof tile 820 according to the invention of FIG. 39 and FIG. 40.
Figure 42:
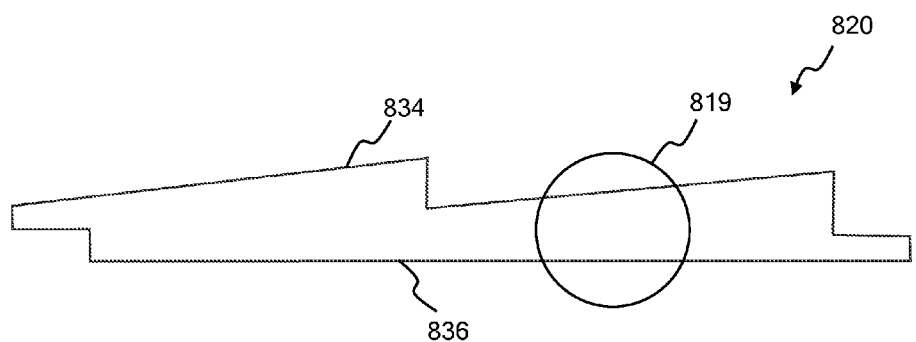
FIG. 42 shows a side view cross-section of roof tile 820 of FIG. 39 and FIG. 40.

FIG. 41 shows a top view of roof tile 820 of FIG. 39 and FIG. 40, and FIG. 42 shows a side view of roof tile 820 of FIG. 39 and FIG. 40. FIG. 43 through FIG. 48 show example embodiments of close-up cross sections of roof tile 820 taken at section 819 of FIG. 42. The cross-section embodiments shown in FIG. 43 through FIG. 48 are from section 819 of FIG. 42, but it is to be understood that the layers elements, structures, and materials shown and described for these cross sections are possible for any form, shape, or type of roof tile 820 according to the embodiment.

Figure 43:
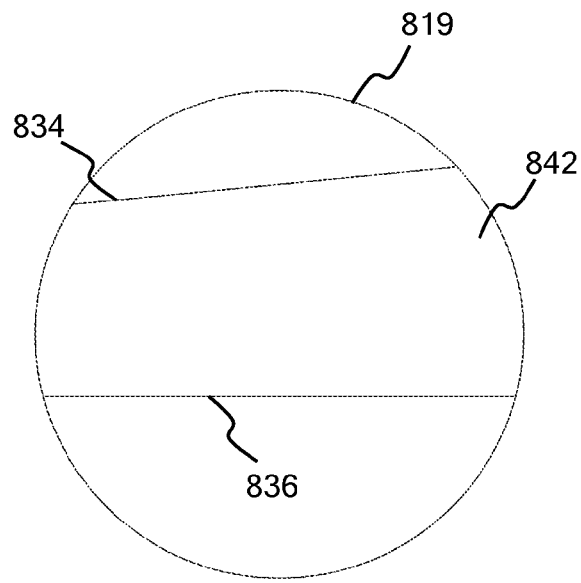
FIG. 43 through FIG. 48 show close-up cross-sections of roof tile 820 according to the invention taken at section 819 of FIG. 42.

Roof tile 820 includes a single layer of material 842 in the embodiment shown in FIG. 43. Single layer of material 842 can include any of the elements, materials, structures, or layers described in this document as a possible constituent of a coating layer. Single layer of material 842 in this embodiment can include any of the elements, materials, structures, or layers described earlier for coating 160 of building panel 112 as shown and described relating to FIG. 11, for example but not by way of limitation, or for single layer 860 as shown and described relating FIG. 33. In the embodiment shown in FIG. 43, single layer of material 842 extends from roof tile 820 top surface 834 to roof tile 820 bottom surface 836. In this embodiment single layer of material 842 is a cementitious layer of material. In some embodiments single layer of material 842 is non-cementitious. In the embodiment shown in FIG. 43, single layer of material 842 includes cement and acrylic bonder. Cement provides strength to roof tile 820 and acrylic bonder makes it easy to couple roof tile 820 to roof panel 812 with a suction bond material such as acrylic bonder. In some embodiments layer of material 842 includes aggregate. Cement and aggregate provide structural strength and resistance to cracking. In some embodiments single layer of material 842 includes a reinforcing mesh structure, which can be a fiberglass mesh, cotton mesh, metal mesh, or any other mesh structure as described earlier for mesh 170 in coating 160 or mesh 870 in coating 860. In some embodiments single layer of material 842 includes reinforcing strands, which can be fiberglass, cotton, or any other reinforcing strand element. In some embodiments the aggregate in single layer of material 842 includes ceramic. In some embodiments single layer of material 842 includes ceramic. Ceramic reflects heat and helps keep roof tile 820 cool.

Figure 44:
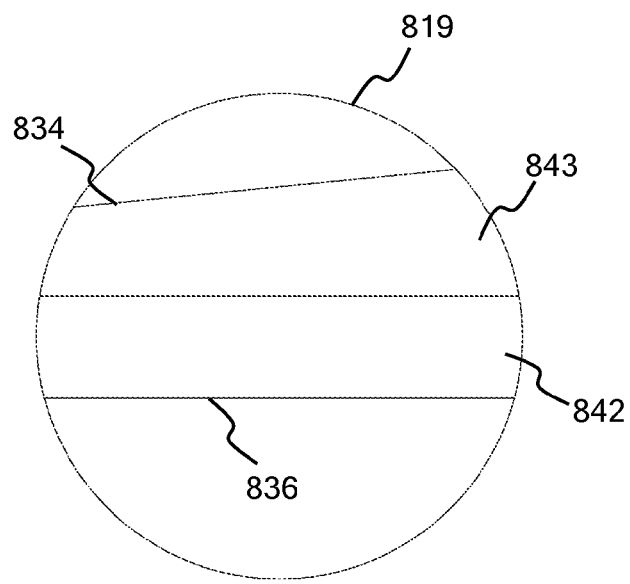

Roof tile 820 in the cross-sectional embodiment shown in FIG. 44 has first layer 842 and second layer 843. First layer 842 and second layer 843 can each, separately or collectively, include any of the elements, materials, structures, or layers described in this document as a possible constituent of a coating layer. First layer 842 and second layer 843 can each include any of the elements, structures, material, or layers described for coating 160 of FIG. 12, or for coating 860, first layer 862 or second layer 866 of FIG. 34, for example. In the embodiment shown in FIG. 44, first layer 862 and second layer 843 are both cementitious coatings. First layer 842 includes cement, acrylic bonder, and a fiberglass mesh, and second layer 843 includes cement and aggregate. This combination provides good structural strength and adhesion to insulating structural block 140 and/or roof panel 812. In some embodiments first layer 862 includes aggregate. In some embodiments first layer 842 does not include a fiberglass mesh. In some embodiments first layer 862 includes perlite. Perlite is a thermal insulator and helps to keep roof tile 820 from transmitting heat through it. In some embodiments second layer 843 also includes acrylic bonder. In some embodiments second coating 843 also includes ceramic. Ceramic has a high thermal reflectance and thus reflects sunlight and heat well, keeping roof tile 820 cool. In some embodiments second layer 843 includes a reinforcing mesh structure.

Roof tile 820 in some embodiments has a sheet of roofing membrane coupled to bottom surface 836. The sheet of roofing membrane can be useful as a moisture barrier, or for enhancing the bonding of roof tile 820 to roof panel 812. In some embodiments roof tile 820 has further coatings or layers on top surface 834. In some embodiments a portion of top surface 834 is covered with an elastomeric stone textured surface, which will give top surface 834 the look, feel and properties of asphalt roof tiles. It is to be understood that additional finish coatings or layers can be applied to any of the surfaces of roof tile 820 to seal roof tile 820 or to add to the aesthetics appeal of roof tile 829.

Figure 45:
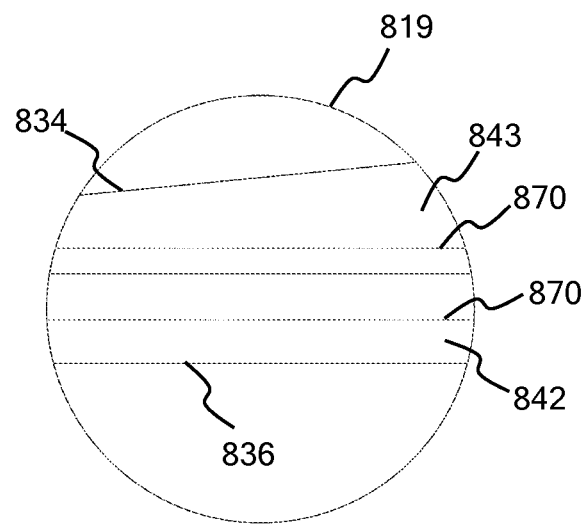
Figure 46:
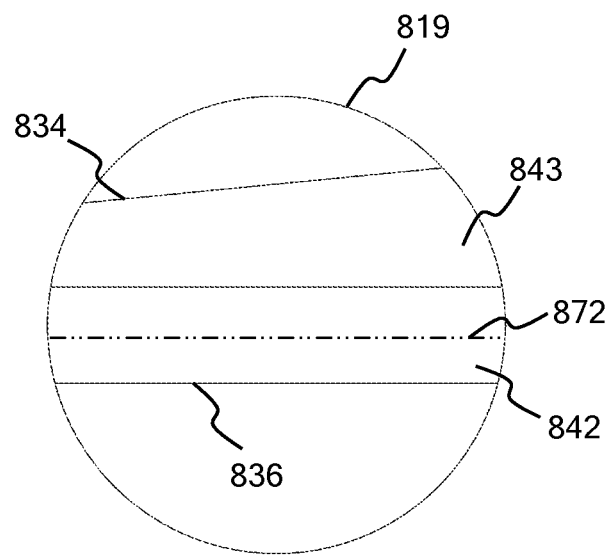
Figure 47:
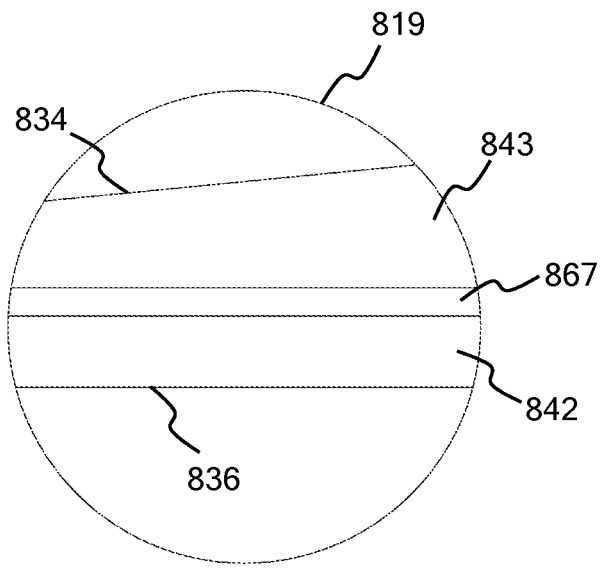

In some embodiments of roof tile 820, both first layer 842 and second layer 843 include a reinforcing mesh structure. In some embodiments of roof tile 820, both first layer 842 and second layer 843 include fiberglass mesh 170, as shown in FIG. 45. In some embodiments first layer 843 includes electronic mesh structure 872, as shown in FIG. 46. Electronic mesh structure 872 can be the same or similar, and have the same or similar characteristics, as electronic mesh structure 172 described earlier. In some embodiments electronic mesh structure 872 is in second layer 843. In some embodiments electronic mesh structure 872 is in both first layer 842 and second layer 843. In some embodiments roof tile 820 includes non-cementitious layer 867, as shown in FIG. 47. Non-cementitious layer 867 can be the same or similar to non-cementitious layer 167 as shown and described in regard to FIG. 14. Non-cementitious layer 867 can be in roof tile 820, first layer 842, or second layer 843, or both first layer 842 and second layer 843.

Figure 48:
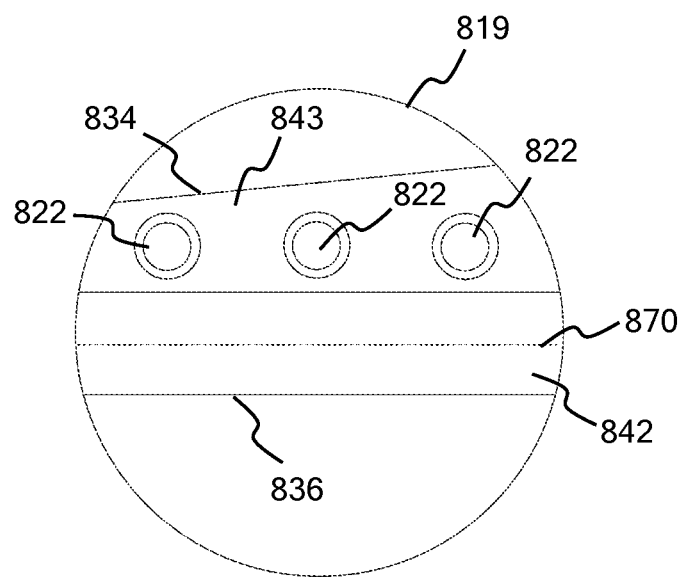

In some embodiments coating 860 includes fluid channels 822, as shown in one embodiment in FIG. 48, and in additional embodiments in FIG. 49 through FIG. 56. Fluid channel 822 can extend through any portion of roof tile 820. Fluid channel 822 conducts fluids through fluid channel 822 and roof tile 820. Fluid channel 822 conducts fluids through fluid channel 822 and roof tile 820 for many different reasons, including, but not limited to water distribution, transferring heat between fluid channel 822 and roof tile 820, or for conducting fluids through roof tile 820 and roof panel 812 for other reasons. In the embodiment shown in FIG. 48, fluid channels 822 are included in second layer 843, but it is to be understood that fluid channel 822 can be included in roof tile 820 of FIG. 43, or first layer 842, or non-cementitious layer 867. Fluid channels 822 will be discussed in more detail below.

Roof tile 820 is often coupled to roof panel 812 with an adhesive suction bond. This eliminates mechanical attachments from the roof structure, improving the lifetime and weather resistance of a roof formed from roof panel 812 and roof tile 820. In some embodiments roof panel 812 and/or roof tile 820 will last the life of the structure they are a part of, never requiring maintenance or replacement. Roof panels 812 and roof tiles 820 in some embodiments provide good thermal resistance characteristics, not allowing heat to transfer through roof panel 812 or roof tile 820, improving the energy efficiency of the structure they are a part of. Roof panels 812 and roof tiles 820 in some embodiments provide good thermal reflectance characteristics, such as by using ceramic in the layers. Thermal reflectance also helps improve the energy efficiency of the structure that roof panels 812 and/or roof tiles 820 are a part of. Roof panels 812 and roof tiles 820 can be formed in any size and shape. They are often coupled to the roof framing members in 4'×8' sheets, for example, which minimizes the number of roof panels required and simplifies construction of a roof. Roof panels 812 and roof tiles 820 are light enough to be constructed and transported in large sizes. Roof panels 812 and roof tiles 820 provide superior weather and element protection for a building as compared to traditional roofing materials, and are structurally strong. In some embodiments roof panels 812 and/or roof tiles 820 are applied over existing roof elements. This can be done to fix a roof which is leaking or in need of repair, or to increase the insulating ability of an existing roof, for example but not by way of limitation. Roof panel 812 and/or roof tiles 820 can improve the lifetime of a new roof or a retrofit roof, make the structure energy efficient, and provide appealing look and feel to any new or existing roof.

Roof panel 812 and roof tile 820 can include many different types of elements that allow utilities, light, air or other gasses to pass within or through roof panel 812 or roof tile 820. Roof panel 812 and roof tile 820 can include fluid channels, for example but not by way of limitation. Fluid channels that run through or within roof panel 812 or roof tile 820 can be used for distributing water, fuel, cooling or heating fluids, for example. Roof panel 812 and roof tile 820 can include gas channels in some embodiments for the distribution of different gasses such as propane, oxygen, air, etc. Passing fluids or gases through roof panels 812 provides a safe and efficient way to distribute fluids and gasses. Roof panel 812 and roof tile 820 can include light pipes in some embodiments for the distribution of light through roof panels 812 and/or roof tiles 820. FIG. 38, FIG. 48, and FIG. 49 through FIG. 56 shows and discuss the use of fluid channels 822, but it is to be understood that fluid channels 822 can also be used as gas channels 822 or for distribution of utilities, electrical lines, light, etc.

Figure 49:
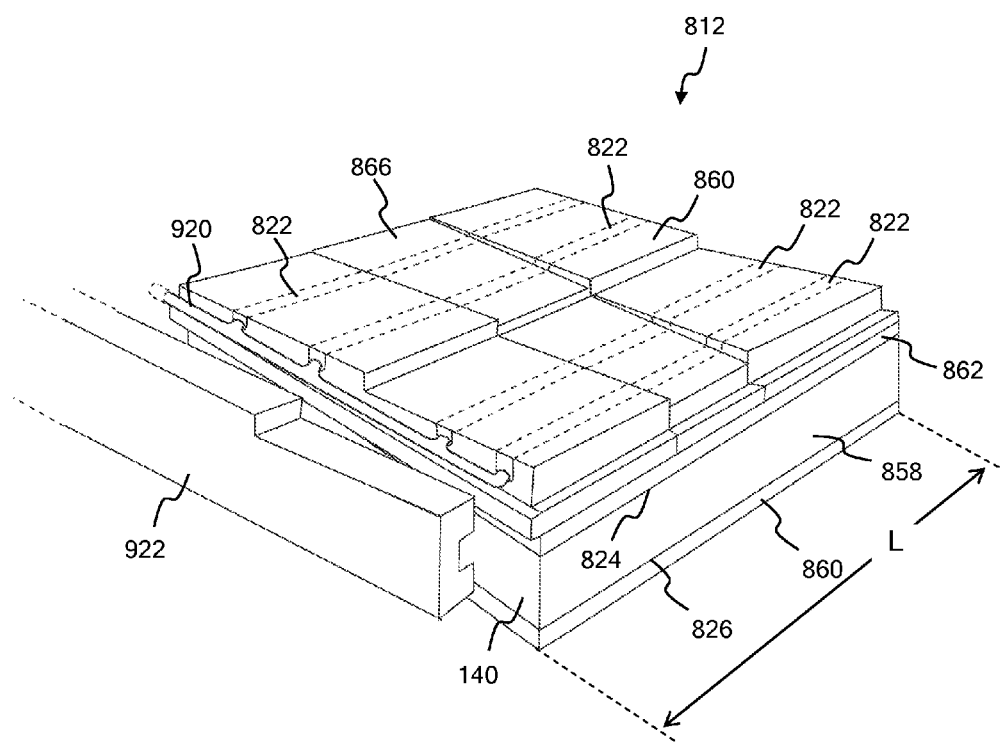
FIG. 49 shows a perspective view of a further embodiment of roof panel 812, where roof panel 812 includes fluid channels 822.

FIG. 49 shows an embodiment of roof panel 812 where roof panel 812 includes fluid channels 822 extending lengthwise through roof panel 812. Fluid channels 822 extend lengthwise through roof panel 812 because they run within roof panel 812 across the length L of roof panel 812. In some embodiments fluid channels 822 extend widthwise through roof panel 812. In some embodiments fluid channels extend through roof panel 812 from top to bottom. Fluid channels 822 can extend through roof panel 812 in any different direction or pattern according to the needs of the specific building.

Fluid channels 822 extend through roof panel 812 in the embodiments shown in FIG. 49 through FIG. 56 so that heat is transferred from roof panel 812 into fluid channel 822 and into the fluid that is conducted through fluid channel 822. The heated fluid that is conducted through fluid channel 822 can then be sent to a water heater and used as hot water for the structure, or the heated fluid can be used to heat all or part of the structure that roof panel 812 is a part of, for example but not by way of limitation. It is to be understood that the there are many different uses and purposes to conduct fluid through fluid channels 822 of roof panel 812. In this embodiment, fluid channels 822 absorb heat from roof panel 812. The fluid being conducted through fluid channels 822 is heated. Pipes 920 conduct fluid to or from fluid channels 822. Using fluid channels 822 to heat water can be an energy efficient way to provide heated water for a structure. In some embodiments the heated water is further heated at a central water heater or a point-of-use water heater. Any increase in temperature provided by roof panels 812 heating the water provides a decrease in the energy costs of the building that roof panels 812 are a part of. Roof panels 812 are exposed to sunlight and heat and provide a convenient medium to transfer heat to water. In the embodiment shown in FIG. 49, fluid channels 822 extend through coating 860. Fascia 922 can be formed of insulating structural block 140 and provides an aesthetically pleasing way to cover pipes 920. Pipes 920 can be formed of PVC, metal, or any other material suitable for conducting fluids such as water.

Figure 50:
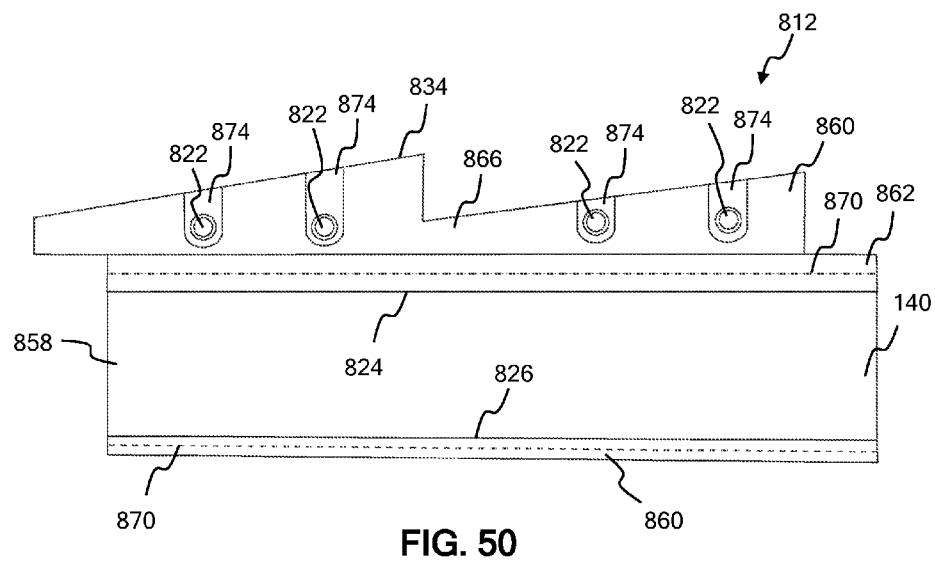
FIG. 50 shows a side view cross section of an embodiment of building panel 812 of FIG. 49.

FIG. 50 through FIG. 56 show example cross-sectional embodiments of building panels 812 and roof tiles 820 that include fluid channels 822. FIG. 50 shows a cross-section of building panel 812 of FIG. 49, with fluid channels 822 extending through coating 860. Coating 860 in this embodiment includes first layer 862, second layer 866, and third layer 874. In this embodiment third layer 874 includes a heat-absorbing material. Third layer 874, which includes a heat-absorbing material, is in thermal communication with fluid channel 822 so that heat is transferred from third layer 874 to fluid channel 822. Fluid channels 822 in this embodiment are embedded in third layer 874. In some embodiments third layer 874 covers a portion of fluid channels 822. In some embodiments third layer 874, which includes a heat-absorbing material, is in thermal communication with fluid channel 822. Thermal communication means that heat is passed between third layer 874 and fluid channel 822. In some embodiments third layer 822 is a cementitious mixture. In some embodiments third layer 874 includes cement and a heat-absorbing material. Third layer 874 extends to top surface 834 of roof panel 812, so that third layer 874 receives sunlight and can absorb heat from the sun, transferring this absorbed heat to fluid channel 822. Fluid channel 822 often includes a fluid channel wall surrounding a fluid passageway, such as with a typical water pipe, but this is not meant to be limiting. In some embodiments fluid channels 822 are passageways formed directly in coating 860, roof tile 820, or core 858, with no surrounding fluid channel wall. In some embodiments additional layers or coatings are applied to surfaces of roof panel 812, such as top surface 834 for example. For example, in some embodiments a finish layer is applied to top surface 834 that can add a desired color or provide a specific surface texture.

In the embodiment shown in FIG. 50, first layer 862 includes cement, acrylic bonder, aggregate, and reinforcing mesh structure 870, but this is not meant to be limiting. Second layer 866 includes cement, acrylic bonder, and a ceramic material. Third layer 874 includes cement and a heat-absorbing material. It is to be understood that first layer 862, second layer 866, and third layer 874 can include any of the elements, materials, structure, or layers described or shown in this document as constituents of layers or coatings.

Figure 51:
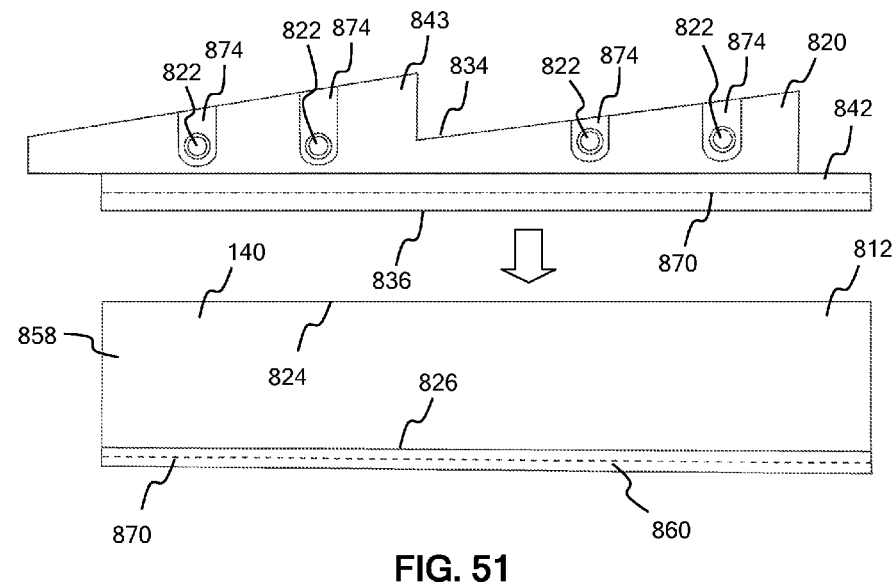
FIG. 51 shows an embodiment of building panel 812 and roof tile 820 where roof tile 820 includes fluid channels 822.
Figure 52:
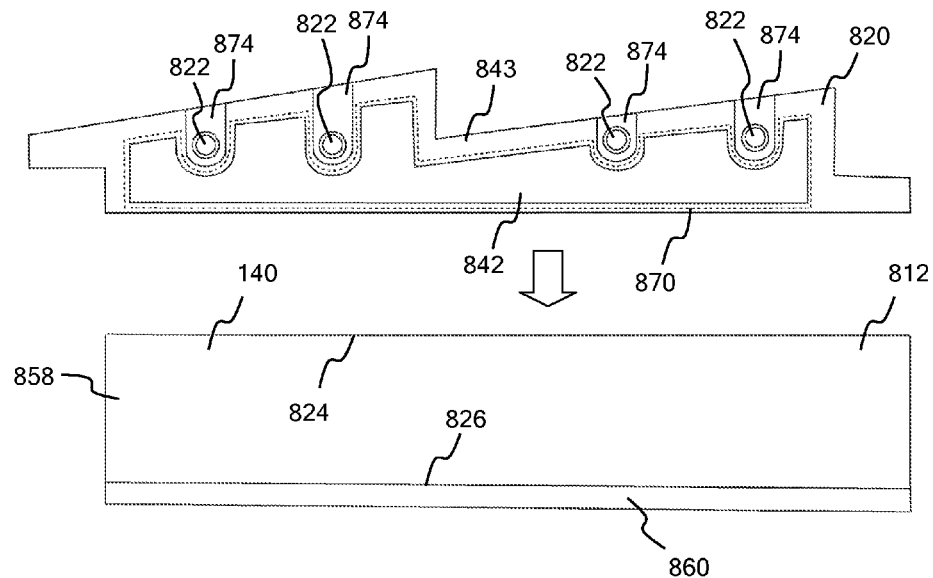
FIG. 52 shows another embodiment of building panel 812 and roof tile 820 where roof tile 820 includes fluid channels 822.

In some embodiments fluid channels 822 extend through roof tile 820, as shown in FIG. 51. Roof tile 820 is formed separate from roof panel 812, as discussed earlier. Roof tile 820 is then coupled to roof panel 812 with a suction bond, for example. In some embodiments first layer 842 of roof tile 812 is formed to be a roof tile core, surrounded by second layer 843, as shown in FIG. 52. In this embodiment second layer 843 includes reinforcing mesh structure 870.

Figure 53:
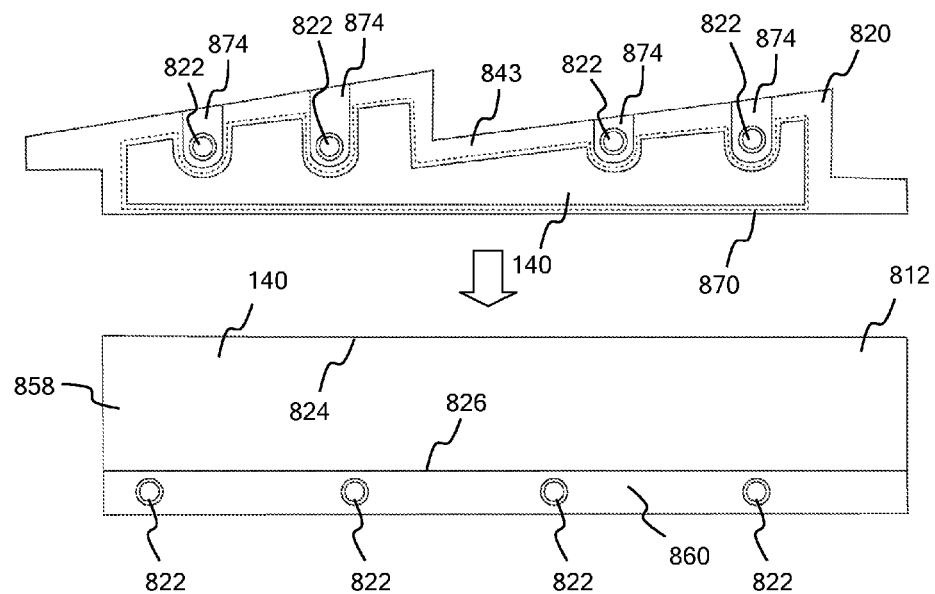
FIG. 53 shows a further embodiment of building panel 812 and roof tile 820 where roof tile 820 includes fluid channels 822.

In some embodiments roof tile 820 includes a core of insulating structural block 842, as shown in FIG. 53. FIG. 53 also shows that fluid channels 822 can be included in coating 860 on top surface 824 of roof panel core 858, and coating 860 on bottom surface 826 of roof panel core 858. Fluid channels 822 can extend through core 858 in some embodiments. Fluid channels 822 can extend through insulating structural block 140, through frame 830, or coating 860, for example. It is to be understood that there are many different variations and embodiments that can be used to form roof panel 812, roof tile 820, and fluid channels 822. Example embodiments are shown in the figures but these are not meant to be limiting.

Figure 54:
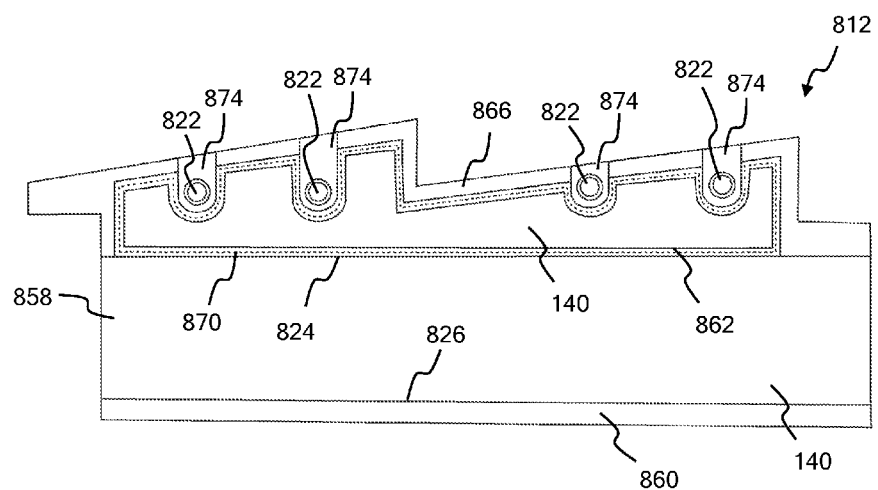
FIG. 54 shows a side view cross section of another embodiment of building panel 812 of FIG. 49.
Figure 55:
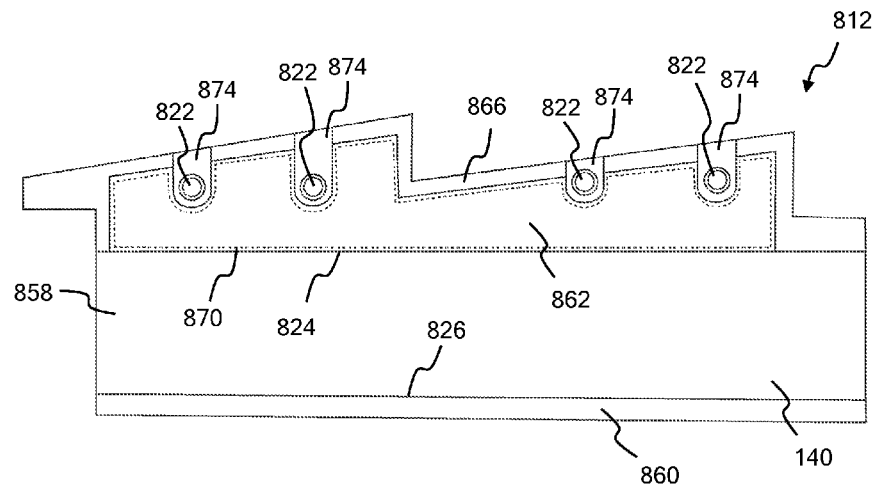
FIG. 55 shows a side view cross section of another embodiment of building panel 812 of FIG. 49.
Figure 56:
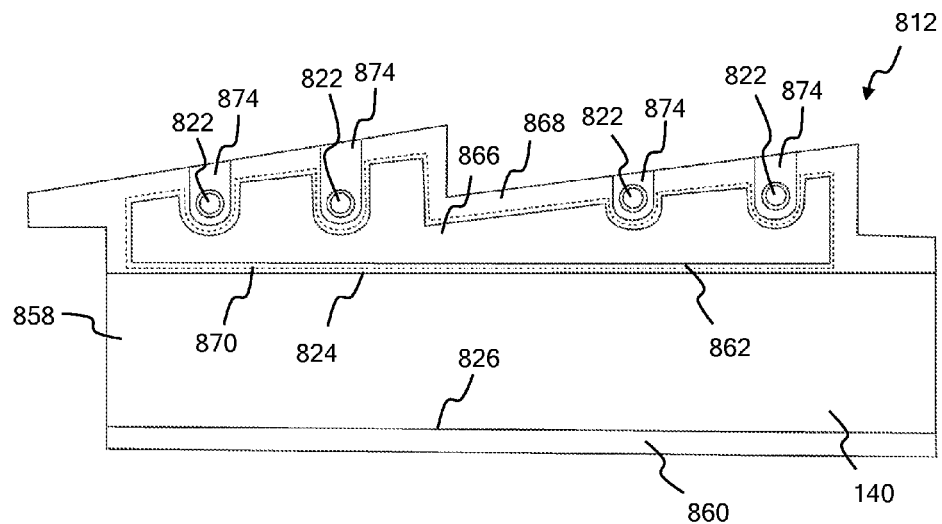
FIG. 56 shows a side view cross section of another embodiment of building panel 812 of FIG. 49.

FIG. 54 shows a cross-section of an embodiment of roof panel 812 where coating 860 includes insulating structural block 140 and fluid channels 822. Insulating structural block 140 is used in coating 860 in this embodiment to provide a shape to coating 860 and roof panel 812. In the embodiment shown in FIG. 54 and FIG. 55, coating 860 first layer 862 includes reinforcing mesh structure 870. In the embodiment shown in FIG. 56, further layers are added to coating 860. This embodiment includes fourth layer 868. It is to be understood that further layers and coating can be applied for structural strength, aesthetics, or any other reason. Fourth layer 86 can be the same or similar to any of the other coatings and layers described in this document. In the embodiment shown in FIG. 56, first layer 862 and fourth layer 868 each include a reinforcing mesh structure 870.

It is to be understood that many different embodiments of roof panel 812 and roof tile 820 are possible according to the invention in addition to those described in this document. In some embodiments roof panel core 858 includes corrugated metal structures. In some embodiments these corrugated metal structures encase fluid channels 822. In some embodiments a pair of corrugated metal structures are a part of core 858. The pair of corrugated metal structures enclose fluid channels 822 such that one corrugated metal structure is below a fluid channel 822 and one corrugated metal structure is above the fluid channel 822. In some embodiments additional layers are added to roof panel 812 and/or roof tile 820 to provide desired qualities such as strength, protection, or aesthetics.

Roof panel 812 and roof tile 820 provide a structurally sound, energy efficient and durable way to form a roof of a structure. Roof panel 812 and roof tile 820 are easy to construct, easy to form into roof 825 of building panel structure 810, and can be made to look like any specific roof shape or color desired. Roof panel 812 and roof tile 820 can also be used as part of the heating or cooling system of the structure, or to distribute fluids, gasses, utilities, light, or other items that are distributed within building panel structure 810.

Roof panel 812 and roof tiles 820 can be used to form roof 825 using many different construction methods. In some embodiments of structure 810, roof panels 812 and/or roof tiles 820 are constructed away from the building site and coupled together at the site to create structure 810. In some embodiments of structure 810, roof panels 812 and/or roof tiles 820 are partially constructed away from the building site, and finished at the building site. This finishing can take the form of adding further coatings, layers, and/or finish coatings. In some embodiments of structure 810, roof panels 812 and/or roof tiles 820 are fully constructed at the building site. In some embodiments of building panel structure 810, some or all of coatings 860 are applied as wet mixtures after roof panel core 858 has been coupled to roof framing member 817. Exemplary methods of forming a roof according to the invention are illustrated in FIG. 57 through FIG. 63.

Figure 61:
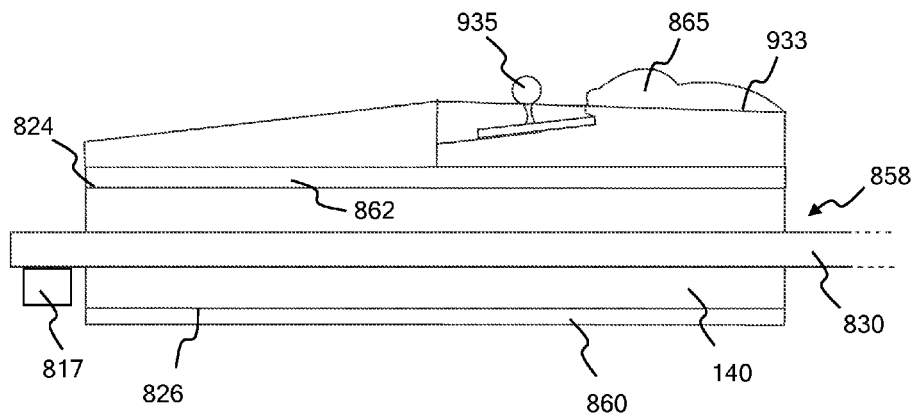
FIG. 61 shows wet coating mixture 865 of FIG. 59 continuing to be smoothed with trowel 935 using screed frame 933 as a height reference.
Figure 62:
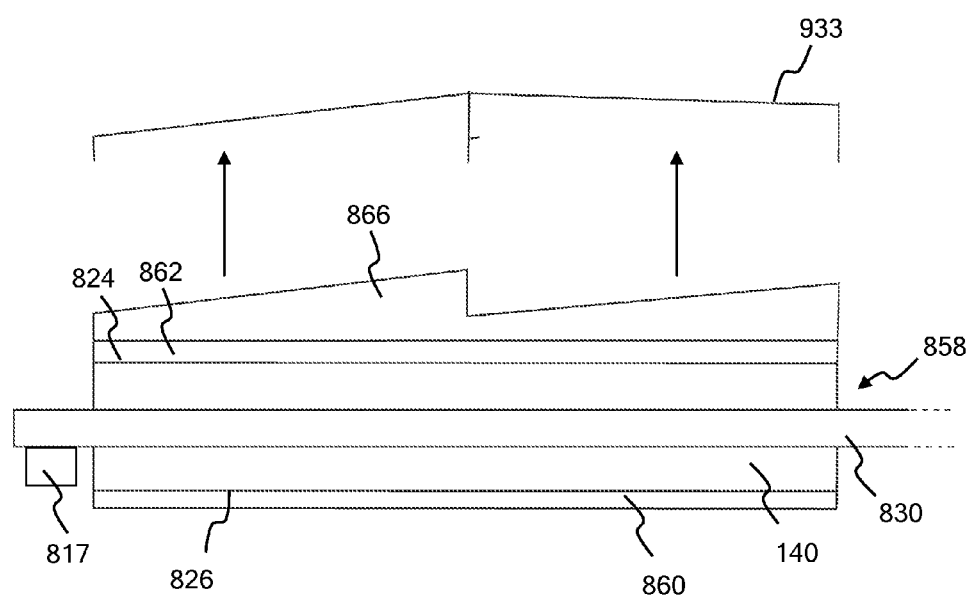
FIG. 62 shows screed frame 933 being removed from building panel 812 of FIG. 61 after wet coating 860 mixture 865 (866?) is trowelled smooth.
Figure 63:
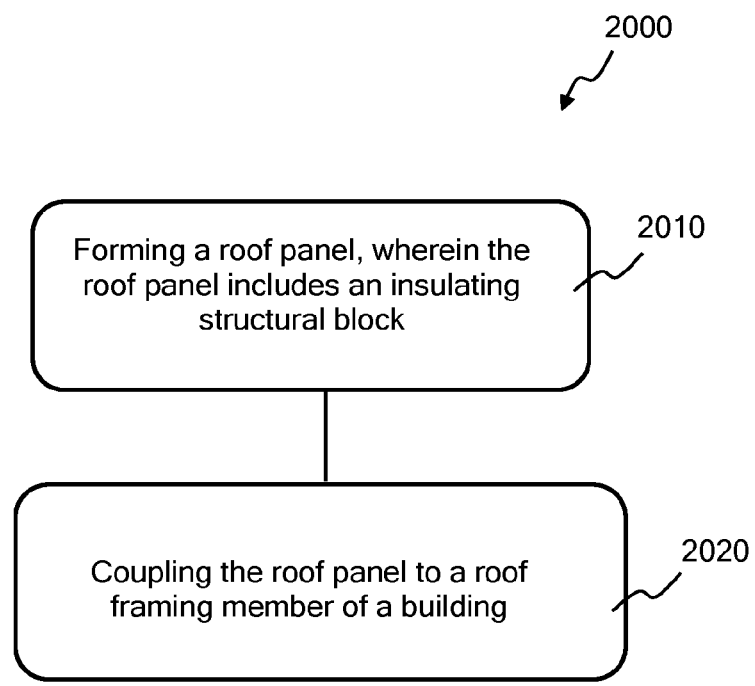
FIG. 63 shows method 2000 of forming a roof according to the invention.

FIG. 57 through FIG. 62 illustrate a method of forming a roof according to the invention, where some of the roof panel coatings or layers are applied after roof panel core 858 is coupled to roof framing members 817. FIG. 63 illustrates method 2000 of forming a roof according to the invention, where roof panel 812 is formed, and then roof panel 812 is coupled to roof framing members 817.

Figure 24:
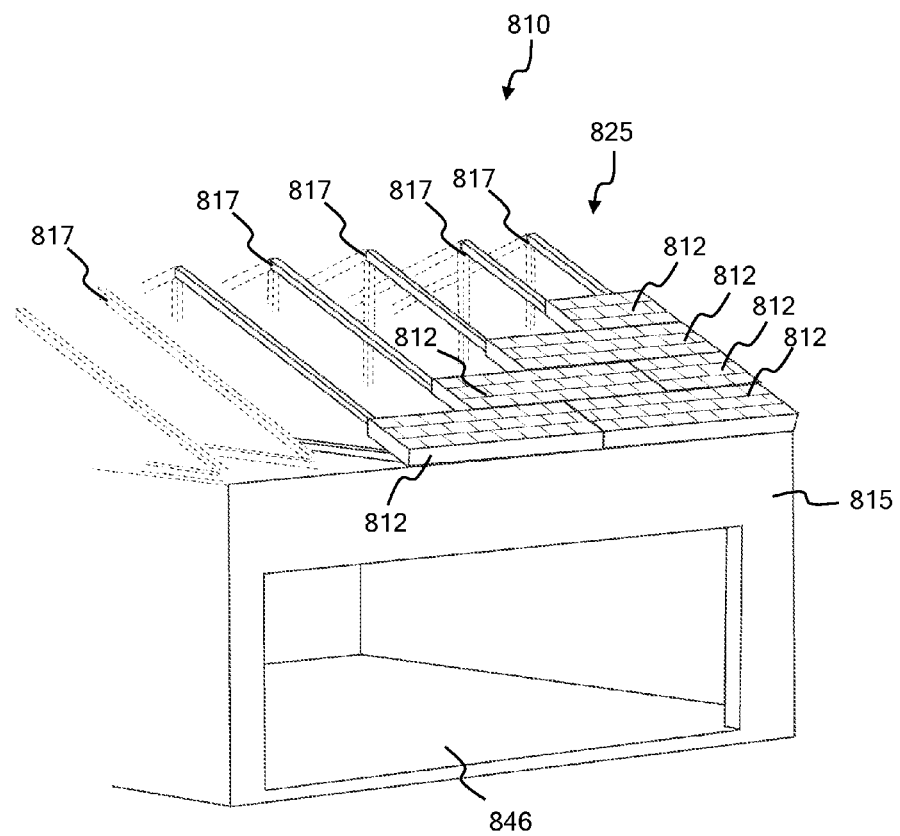
FIG. 24 shows a perspective view of an embodiment of building panel structure 810, with roof 825 formed using a plurality of roof panels 812 according to the invention.
Figure 57:
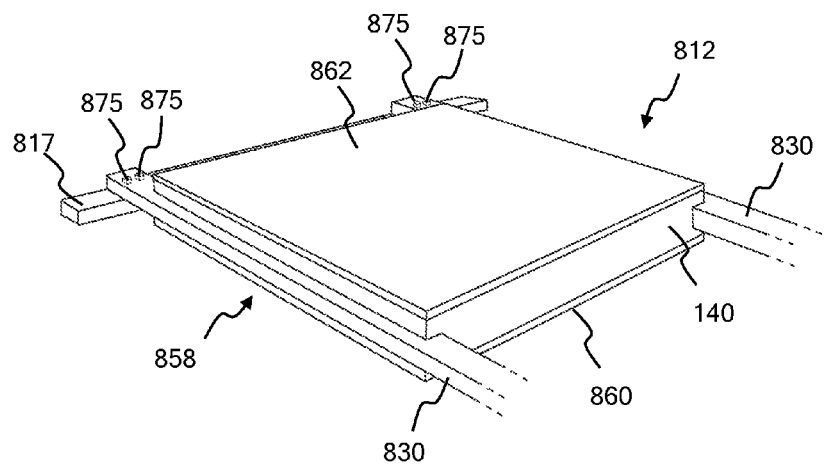
FIG. 57 shows a perspective view of roof panel 812 of FIG. 26 being coupled to roof structural member 817 with bolts 875.

FIG. 57 shows roof panel core 858 of roof panel 812 being coupled to roof framing members 817 (see FIG. 57 and FIG. 24). In the embodiment shown, roof panel 812 already has coating 860 pre-applied to bottom surface 826 of roof panel core 858, and first layer 862 pre-applied to top surface 824 of roof panel core 858, but this is not meant to be limiting. Pre-applied means the coatings and/or layers were applied and allowed to cure before roof panel core 858 was coupled to roof framing members 858. In some embodiments roof panel core 858 has no coatings or layers pre-applied. In some embodiments roof panel core 858 has some coatings or layers pre-applied.

Figure 58:
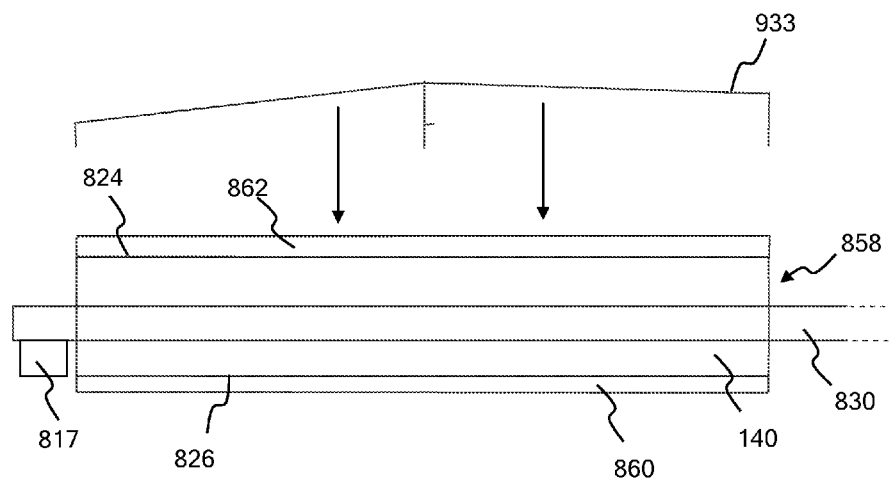
FIG. 58 shows a side view of screed frame 933 being applied to roof panel 812 of FIG. 57.
Figure 59:
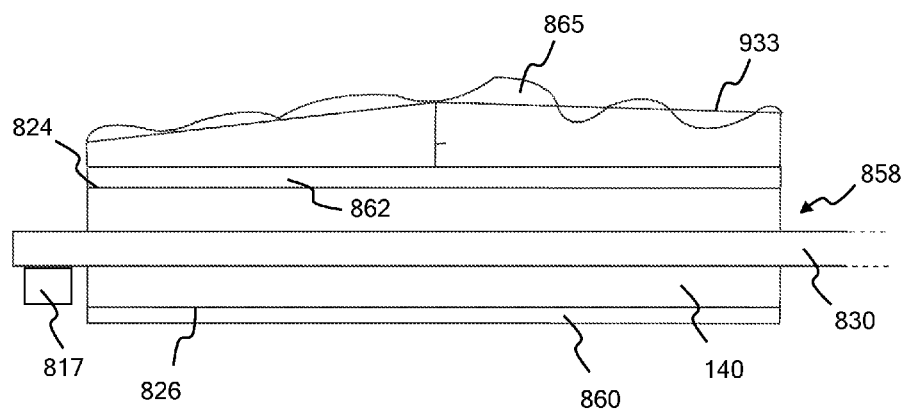
FIG. 59 shows a side view of wet coating 860 mixture 865 being applied to roof panel 812 in screed frame 933 of FIG. 58.
Figure 60:
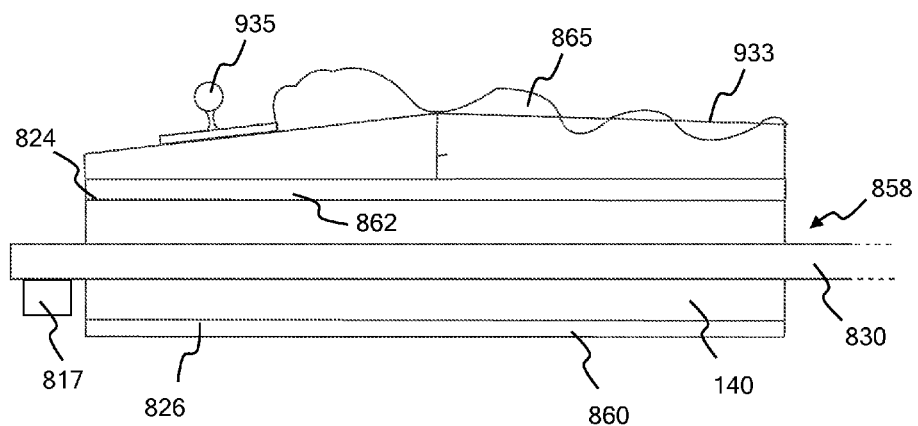
FIG. 60 shows wet coating mixture 865 of FIG. 59 being smoothed with trowel 935 using screed frame 933 as a height reference.

FIG. 58 shows a side view of roof panel 812 of FIG. 57 coupled to roof framing member 817, with screed frame 933 being lowered onto roof panel 812. In this embodiment more coating 860 layers are to be added to roof panel 812. Screed frame 933 is temporarily placed on top of roof panel 812 to provide a screed reference, or thickness reference, for finishing the surface of the coating layers applied to roof panel 812. Screed frame 933 is also used to form and shape the wet mixtures into the desired shape and texture. Wet coating mixture 865, which will become second layer 866 when cured, is placed into screed frame 933 as shown in FIG. 59. Wet mixture 865 is leveled and smoothed using screed frame 933 as a height reference, as shown in FIG. 60 and FIG. 61. In this embodiment screed frame 933 is designed to make second coating layer 866 that is shaped like roof shake tiles, but it is to be understood that screed frame 933 can be shaped to form coating layers of any shape or thickness. Once screed frame 933 is removed from roof panel 812, as shown in FIG. 62, second layer 866 of coating 860 is allowed to cure and becomes part of roof panel 812. It is to be understood that many different coatings and layers can be applied in-place to roof panel 812 and/or roof panel core 858 according to this method. Core 858 can be formed first, with some or all of its coatings 860 applied. Those coatings or layers not pre-applied can be applied after core 858 is coupled to roof framing members 817.

FIG. 63 illustrates method 2000 of forming a roof according to the invention. Method 2000 includes step 2010 of forming a roof panel, where the roof panel includes an insulating structural block. Step 2010 of forming a roof panel, where the roof panel includes an insulating structural block, can include many other steps. In some embodiments step 2010 includes the step of forming a roof panel core, where the roof panel core includes an insulating structural block. In some embodiments step 2010 includes the step of applying a first coating to a portion of the roof panel core, where the first coating includes cement, aggregate and acrylic bonder.

Method 2000 according to the invention also includes step 2020 of coupling the roof panel to a roof framing member of a building. Method 2000 can include many other steps. In some embodiments method 2000 includes the step of placing a screed frame on the roof panel. In some embodiments method 2000 includes the step of applying a wet first coating mixture to a portion of the roof panel, where the wet first coating mixture comprises cement, acrylic bonder, and aggregate. In some embodiments method 2000 includes the step of allowing the wet first coating mixture to cure. In some embodiments method 2000 includes the step of applying a wet second coating mixture over a portion of the cured first coating mixture, where the wet second coating mixture comprises cement, acrylic bonder, and ceramic.

In some embodiments method 2000 includes the step of embedding a reinforcing mesh in the wet second coating mixture before the wet second coating mixture is allowed to cure. In some embodiments method 2000 includes the step of removing the screed frame from the roof panel core.

It has been shown and described that building panel structures can be formed from building panels and roof panels, resulting in strong, energy efficient, and visually appealing structures for houses, commercial buildings, bridges, offices, hotels, or any other structure or edifice to be built.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A roof panel comprising:
   a roof panel core, wherein the roof panel core comprises an insulating structural block;
   a coating covering a portion of the roof panel core, wherein the coating comprises:
      a first coating covering a portion of the roof panel core, wherein the first coating comprises cement, aggregate, and acrylic bonder; and
      a second coating covering a portion of the first coating, wherein the second coating comprises cement, aggregate, and acrylic bonder; wherein the aggregate in the second coating comprises ceramic;
   and
   a fluid channel embedded in the second coating.

2. The roof panel of claim 1, wherein the coating further comprises a reinforcing mesh structure.

3. The roof panel of claim 1, wherein a layer of heat absorbing material is in thermal communication with a portion of the fluid channel.

4. The roof panel of claim 3, wherein the aggregate in the first coating comprises ceramic.

5. The roof panel of claim 1, wherein the second coating further comprises a reinforcing mesh structure.

* * * * *